(12) United States Patent
Douglas et al.

(10) Patent No.: US 11,553,297 B1
(45) Date of Patent: Jan. 10, 2023

(54) METHOD AND APPARATUS TO GENERATE A SIX DIMENSIONAL AUDIO DATASET

(71) Applicants: Robert Edwin Douglas, Winter Park, FL (US); David Byron Douglas, Winter Park, FL (US)

(72) Inventors: Robert Edwin Douglas, Winter Park, FL (US); David Byron Douglas, Winter Park, FL (US)

(*) Notice: Subject to any disclaimer, the term of this patent is extended or adjusted under 35 U.S.C. 154(b) by 0 days.

(21) Appl. No.: 17/884,876

(22) Filed: Aug. 10, 2022

Related U.S. Application Data

(63) Continuation of application No. 17/558,606, filed on Dec. 22, 2021, now Pat. No. 11,445,322, which is a continuation-in-part of application No. 17/225,610, filed on Apr. 8, 2021, now Pat. No. 11,366,319.

(51) Int. Cl.
*H04S 7/00* (2006.01)

(52) U.S. Cl.
CPC .................... *H04S 7/304* (2013.01)

(58) Field of Classification Search
CPC ....... H04S 7/304; H04S 3/004; H04S 2420/01
USPC .................................. 381/309, 310
See application file for complete search history.

(56) References Cited

U.S. PATENT DOCUMENTS

2017/0070835 A1* 3/2017 Silva ..................... H04N 9/802

* cited by examiner

*Primary Examiner* — Paul Kim

(57) ABSTRACT

This patent includes a method to generate a six dimensional audio dataset. When listening to the six dimensional audio dataset with an advanced headset disclosed in this patent, a user will enable a user to have precision sound localization and maximize the listening experience. For example, when the audio file is registered to a living room, a user would be able to sit in the "middle of the band" and if desired, reposition the instruments to different locations within the living room to change the audio experience.

20 Claims, 39 Drawing Sheets

PERFORMING RECORDING TO GENERATE A 6DAD USING A DETACHED, DISTRIBUTED MICROPHONE ARRAY

FREQUENCIES AND WAVELENGTHS OF VARIOUS NOTES

| Note | Octave | Frequency (Hz) | Wavelength (cm) | Note | Octave | Frequency (Hz) | Wavelength (cm) |
|---|---|---|---|---|---|---|---|
| A  | 0 | 27.5  | 1,253.38 | C  | 3 | 130.8 | 263.49 |
| A♯ | 0 | 29.1  | 1,183.03 | C♯ | 3 | 138.6 | 248.70 |
| B  | 0 | 30.9  | 1,116.64 | D  | 3 | 146.8 | 234.74 |
| C  | 1 | 32.7  | 1,053.96 | D♯ | 3 | 155.6 | 221.57 |
| C♯ | 1 | 34.6  | 994.81   | E  | 3 | 164.8 | 209.13 |
| D  | 1 | 36.7  | 938.98   | F  | 3 | 174.6 | 197.40 |
| D♯ | 1 | 38.9  | 886.27   | F♯ | 3 | 185.0 | 186.32 |
| E  | 1 | 41.2  | 836.53   | G  | 3 | 196.0 | 175.86 |
| F  | 1 | 43.7  | 789.58   | G♯ | 3 | 207.7 | 165.99 |
| F♯ | 1 | 46.2  | 745.27   | A  | 3 | 220.0 | 156.67 |
| G  | 1 | 49.0  | 703.44   | A♯ | 3 | 233.1 | 147.88 |
| G♯ | 1 | 51.9  | 663.96   | B  | 3 | 246.9 | 139.58 |
| A  | 1 | 55.0  | 626.69   | C  | 4 | 261.6 | 131.75 |
| A♯ | 1 | 58.3  | 591.52   | C♯ | 4 | 277.2 | 124.35 |
| B  | 1 | 61.7  | 558.32   | D  | 4 | 293.7 | 117.37 |
| C  | 2 | 65.4  | 526.98   | D♯ | 4 | 311.1 | 110.78 |
| C♯ | 2 | 69.3  | 497.40   | E  | 4 | 329.6 | 104.57 |
| D  | 2 | 73.4  | 469.49   | F  | 4 | 349.2 | 98.70  |
| D♯ | 2 | 77.8  | 443.14   | F♯ | 4 | 370.0 | 93.16  |
| E  | 2 | 82.4  | 418.27   | G  | 4 | 392.0 | 87.93  |
| F  | 2 | 87.3  | 394.79   | G♯ | 4 | 415.3 | 82.99  |
| F♯ | 2 | 92.5  | 372.63   | A  | 4 | 440.0 | 78.34  |
| G  | 2 | 98.0  | 351.72   | A♯ | 4 | 466.1 | 73.94  |
| G♯ | 2 | 103.8 | 331.98   | B  | 4 | 493.9 | 69.79  |
| A  | 2 | 110.0 | 313.35   |    |   |       |        |
| A♯ | 2 | 116.5 | 295.76   |    |   |       |        |
| B  | 2 | 123.5 | 279.16   |    |   |       |        |

Figure 1

SOUND QUALITY FOR DIFFERENT LOCATIONS IN A CONCERT t = 1 t = n t = p t = 1 t = n t = p

SOUND QUALITY FOR DIFFERENT LOCATIONS FOR A BAND AT
A FOOTBALL STADIUM

SOUND QUALITY FOR DIFFERENT LOCATIONS IN A BAND IN
FOOTBALL STADIUM EXAMPLE t = 1 t = n t = p t = 1 t = n t = p

SIX-DIMENSIONAL AUDIO DATASET (6DAD)
Fig. 6A Sound's (x, y, z) coordinate at t =1
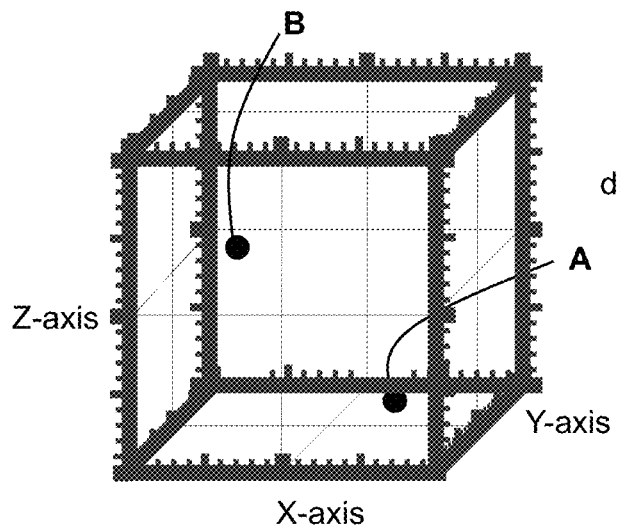
Fig. 6B Frequency and dB of two sound sources at t = 1
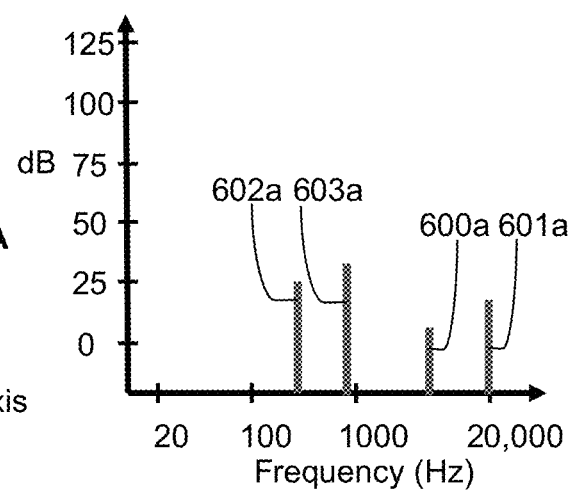
Fig. 6C Sound's (x, y, z) coordinate at t =1
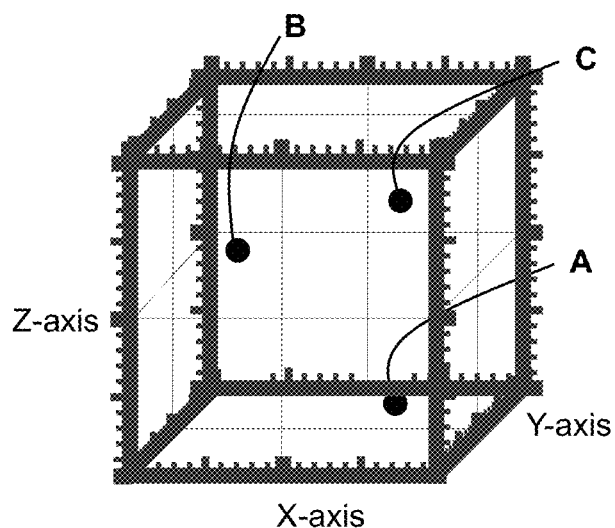
Fig. 6D Frequency and dB of three sound sources at t = 1
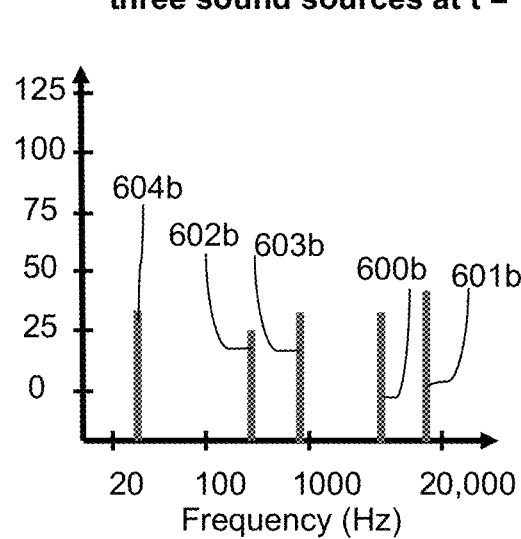

6DAD ORIGINS

Three Options:

- Recording via a microphone array
    - Triangulating microphone array (TTMA)
    - Detached, distributed microphone array (DDMA)
- Simulation via a virtual speaker system
- Hybrid recording and simulation

**It should be noted that either of these 6DAD can be modified as desired.

Figure 7

PERFORMING RECORDING TO GENERATE A 6DAD USING A TANGIBLE, TRIANGULATING MICROPHONE ARRAY

Fig. 8A

Use a microphone array with the microphones each having a unique location (i.e., x, y, z). Preferred embodiment is a microphone array comprising at least 4 microphones arranged in a spatially fixed, non-planar fashion 800

↓

Perform a longitudinal (i.e., over time) recording of sounds (frequency and dB) in an area using each microphone in the microphone array. 801

↓

Use the differential arrival time of the sounds at the different microphones in the array to triangulate the (x, y, z) location of the origin of the sound. This will also allow determining a distance from a microphone in the microphone array to the location where the sound originated from. 802

↓

For each sound, using the determined distance a microphones in the array and an attenuation model, determine the frequency, the amplitude and the time when the sound originated from the origin 803

↓

Store the determined (x, y, z) location of the origin of the sound, the time when the sound originated from the origin, the determined frequency, and the determined amplitude to as a 6 dimensional (6D) dataset (x, y, z, t, frequency, dB) 804

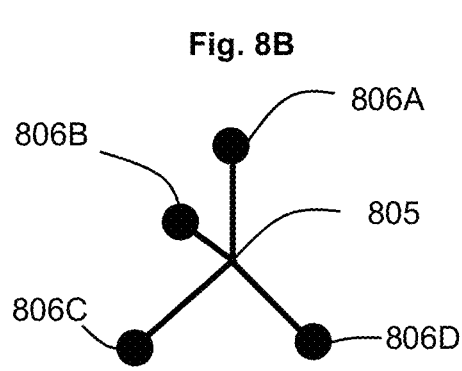

Fig. 8B

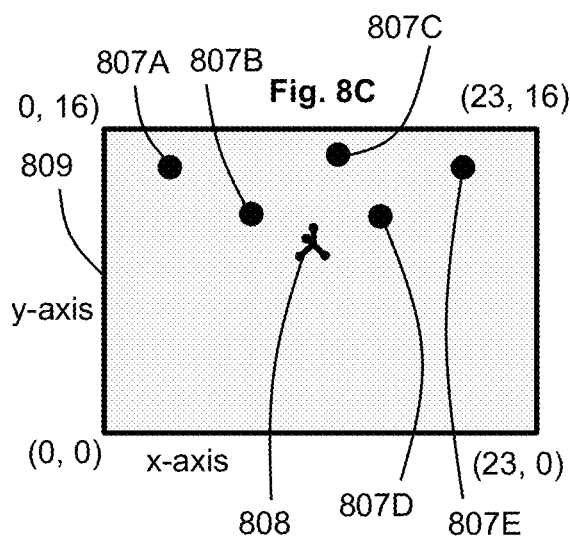

Fig. 8C

PERFORMING RECORDING TO GENERATE A 6DAD USING A DETACHED, DISTRIBUTED MICROPHONE ARRAY

Fig. 9A

Use a microphone array wherein the microphones each having a unique location (i.e., x, y, z). Preferred embodiment is an unattached microphone array comprising at least 4 microphones, at least one of which is free to move throughout an area and wherein localization of each microphone can be performed. 900

Perform a longitudinal (i.e., over time) recording of sounds (frequency and dB) in an area using each microphone in the microphone array. 901

The preferred method to determine the (x, y, z) location of the origin of the sound is via a location tracking system of the microphones. Minimal attenuation is expected in a DDMA. 902

Store the determined (x, y, z) location of the origin of the sound, the time when the sound originated from the origin, the determined frequency, and the determined amplitude to as a 6 dimensional (6D) dataset (x, y, z, t, frequency, dB) 904

Fig. 9B

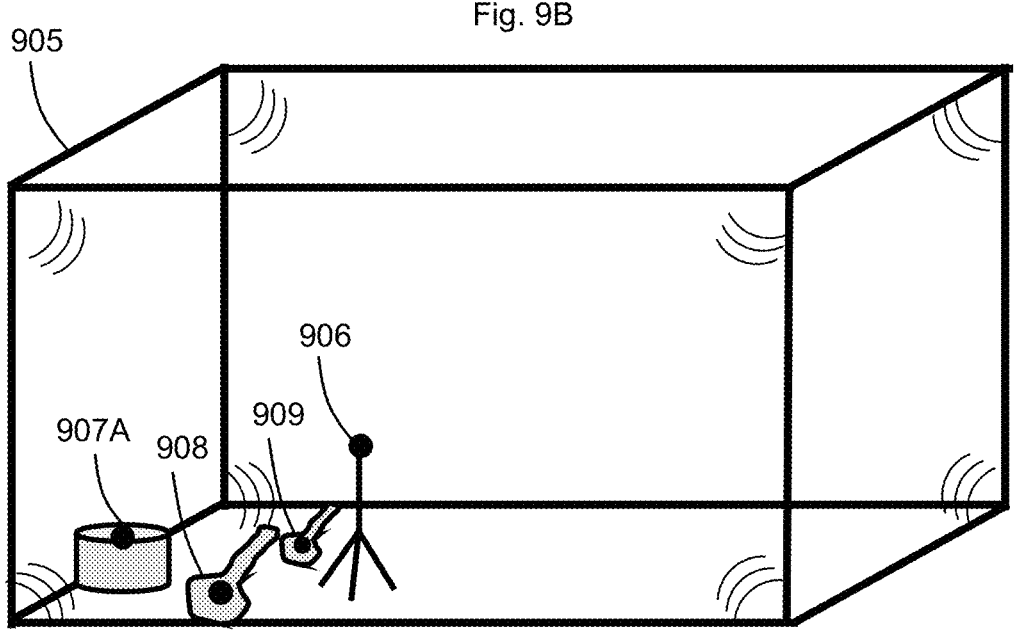

SIMULATION OF A 6DAD VIA A VIRTUAL SPEAKER SYSTEM

GENERATION OF A 6 DIMENSIONAL AUDIO DATASET VIA RECORDING USING VIRTUAL SPEAKER(S)

SELECTING A LOCATION FOR SOUND ORIGIN

Positioned in accordance with a virtual object:
- The location of the origin of sound can be mapped to a virtual object, which include, but are not limited to the following:
  - Virtual objects used in mixed reality applications
  - Virtual objects used in augmented reality applications
  - Virtual objects used in virtual reality applications

Positioned in accordance with a tangible object:
- The location of the origin of sound can be mapped to a tangible object, which include, but are not limited to the following:
  - Coordinates within a non-movable spatially mapped area
  - Movable tangible objects (e.g., person, hand-held items)

Not positioned in accordance with a virtual object and also not positioned in accordance with a tangible object.
- The location of the origin of could be mobile independent of both virtual objects and tangible objects.

Figure 11

GENERATING A HYBRID 6DAD AND OTHER OPTIONS

Fig. 12A

| Use a 6DAD generated from a microphone array as described in Figures 9 and 10. 1200 |
|---|

↓

| Use a virtual speaker to the 6DAD as described in Figure 11. 1201 |
|---|

↓

| Merge the 6DAD in 100 with the virtual speaker in 101. 1202 |
|---|

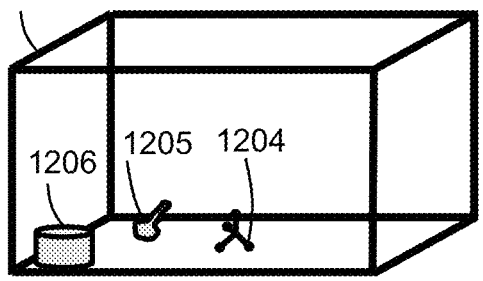

Fig. 12B 6DAD generated via microphone array

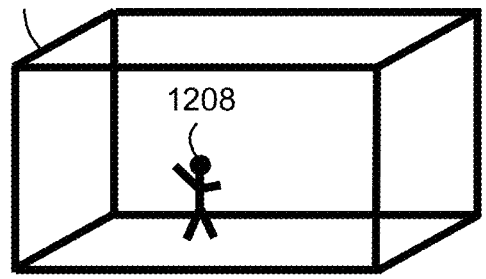

Fig. 12C 6DAD generated via virtual speakers

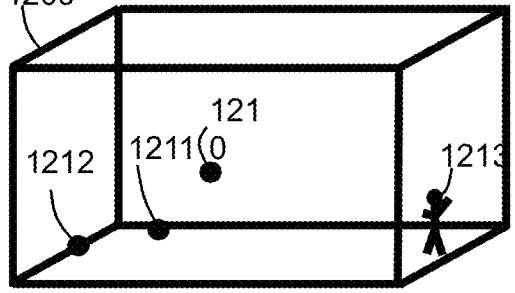

Fig. 12D Hybrid 6DAD

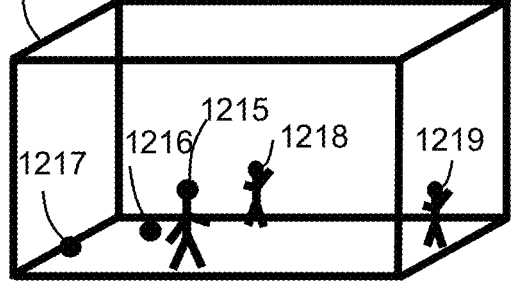

Fig. 12E Karaoke mode

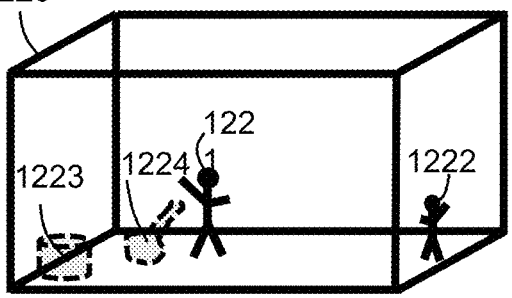

Fig. 12F Karaoke mode with AR

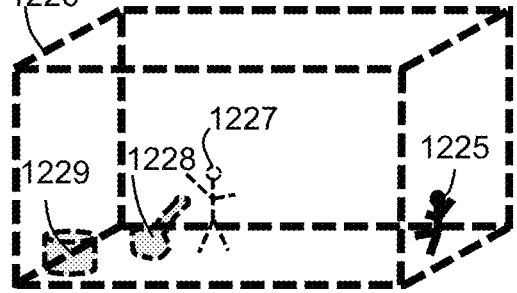

Fig. 12G VR mode

**DETERMINING WHAT A SOUND LIKE AT VARIOUS DISTANCES
(AN ATTENUATION ANALYSIS)**

Two Options:

- Acquisition
    - Acquiring at multiple distances
    - Acquiring using various obstacles for attenuation

- Simulation
    - Using a sound and modeling the changes in frequencies and dBs for various distances and attenuations

Figure 13

6DAD ORIGINATION VIA A HYBRID ACQUISITION AND SIMULATION: DISTROBUTION OF FREQUENCIES OVER DISTANCE

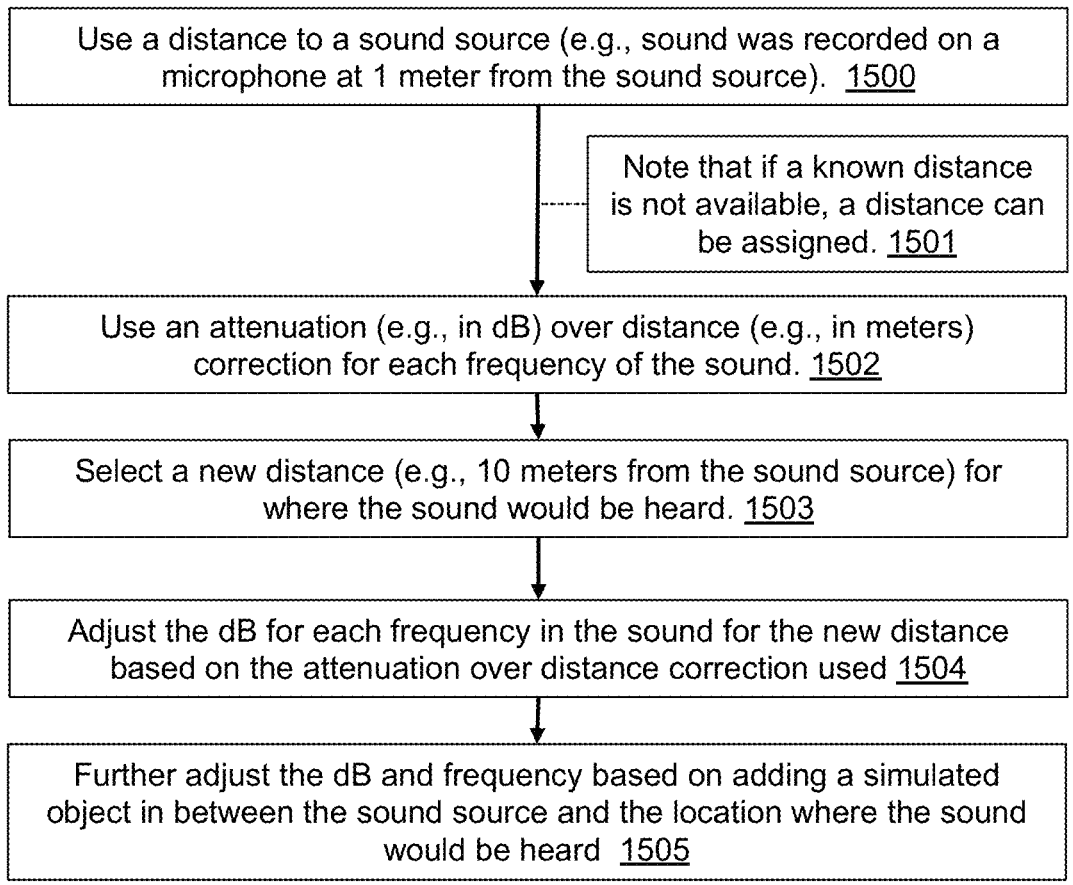
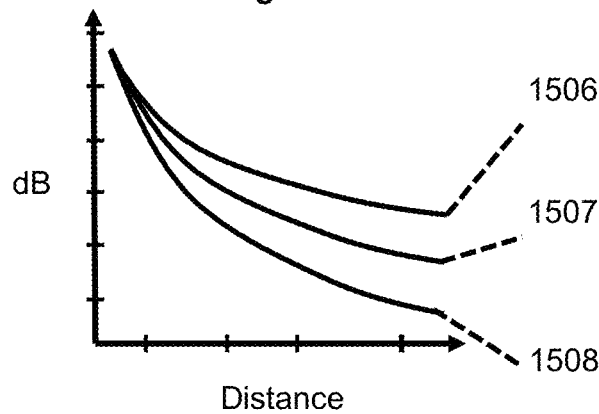

PRECISION 6DAD LISTENING VIA INCORPORATION OF AN ATTENUATION MODEL

A VIRTUAL SPEAKER, A VIRTUAL MICROPHONE AND AN AUDIO HEADSET

DETERMINING A SOUND ATTENUATION AND LISTENING TO A 6DAD USING A MUTLI-ATTENATION MODEL

USING MOVEMENT BETWEEN A USER'S HEADSET AND A SOUND IN A 6DAD FOR DOPPLER SHIFT DETERMINATION

Time epoch = before a virtual ambulance passes

Time epoch = 6.8 sec after ambulance passes

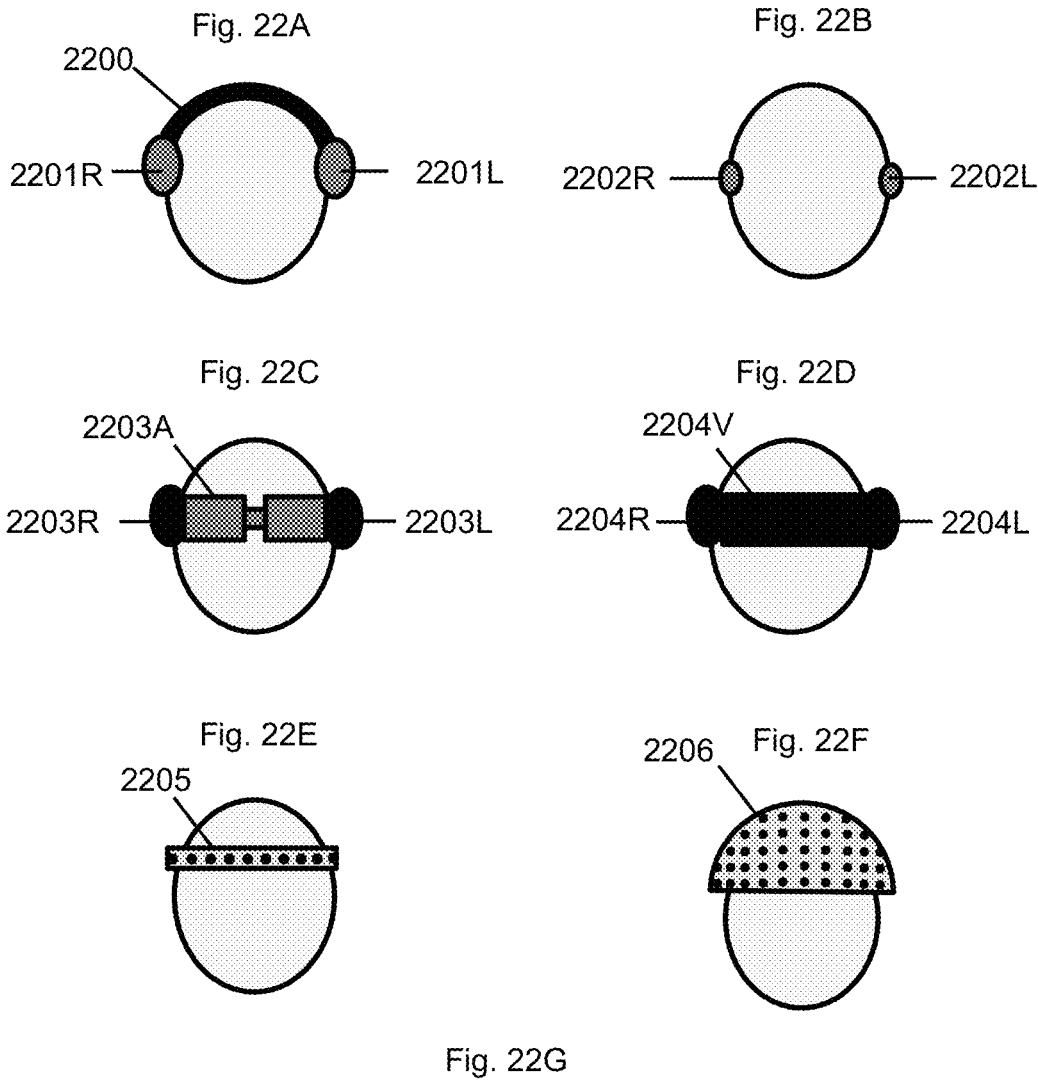
SMART HEADSET CONFIGURATIONS

FOR A 6DAD, DETERMINING WHAT SOUND WOULD BE RECEIVED BY A LEFT EAR AND BY A RIGHT EAR

| |
|---|
| Use a sound at a first location (e.g., direction of propagation, dB, frequencies). This is achieved via the 6DAD.<br>2300 |

| |
|---|
| Ultimately, the key questions parameters that need to be determined are (1) the timing (i.e., the arrival time of the sound), (2) the frequencies (in Hz) and (3) the amplitudes (in dB). To answer these questions, some data is needed to be modeled:<br>• What is the distance from the sound source to the left / right ear?<br>• How much attenuation would there be?<br>    • Is the attenuation only due to distance traveled through air?<br>    • Or does the head contribute to attenuation differences between the left ear and the right ear?<br>• After determining the attenuation, what would the amplitude be for each frequency?<br>• Is there movement between the sound source and the left ear so as to cause a frequency shift per Doppler effect?<br>• Would there be any echos?<br>    • What would be the amount of absorption / reflection of sound from items within the area?<br>2301 |

Figure 23

EXTABLISHING A COORDINATE SYSTEM FOR THE USER

INCOMING SOUND: EXAMPLE #1

INCOMING SOUND: EXAMPLE #2

WHEN LISTENING TO A 6DAD USING THE ADVANCED HEADSET, PERFORMING PRECISE LOCALIZATION OF SOUND IS POSSIBLE

PLAYING A 6DAD TO A USER AT A FIRST POSITION AT A FIRST TIME POINT

MANIPULATING THE 6DAD

Two Options:

- Manipulating the location of a sound coordinate within the 6DAD

- Manipulating the timing of a sound within the 6DAD

- Manipulating the timing of a sound within the 6DAD

Figure 34

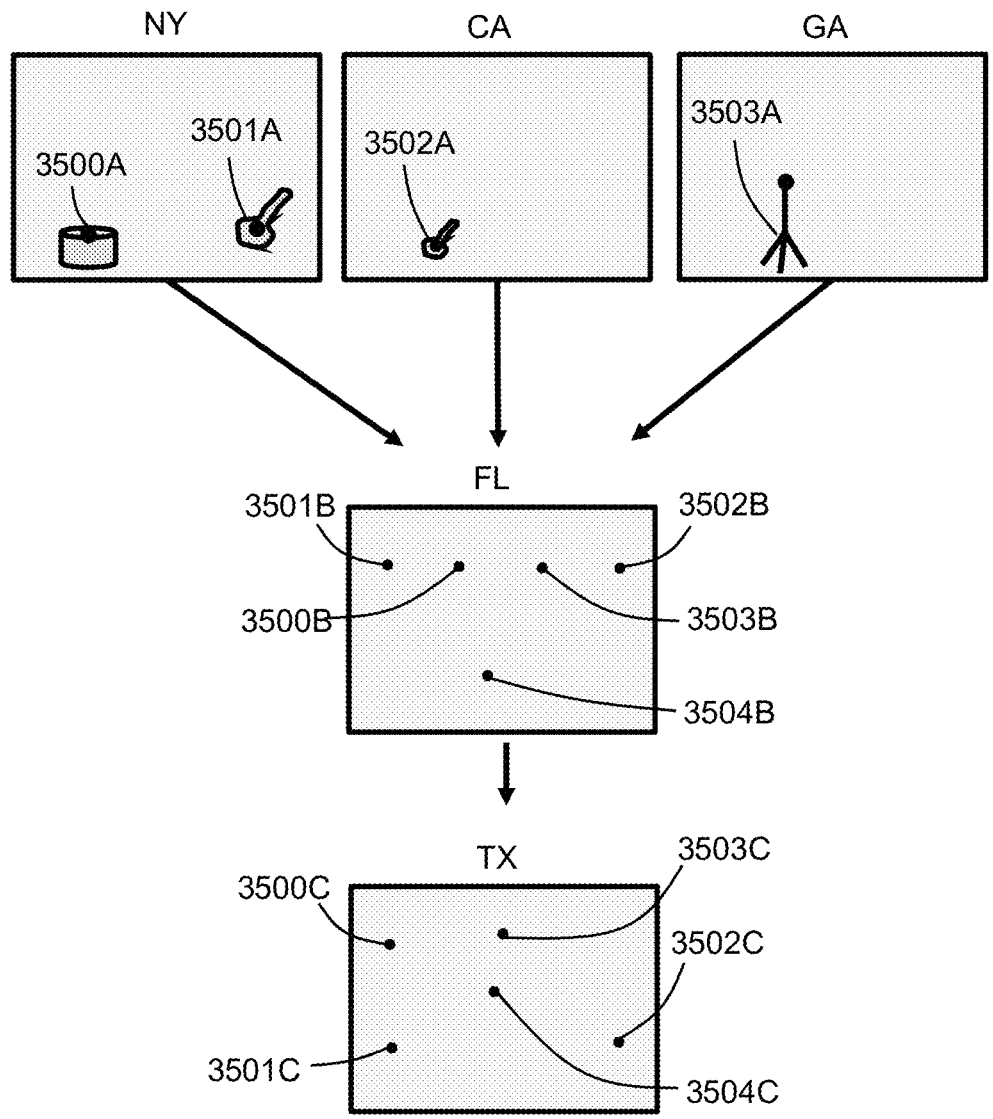

MANIPULATING THE TIMING OF A SOUND SOURCE WITHIN THE 6DAD
Fig. 36A
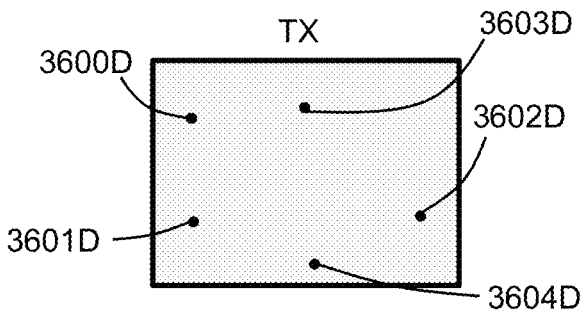
Fig. 36B
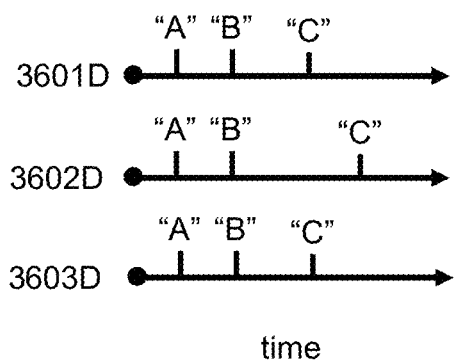
Fig. 36C
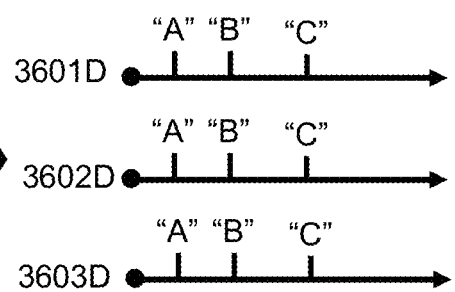
Fig. 36D
| Use a 6DAD 3604 |
|---|
| Alter at least timing of one sound to generate a manipulated 6DAD. 3605 |

MANIPULATING THE SOUND OF A SOUND SOURCE WITHIN THE 6DAD
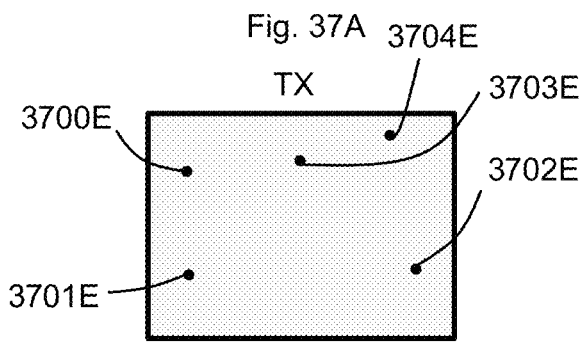
Fig. 37A
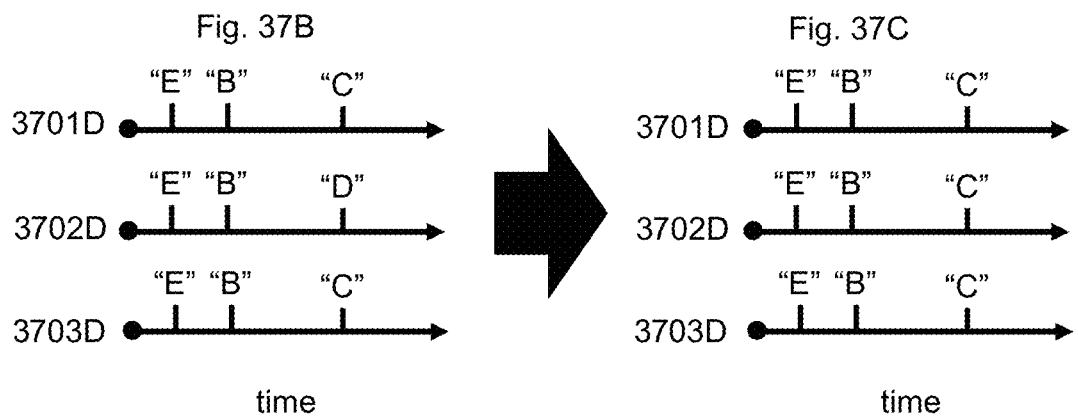
Fig. 37B
Fig. 37C
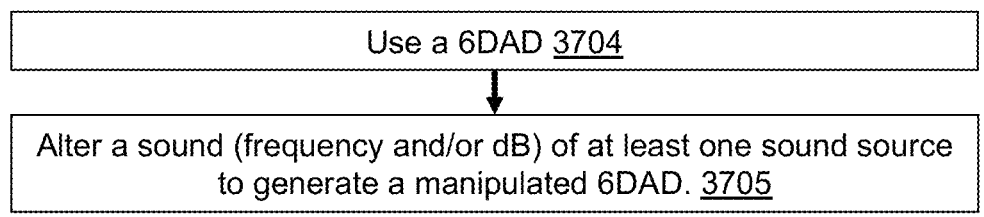
Fig. 37D

APPLICATIONS OF A SMART HEADSET

Fig. 38A

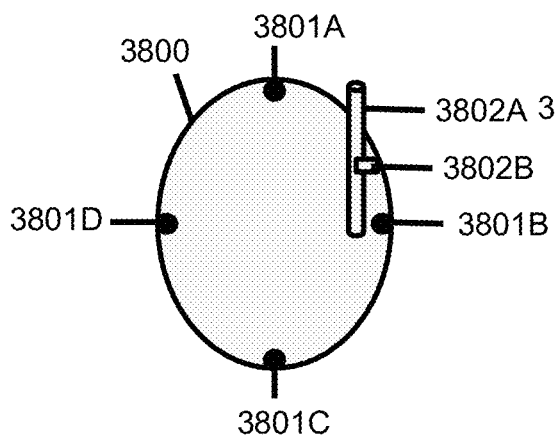

Fig. 38B

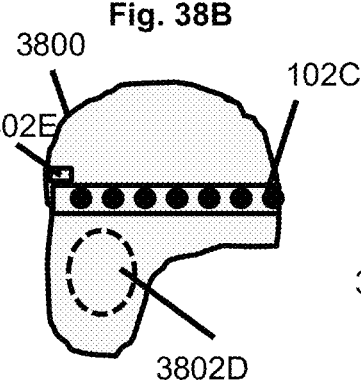

Fig. 38C

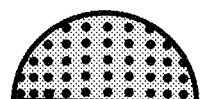

Fig. 38D

Triangulate a location of a sound using the multi-microphone smart helmet to enhance understanding about the sound (e.g., location, speed of traveling sound, etc.) 3803

Provide a notification of where the sound is coming from to the user wearing the helmet by:
- Auditory notification to a headset worn inside the helmet
- Visual notification via an XR display
- Tactile notification via the helmet
3804

Provide a notification of where the sound is coming from to another entity comprising:
- Using a GPS coordinate of the smart helmet.
- Using the triangulated location of the sound relative to the helmet.
- Determining the new location based on the GPS location of the smart helmet and the distance and direction of the triangulated location of the sound relative to the helmet
3805

Point directional microphone towards the location where the sound is coming from for improve listening capability 3806

METHOD AND APPARATUS TO GENERATE A SIX DIMENSIONAL AUDIO DATASET

CROSS REFERENCE TO RELATED APPLICATIONS

This application is a continuation U.S. Pat. No. 17/558,606 filed on Dec. 22, 2021, which is a continuation in part of U.S. patent application Ser. No. 17/225,610 filed on Apr. 8, 2021 (now U.S. Pat. No. 11,366,319).

TECHNICAL FIELD

Aspects of this disclosure are generally related to sound.

INTRODUCTION

In an orchestra, some seats in the stadium are priced higher than others.

SUMMARY

All examples, aspects and features mentioned in this document can be combined in any technically conceivable way.

A key purpose of this patent application is to provide a person who can only afford the cheap seats at concert with the same quality and richness of music as a person with the best seat in the house. (Note: incidentally, the person who has the best seat in the house most likely paid much more than the person sitting in the cheap seats. An analogous situation where seats all cost the same and the person who arrives first gets a great seat and the late corners are well back in the crowd.)

How, one would ask, how is it possible for this jump in the quality and richness for this to happen? The simple answer is a six dimensional audio dataset (6DAD). Next, one would ask, what in the world is a 6DAD? Everyone knows there are only 3 dimensions in this world—length, width, and height. Well, also, maybe you could add time. But, that's it—period. Well, the guy in the cheap seats is dealing quality and richness (or lack thereof) of the sounds he hears. But sounds are very complex: some are loud, some are soft; some have a high pitch and some have a low pitch. And, at a concert, they are all mixed together. Take a stringed instrument one string has a high note and another string not has a low note and these notes are all scrambled together. And, there is an amplitude associated with each note.

Focus next on the graph of the frequencies (i.e., high, low, and somewhere in-between pitches) and amplitudes (i.e., a scale in decibels to represent degree of loudness or softness of the sound). The best seat in the house has a rich array of frequencies each of which has sufficient amplitude to provide a high quality and rich experience during the concert. On the other hand, the cheap seat, due to the distance from the orchestra, hear a different set of sounds due to attenuation of both the amplitude and frequencies. And, differing frequencies attenuate at different rates based on range from the sound. Some of the high notes of a stringed instrument are barely audible. The result is, for the cheap seat, a lesser quality and richness of the sounds at that location.

But then comes another imponderable question—what if you missed the concert and wanted to live the experience you missed as if you were located at the best seat in the house? Please stay tuned—no pun intended.

In an initial embodiment, a test would be administered of differing sounds to determine a user's preferences and dislikes of various sounds. These preferences and dislikes would be recorded and, subsequently, be used in order to build these into a personalized sound preferences and dislikes data set application. In an embodiment, a library of different musical tones, different frequencies, different sounds, etc. will be established and called upon for testing purposes of an individual user. In a further embodiment, a scale to measure desirability of the various sounds will be established. In a further embodiment, the hearing losses for the individual user will be measured and recorded. In this embodiment, the user would be wearing headphones and the volumes of differing frequencies would start at very low decibel levels and slowly increase until such time where the frequency became audible to the user and the user would so indicate through the test control mechanism such as a computer mouse. In so doing hearing loss, if any, as a function of frequencies would be established. In a further embodiment, the test could be downloaded from a website to the user's computer, smart phone, or smart headset which is described below.

In another embodiment, an algorithm/application will be established to listen for undesirable sounds that are presented to the individual user. The algorithm/application would be downloaded onto at least one of the group of: smart phone, computer, television, smart headset. In this embodiment, a change would be made in the sounds presented to the individual user. In some embodiments, a change of frequency would be made to a more desirable frequency—according to the individual user's pre-recorded preferences and dislikes of various sounds. In some embodiments, a particular frequency(ies) may be may be presented in a lower volume frequency—according to the individual user's pre-recorded dislikes of various sounds. In some embodiments, specific frequencies would be eliminate from presentation to the individual user frequency—according to the individual user's pre-recorded dislikes of various sounds.

In another embodiment, an algorithm/application will be established to listen for desirable sounds that are presented to the individual user. The algorithm/application would be downloaded onto at least one of the group of: smart phone, computer, television, smart headset. In the case of music sounds, in some embodiments, a change could be made in the tempo of the music but not frequencies of the music. In embodiments wherein orchestras or bands are involved the individual user could listen to only certain elements of the musical group (e.g., stringed instruments only). In further embodiments, in instances wherein the individual user had a specific song or portion thereof, a loop of n times to replay that song or portion thereof. A further embodiment may be to change the music up or down by an octave(s). In other embodiments, the volume of specific frequency(ies) could be changed—according to the individual user's pre-recorded preferences of various sounds. In some embodiments, a change to the volume of certain frequency(ies) would be made in accordance with the results of the hearing test.

In another embodiment, an algorithm/application will be established to listen for indistinguishable voices/sounds that are presented to and recorded by the individual user. In this embodiment, an artificial intelligence (AI) algorithm/application would develop a string of letters for the indistinct able voices/sounds. Then in this embodiment, AI would parse the letter string into words and insert delays for the resulting distinguishable speech. This distinguishable speech would then be presented to the individual user. In some embodiments this artificial intelligence algorithm/application could be used in connection with hearing aids.

In another embodiment, a smart headset would be developed to enhance the sounds presented to the individual user. An important element of the headset is the provision for storage of data sets. These data sets could include but are not limited to: the individual user's pre-recorded preferences and dislikes of various sounds, music, educational material, soothing sounds, and pre-recorded news, weather and sports. Another important element of the smart headset id a series of microphones placed around the headset to provide aa hearing mechanism for sounds emitting from the external environment. Another embodiment within the smart headset is a radio. Connections to the headset could include a physical connection to a computer and an audio connection to an smart phone. Another important element of the headset is the processor which would apply: the algorithm/application will be established to listen for undesirable sounds; the algorithm/application will be established to listen for desirable sounds to either selected elements of the prerecorded data sets, the current noises from the eternal environment, the connection to the headset or a combination of the pre-recorded and external environment sounds and sounds emanating from the connections. A further element in the smart headset would include a mechanism to control the sounds be presented to the individual user. Control mechanism could include, but are not limited to the following: individual user's voice command; tactile via a switch on headset, input to a connected smart phone or computer. The embodiment of the sound delivery to the individual user by the smart headset could include, but are not limited to: sound-proof ear coverings with speaker(s) inside; multi speakers configured around the head which could be in a planar configuration or distributed in three dimensions (3D) around the head to provide 3D surround sound. In some embodiments for particular environments such as a subway ride or a noisy classroom, particular headset configurations could suppress unwanted noises but retain other noises such as those emanating from the subway conductor or the teacher/professor. In some embodiments, the headset could record sounds being received and subsequently apply the algorithm/application will be established to listen for indistinguishable voices/sounds. In some embodiments the smart headset elements could be integrated with the elements of a head display unit.

In some military embodiments, the helmet could be embedded with directional microphones, earpieces with very low volume speakers, and processor as described in the smart headset. This embodiment could inter alia: listen for and locate threat activity; suppress loud sounds of firing weapons and artillery rounds, have embedded two-way voice translation software; and provide music during off-duty periods. In this embodiment the individual Soldier could communicate with other Soldiers similarly equipped and employ triangulation algorithms to precisely locate threat entities.

In another embodiment, a smart microphone would be developed to enhance and transform the voice/sounds emanating by the individual user. The individual user could use the smart microphone to communicate with/present to: verbally to other persons or groups or a communications system such as a smart phone. In this embodiment, the smart microphone could change frequency of the voice to a more desirable frequency or change notes being sung by the user to a more desirable tone. In a further embodiment of the smart microphone, there would be developed and embedded in the smart microphone a library consisting of inter alia: historical voices, person known to individual user of the microphone, different tones of these voices. Then, the voice of the individual user could be, using algorithms/applications, transformed into the voice of the historical voices or person known to individual user along with the selected tone of that person. In some embodiments of the smart microphone there could be a library of sounds selected by the user which, at the discretion of the user, and which sounds could be presented to: verbally through the smart microphone to other person(s) or through the smart microphone to a smart phone. Key elements of the smart microphone include, but are not limited to: memory provision for storage of selected voices, a processor with algorithms for changing the individual user's voice to that of another person and speaker(s) to communicate the transformed voice.

In another embodiment, the above described algorithms/applications could be installed on a individual user's computer for interaction via the internet. For input into the computer, these algorithms could: change the frequencies of the individual user's voice(s) to a more pleasant frequency and change the volume of a specific frequency(ies). For output from the computer, these algorithms could: in the opinion of a particular user change frequency of a person being communicated with to a more desirable frequency(ies); change the volume of a specific frequency(ies) of a person being communicated with; and change tone of the voice of a person being communicated with to a user specified tone of voice. The computer could have installed a library of historical voices, person known to user of microphone, different tones of voice. This library of voices/tones of voice could be used, in connection with the algorithms/applications, to convert the vocal input of individual user to that of the selected voices/tones of voice. In furthering this embodiment, to individual user could so participate in group meetings via internet.

Some embodiments comprise a method of presenting sound on a headset comprising: for a first time epoch, assigning an (x,y,z) coordinate for an origin of a first sound; assigning an (x,y,z) coordinate to a user's right ear based on head tracking of said headset; and assigning an (x,y,z) coordinate to said user's left ear based on head tracking of said headset wherein said (x,y,z) coordinate to said user's right ear and said (x,y,z) coordinate to said user's left ear are different coordinates; determining a distance from said origin of said first sound to said user's right ear; determining an arrival time of said first sound to said user's right ear; playing said first sound on a speaker for said user's right ear at said arrival time of said first sound to said user's right ear; determining a distance from said origin of said first sound to said user's left ear; determining an arrival time of said first sound to said user's left ear wherein said arrival time of said first sound to said user's right ear is different from said arrival time of said first sound to said user's left ear; and playing said first sound on a speaker for said user's left ear at said arrival time of said first sound to the user's left ear.

Some embodiments comprise for a second time epoch, assigning an (x,y,z) coordinate for an origin of a second sound; assigning an (x,y,z) coordinate to said user's right ear based on head tracking of said headset; and assigning an (x,y,z) coordinate to said user's left ear based on head tracking of said headset wherein said (x,y,z) coordinate to said user's right ear and said (x,y,z) coordinate to said user's left ear are different coordinates; determining a distance from said origin of said second sound to said user's right ear; determine an arrival time of said second sound to said user's right ear; playing said second sound on a speaker for said user's right ear at said arrival time of said second sound to the user's right ear; determining a distance from said origin of said second sound to said user's left ear; determine an arrival time of said second sound to said user's left ear wherein said arrival time of said second sound to said user's right ear is different from said arrival time of said second sound to said user's left ear; and playing said second sound on a speaker for said user's left ear at said arrival time of said second sound to the user's left ear.

Some embodiments comprise wherein said headset has moved from said first time epoch to said second time epoch; wherein said (x,y,z) coordinate to said user's right ear at said first time epoch is different from said (x,y,z) coordinate to said user's right ear at said second time epoch; and wherein said (x,y,z) coordinate to said user's left ear at said first time epoch is different from said (x,y,z) coordinate to said user's left ear at said second time epoch.

Some embodiments comprise wherein said headset has moved via translation. Some embodiments comprise wherein said headset has moved via rotation. Some embodiments comprise wherein said (x,y,z) coordinate for said origin of said second sound is the same as said (x,y,z) coordinate for said origin of first sound. Some embodiments comprise wherein said (x,y,z) coordinate for said origin of said second sound is different than said (x,y,z) coordinate for said origin of first sound. Some embodiments comprise wherein said headset has not moved from said first time epoch to said second time epoch; wherein said (x,y,z) coordinate to said user's right ear at said first time epoch is the same as said (x,y,z) coordinate to said user's right ear at said second time epoch; and wherein said (x,y,z) coordinate to said user's left ear at said first time epoch is the same as said (x,y,z) coordinate to said user's left ear at said second time epoch. Some embodiments comprise wherein said (x,y,z) coordinate for said origin of said second sound has not moved from said first time epoch to said second time epoch; and wherein said (x,y,z) coordinate for said origin of said second sound is the same as said (x,y,z) coordinate for said origin of first sound. Some embodiments comprise wherein said (x,y,z) coordinate for said origin of said second sound has moved from said first time epoch to said second time epoch; and wherein said (x,y,z) coordinate for said origin of said second sound is different than said (x,y,z) coordinate for said origin of first sound. Some embodiments comprise wherein said origin of said second sound has moved via translation. Some embodiments comprise wherein said origin of said second sound has moved via rotation wherein a direction of projection of said first sound is different from a direction of projection of said second sound. Some embodiments comprise determining an attenuation of said first sound from said origin of said first sound to said user's right ear; determining an amplitude of said first sound for the user's right ear based on said attenuation of said first sound from said origin of said first sound to said user's right ear; playing said first sound on said speaker for said user's right ear at said determined amplitude for said first sound for said user's right ear; determining an attenuation of said first sound from said origin of said first sound to said user's left ear wherein said attenuation of said first sound from said origin of said first sound to said user's right ear is different than said attenuation of said first sound from said origin of said first sound to said user's left ear; determining an amplitude of said first sound for said user's left ear based on said attenuation of said first sound from said origin of said first sound to said user's left ear wherein said determined amplitude of said first sound for the user's right ear is different than said determined amplitude of said first sound for the user's left ear; and playing said first sound on said speaker for said user's left ear at said determined amplitude for said first sound for said user's left ear.

Some embodiments comprise determining an attenuation of said first sound from said origin of said first sound to said user's right ear; determining a decibel for at least one frequency of said first sound for the user's right ear based on said attenuation of said first sound from said origin of said first sound to said user's right ear; playing said first sound on said speaker for said user's right ear at said determined decibel for at least one frequency for said first sound for said user's right ear; determining an attenuation of said first sound from said origin of said first sound to said user's left ear wherein said attenuation of said first sound from said origin of said first sound to said user's right ear is different than said attenuation of said first sound from said origin of said first sound to said user's left ear; determining a decibel for at least one frequency of said first sound for said user's left ear based on said attenuation of said first sound from said origin of said first sound to said user's left ear wherein said determined decibel for at least one frequency of said first sound for said user's right ear is different than said determined decibel for at least one frequency of said first sound for said user's left ear; and playing said first sound on said speaker for said user's left ear at said determined decibel for at least one frequency for said first sound for said user's left ear. Some embodiments comprise wherein said (x,y,z) coordinate for said origin of said first sound is used for sound localization on a headset worn by a second user. Some embodiments comprise wherein said second sound is the same as first sound. Some embodiments comprise wherein said second sound is different from first sound. Some embodiments comprise wherein said (x,y,z) coordinate for an origin of a first sound is selected by at least one of the group comprising: said user; a second user; and, a computer algorithm (including Artificial Intelligence Algorithms). Some embodiments comprise wherein said headset comprises a sensor to generate a map of an area; wherein said (x,y,z) coordinate comprises a location within said map of said area. Some embodiments comprise a video game wherein a goal of said video game is to, for said user, best determine a location of said origin of a first sound.

Some embodiments comprise headphones, comprising: a left ear speaker; a right ear speaker; a head tracking system; a non-transitory memory configurable to store computer executable instructions; and a communications interface in communication with the non-transitory memory and a processor, wherein the processor is configurable to execute the instructions to: for a first time epoch, assign an (x,y,z) coordinate for an origin of a first sound; assign an (x,y,z) coordinate to a user's right ear based on head tracking of said headphones; and assign an (x,y,z) coordinate to said user's left ear based on head tracking of said headphones wherein said (x,y,z) coordinate to said user's right ear and said (x,y,z) coordinate to said user's left ear are different coordinates; determine a distance from said origin of said first sound to said user's right ear; determine an arrival time of said first sound to said user's right ear; play said first sound on said right ear speaker at said arrival time of said first sound to the user's right ear; determine a distance from said origin of said first sound to said user's left ear; determine an arrival time of said first sound to said user's left ear wherein said arrival time of said first sound to said user's right ear is different from said arrival time of said first sound to said user's left ear; and play said first sound on said left ear speaker at said arrival time of said first sound to the user's left ear.

Some embodiments comprise head display unit (including extended reality headsets (XR) including augmented reality headset, virtual reality headset and mixed reality headset), comprising: a left ear speaker; a right ear speaker; a head tracking system; a non-transitory memory configurable to store computer executable instructions; and a communications interface in communication with the non-transitory memory and a processor, wherein the processor is configurable to execute the instructions to: for a first time epoch, assign an (x,y,z) coordinate for an origin of a first sound; assign an (x,y,z) coordinate to a user's right ear based on head tracking of said head display unit; and assign an (x,y,z) coordinate to said user's left ear based on head tracking of said head display unit wherein said (x,y,z) coordinate to said user's right ear and said (x,y,z) coordinate to said user's left ear are different coordinates; determine a distance from said origin of said first sound to said user's right ear; determine an arrival time of said first sound to said user's right ear; play said first sound on a speaker for said user's right ear at said arrival time of said first sound to the user's right ear; determine a distance from said origin of said first sound to said user's left ear; determine an arrival time of said first sound to said user's left ear wherein said arrival time of said first sound to said user's right ear is different from said arrival time of said first sound to said user's left ear; and play said first sound on a speaker for said user's left ear at said arrival time of said first sound to the user's left ear.

Some of the techniques in this patent are performed in conjunction with techniques disclosed in the following patents (all of which are incorporated by reference in their entirety): U.S. patent application Ser. No. 15/878,463, Interactive 3D cursor for use in medical imaging; U.S. patent application Ser. No. 16/010,925, Interactive placement of a 3D digital representation of a surgical device or anatomic feature into a 3D radiologic image for pre-operative planning; U.S. patent application Ser. No. 15/904,092, Processing 3D medical images to enhance visualization; U.S. patent application Ser. No. 15/949,202, Smart operating room equipped with smart surgical devices; U.S. Pat. No. 9,473,766, Method and apparatus for three dimensional viewing of images; U.S. Pat. No. 9,615,806, Method and apparatus for creation and display of artifact corrected three dimensional (3D) volumetric data from biplane fluoroscopic image acquisition; U.S. patent Ser. No. 14/644,489, Method and apparatus for creation and display of artifact corrected three dimensional (3D) volumetric data from biplane fluoroscopic image acquisition; U.S. Pat. No. 9,980,691, Method and apparatus for three dimensional viewing of images; U.S. Pat. No. 9,349,183, Method and apparatus for three dimensional viewing of images; U.S. patent application Ser. No. 16/195,251, Interactive voxel manipulation in volumetric medical imaging for virtual motion, deformable tissue, and virtual radiological dissection; U.S. patent application Ser. No. 16/509,592, Implantable markers to aid surgical operations; U.S. patent application Ser. No. 16/524,275, Using geo-registered tools to manipulate three-dimensional medical images; PCT/US19/478, A virtual tool kit for radiologists; U.S. patent application Ser. No. 16/563,985, A method and apparatus for the interaction of virtual tools and geo-registered tools; U.S. patent application Ser. No. 16/594,139, Method and apparatus for performing 3D imaging examinations of a structure under different configurations and analyzing morphologic changes; U.S. patent application Ser. No. 16/683,256, Method and apparatus for performing 3D imaging examinations of a structure under different configurations and analyzing morphologic changes; U.S. patent application Ser. No. 16/703,629, Radiologist-assisted machine learning with volume-subtending 3D cursor; PCT/US19/239, Radiologist-assisted machine learning with interactive, volume-subtending 3D cursor; U.S. provisional application No. 62/843,612, A method of creating a computer-generated patient specific image; U.S. provisional application No. 62/846,770, A method of prioritized volume rendering to improve visualization of prioritized items within a 3D volume; U.S. provisional application No. 62/850,002, A method of creating an artificial intelligence generated differential diagnosis and management recommendation tool boxes during medical personnel analysis and reporting; U.S. patent application Ser. No. 16/654,047, A method to modify imaging protocols in real time through implementation of artificial intelligence; U.S. provisional application 62/856,185, A method of image manipulation based on eye tracking; U.S. patent application Ser. No. 16/506,073, A method for illustrating direction of blood flow via pointers; U.S. patent application No. 62/906,125, A method and apparatus for stereoscopic rendering of mobile fluids; and, U.S. patent application No. 62/939,685, Method and apparatus for development of an organ-specific coordinate system.

Some embodiments comprise recording a sound at a multiple time points at a recording location wherein said sound originates at an originating location, wherein said recording location is separate from said originating location by a first distance, wherein each time point in said multiple time points of said sound at said originating location comprises multiple frequencies, wherein each frequency in said multiple frequencies of said sound at said originating location comprises an associated amplitude, wherein each time point in said multiple time points of said sound at said recording location comprises multiple frequencies, and wherein each frequency in said multiple frequencies of said sound at said recording location comprises an associated amplitude; picking a simulated location wherein said simulated location is different from said recording location, wherein said simulated location is a simulated distance from said recording location; and using said recorded sound to generate a corresponding simulated sound wherein said corresponding simulated sound is based on said simulated location, wherein said corresponding simulated sound comprises multiple time points, wherein each time point in said multiple time points of said corresponding simulated sound comprises multiple frequencies, wherein each frequency in said multiple frequencies of said corresponding simulated sound comprises an associated simulated amplitude, wherein for each frequency at each time point of said corresponding recorded sound, an attenuation correction based on said simulated distance is applied to generate a simulated amplitude for each frequency at each time point of said simulated sound, and wherein for corresponding time points between said recorded sound and said corresponding simulated sound and corresponding frequencies between said recorded sound and said corresponding simulated sound, amplitudes of said corresponding simulated sound are different from amplitudes of said recorded sound.

Some embodiments comprise wherein at least one selected frequency from said recorded sound is omitted from said corresponding simulated sound.

Some embodiments comprise wherein said recorded sound is analyzed to determine if noise is present; and if said noise is present, then said noise is omitted from said simulated sound.

Some embodiments comprise wherein if said first distance is known, then using amplitude correction for said corresponding simulated sound based on said first distance.

Some embodiments comprise wherein if the originating location of said sound is moving, then using a Doppler correction at each time point to generate said simulated sound's frequencies and associated amplitudes.

Some embodiments comprise wherein said simulated distance is determined by at least one of the group of: a location of a user's wearable device; and an input from a user's wearable device. Some embodiments comprise wherein: said corresponding simulated sounds is saved; and said saved corresponding simulated sound is played on speakers to a user.

Some embodiments comprise: assigning an (x,y,z) coordinate to said originating location; assigning an (x,y,z) coordinate to said recording location; and assigning an (x,y,z) coordinate to said simulated location.

Some embodiments comprise computing a travel time of said sound from said recording location to said simulated location.

Some embodiments comprise adjusting said travel time based on at least one of the group comprising: frequencies of said recorded sound; medium; humidity; and temperature.

Some embodiments comprise wherein said simulated location is different from said originating location.

Some embodiments comprise wherein said simulated distance is longer than said first distance.

Some embodiments comprise wherein said simulated distance is shorter than said first distance.

Some embodiments comprise storing said corresponding simulated sound; at a first time epoch, playing said recorded sound on speakers for a user; and at a second time epoch, playing said corresponding simulated sound on speakers for said user.

Some embodiments comprise presenting said corresponding simulated sound on a headset; wherein for a first time epoch, assigning an (x,y,z) coordinate for said simulated sound; assigning an (x,y,z) coordinate to a user's right ear based on head tracking of said headset; and assigning an (x,y,z) coordinate to said user's left ear based on head tracking of said headset wherein said (x,y,z) coordinate to said user's right ear and said (x,y,z) coordinate to said user's left ear are different coordinates; determining a distance from said corresponding simulated sound to said user's right ear; determining an arrival time of said corresponding simulated sound to said user's right ear; playing said corresponding simulated sound on a speaker for said user's right ear at said arrival time of said corresponding simulated sound to said user's right ear; determining a distance from said corresponding simulated sound to said user's left ear; determining an arrival time of said corresponding simulated sound to said user's left ear wherein said arrival time of said corresponding simulated sound to said user's right ear is different from said arrival time of said corresponding simulated sound to said user's left ear; and playing said corresponding simulated sound on a speaker for said user's left ear at said arrival time of said simulated sound to the user's left ear. Some embodiments comprise wherein for a second time epoch, assigning an (x,y,z) coordinate for an origin of a second corresponding simulated sound; assigning an (x,y,z) coordinate to said user's right ear based on head tracking of said headset; and assigning an (x,y,z) coordinate to said user's left ear based on head tracking of said headset wherein said (x,y,z) coordinate to said user's right ear and said (x,y,z) coordinate to said user's left ear are different coordinates; determining a distance from said origin of said second corresponding simulated sound to said user's right ear; determine an arrival time of said second corresponding simulated sound to said user's right ear; playing said second corresponding simulated sound on a speaker for said user's right ear at said arrival time of said second corresponding simulated sound to the user's right ear; determining a distance from said origin of said second corresponding simulated sound to said user's left ear; determine an arrival time of said second corresponding simulated sound to said user's left ear wherein said arrival time of said second corresponding simulated sound to said user's right ear is different from said arrival time of said second corresponding simulated sound to said user's left ear; and playing said second corresponding simulated sound on a speaker for said user's left ear at said arrival time of said second corresponding simulated sound to the user's left ear.

Some embodiments comprise wherein said headset has moved from said first time epoch to said second time epoch; wherein said (x,y,z) coordinate to said user's right ear at said first time epoch is different from said (x,y,z) coordinate to said user's right ear at said second time epoch; and wherein said (x,y,z) coordinate to said user's left ear at said first time epoch is different from said (x,y,z) coordinate to said user's left ear at said second time epoch.

Some embodiments comprise wherein said headset has moved via translation. Some embodiments comprise wherein said headset has moved via rotation.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides steps explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include Software programs to perform the method embodiment steps and operations Summarized above and disclosed in detail below. More particularly, a computer program product is one embodiment that has a computer-readable medium including computer program logic encoded thereon that when performed in a computerized device provides associated operations providing steps as explained herein.

The computer program logic, when executed on at least one processor with a computing system, causes the processor to perform the operations (e.g., the methods) indicated herein as embodiments of the invention. Such arrangements of the invention are typically provided as Software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other Such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as Software and hardware, or as hardware and/or circuitry alone. Such as within a data communications device. The features of the invention, as explained herein, may be employed in data processing devices and/or Software systems for Such devices. Note that each of the different features, techniques, configurations, etc. discussed in this disclosure can be executed independently or in combination. Accordingly, the present invention can be embodied and viewed in many different ways. Also, note that this Summary section herein does not specify every embodiment and/or incrementally novel aspect of the present disclosure or claimed invention. Instead, this Summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE FIGURES

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates frequencies and wavelengths for various notes for a piano.

FIG. 6A illustrates an (x, y, z) coordinate system wherein two sound sources in the 6D audio dataset (6DAD) have spatial coordinates at a first time epoch.

FIG. 6B illustrates frequencies and dBs of the two sound sources in the 6DAD at the first time epoch.

FIG. 6C illustrates an (x, y, z) coordinate system wherein three sound sources in the 6D audio dataset (6DAD) have spatial coordinates at a second time epoch.

FIG. 6D illustrates frequencies and dBs of the three sound sources in the 6DAD at the second time epoch.

FIG. 7 illustrates the origins of a 6DAD.

FIG. 8A illustrates performing recording to generate a 6DAD using a tangible, triangulating microphone array.

FIG. 8B illustrates a tangible triangulating microphone array (TTMA).

FIG. 8C illustrates placement of the TTMA in a room.

FIG. 9A illustrates a flow chart pure acquisition of a 6DAD via recording using a detached, distributed microphone array (DDMA).

FIG. 9B illustrates pure acquisition of a 6DAD via recording using a detached, distributed microphone array (DDMA).

FIG. 11 illustrates selecting a location for sound origin.

FIG. 12A illustrates generating a hybrid 6DAD.

FIG. 12B illustrates a 6DAD generated via a microphone array.

FIG. 12C illustrates a 6DAD generated via virtual speakers.

FIG. 12D illustrates integrating the 6DAD generated via the TTMA in FIG. 12B with the 6DAD generated via virtual speakers in FIG. 12C to create a hybrid 6DAD.

FIG. 12E illustrates a 6DAD operating in a Karaoke mode.

FIG. 12F illustrates a Karaoke mode with Augmented Reality (AR).

FIG. 12G illustrates a 6DAD in VR mode.

FIG. 13 illustrates determining what the 6DAD would sound like at various distances (an attenuation analysis).

FIG. 15A illustrates transforming an existing sound library to a distance dependent sound library.

FIG. 15B illustrates how different frequencies from the 6DAD will attenuate over distance in the simulation.

FIG. 18B illustrates the virtual sound produced from the virtual speaker.

FIG. 18C illustrates what a virtual microphone would hear from the virtual speaker.

FIG. 18D illustrates what is played on the tangible speaker in the user's left ear.

FIG. 18E illustrates what is played on the tangible speaker in the user's right ear.

FIG. 22A illustrates a first smart headset configurations wherein a left speaker is aligned with a user's left ear and a right speaker is aligned with the user's right ear.

FIG. 22B illustrates a second smart headset configurations wherein a left speaker is aligned with a user's left ear and a right speaker is aligned with the user's right ear.

FIG. 22C illustrates a third smart headset configurations wherein a left speaker is aligned with a user's left ear and a right speaker is aligned with the user's right ear and wherein an augmented reality (or mixed reality) glasses are incorporated.

FIG. 22D illustrates a fourth smart headset configurations wherein a left speaker is aligned with a user's left ear and a right speaker is aligned with the user's right ear and wherein a virtual reality glasses are incorporated.

FIG. 22E illustrates a second smart headset configurations wherein speakers are aligned in a planar fashion.

FIG. 22F illustrates a third smart headset configuration wherein speakers are aligned in a non-planar fashion.

FIG. 22G illustrates smart headset features.

FIG. 23 illustrates for a 6DAD, determining what sound would be received by a left ear and what sound would be received by a right ear?

FIG. 34 illustrates determining what the 6DAD would sound like at various distances (an attenuation analysis).

FIG. 35A illustrates an example of manipulating a location of a sound coordinate within the 6DAD.

FIG. 35B illustrates a flow chart depicting manipulating a location of a sound coordinate within the 6DAD.

FIG. 36A illustrates an example of manipulating a timing of a sound source within the 6DAD.

FIG. 36B illustrates the timing of notes for three members of the band.

FIG. 36C illustrates the timing of notes for three members of the band after adjustment.

FIG. 36D illustrates a flow diagram for manipulating the timing of a sound source within the 6DAD.

FIG. 37A illustrates an example of manipulating a sound of a sound source within the 6DAD.

FIG. 37B illustrates the notes for three members of the band.

FIG. 37C illustrates the notes for three members of the band after adjustment.

FIG. 37D illustrates a flow diagram for manipulating the sound of a sound source within the 6DAD.

FIG. 38A illustrates a top down view of a multi-microphone smart helmet.

FIG. 38B illustrates a side view of a multi-microphone smart helmet.

FIG. 38C illustrates a flow diagram for using the multi-microphone smart helmet.

FIG. 38D illustrates a flow diagram for using the multi-microphone smart helmet.

DETAILED DESCRIPTIONS

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

FIG. 1 illustrates frequencies and wavelengths for various notes for a piano. The notes with their associated octave, frequency (Hz) and wavelength (cm) are illustrated assuming frequency 70° F. and 50% humidity with a speed of sound of 34,468 cm/s.

Figure 2:
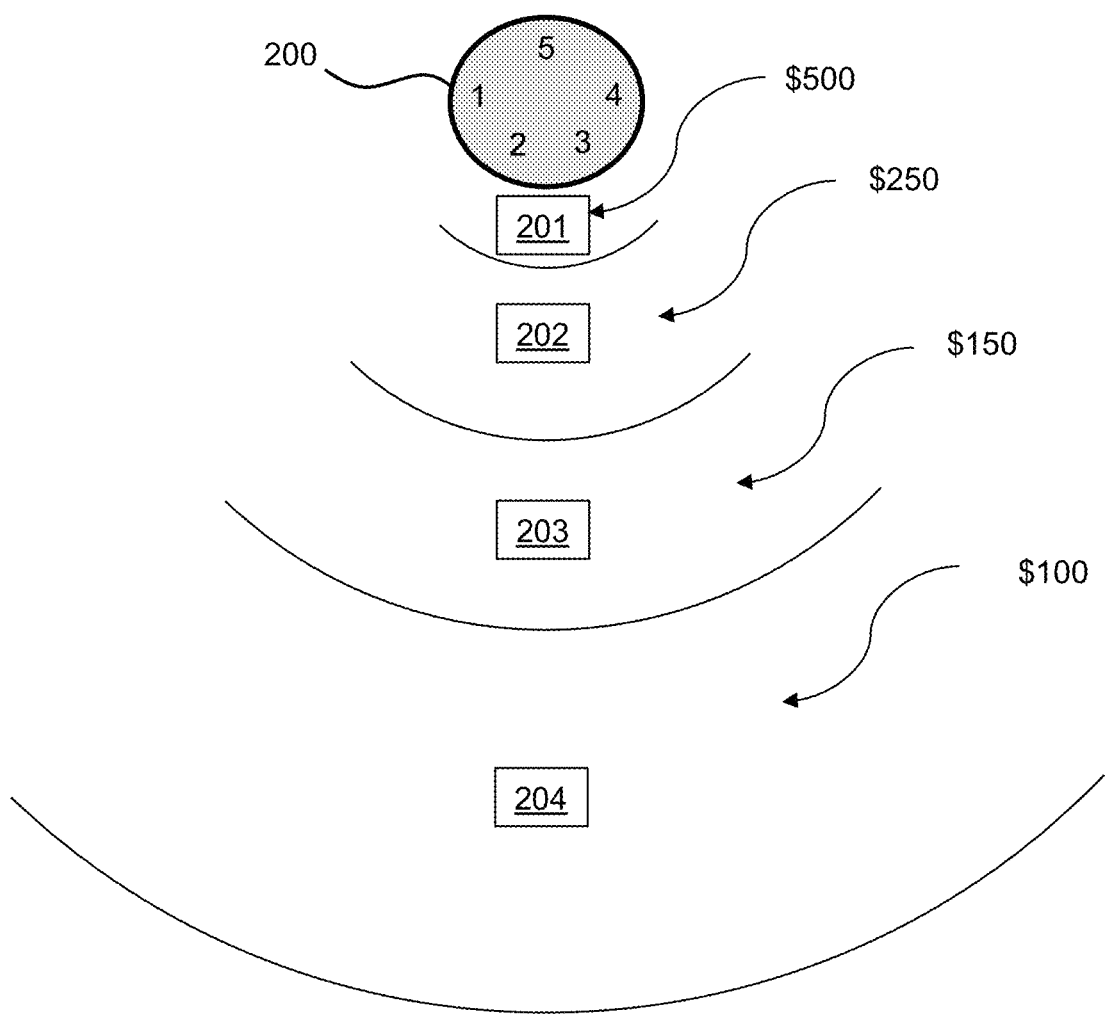
FIG. 2 illustrates a top down view of a concert.

FIG. 2 illustrates a top down view of a concert. 200 illustrates the stage where 5 performers are located, which are numbered 1, 2, 3, 4, and 5. 201 illustrates a first section of the stage where the best seats in the stadium are located, which cost $500 per seat. 202 illustrates a second section of the stage where the second tier seats in the stadium are located, which cost $250 per seat. 203 illustrates a third section of the stage where the third tier seats in the house are located, which cost $150 per seat. 204 illustrates a fourth section of the stage where the cheapest seats in the house are located, which cost $100 per seat.

A key purpose of this patent application is to provide a person who can only afford the cheap seats at concert with the same quality and richness of music as a person with the best seat in the house. (Note: incidentally, the person who has the best seat in the house most likely paid much more than the person sitting in the cheap seats. An analogous situation where seats all cost the same and the person who arrives first gets a great seat and the late corners are well back in the crowd.)

How, one would ask, how is it possible for this jump in the quality and richness for this to happen? The simple answer is a six dimensional (6D) audio dataset (6DAD). Next, one would ask, what in the world is a 6DAD? Everyone knows there are only 3 dimensions in this world—length, width, and height. Well, also, maybe you could add time. But, that's it—period. Well, the guy in the cheap seats is dealing quality and richness (or lack thereof) of the sounds he hears. But sounds are very complex: some are loud, some are soft; some have a high pitch and some have a low pitch. And, at a concert, they are all mixed together. Take a stringed instrument one string has a high note and another string not has a low note and these notes are all scrambled together. And, there is an amplitude associated with each note.

Focus next on the graph of the frequencies (i.e., high, low, and somewhere in-between pitches) and amplitudes (i.e., a scale in decibels to represent degree of loudness or softness of the sound). The best seat in the house has a rich array of frequencies each of which has sufficient amplitude to provide a high quality and rich experience during the concert. On the other hand, the cheap seat, due to the distance from the orchestra, hear a different set of sounds due to attenuation of both the amplitude and frequencies. And, differing frequencies attenuate at different rates based on range from the sound. Some of the high notes of a stringed instrument are barely audible. The result is, for the cheap seat, a lesser quality and richness of the sounds at that location. In other words, both the volume (in dB) and the frequencies (in Hz) change from one location in the theatre to another.

But then comes another imponderable question—what if you missed the concert and wanted to live the experience you missed as if you were located at the best seat in the house? Please stay tuned—no pun intended.

Figure 3A:
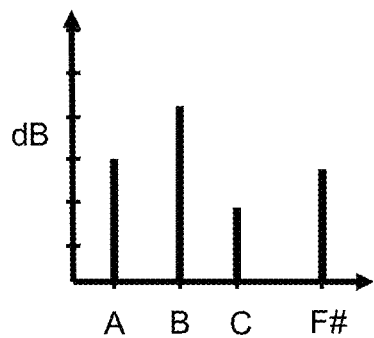
FIG. 3A illustrates a set of frequencies and associated amplitudes (in dB) at the best seat in the house at a first time point.

FIG. 3A illustrates a set of frequencies and associated amplitudes (in dB) at the best seat in the house at a first time point. Notes A, B, C and F #are illustrated with varying amplitudes.

Figure 3B:
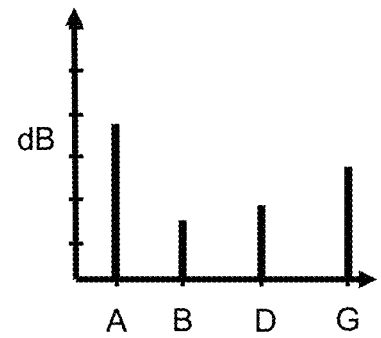
FIG. 3B illustrates a set of frequencies and associated amplitudes (in dB) at the best seat in the house at a second time point.

FIG. 3B illustrates a set of frequencies and associated amplitudes (in dB) at the best seat in the house at a second time point. Notes A, B, D and G are illustrated with varying amplitudes.

Figure 3C:
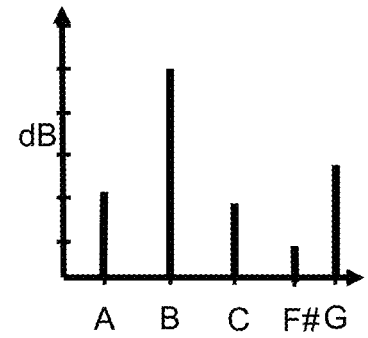
FIG. 3C illustrates a set of frequencies and associated amplitudes (in dB) at the best seat in the house at a third time point.

FIG. 3C illustrates a set of frequencies and associated amplitudes (in dB) at the best seat in the house at a third time point. Notes A, B, C, F #and G are illustrated with varying amplitudes.

Figure 3D:
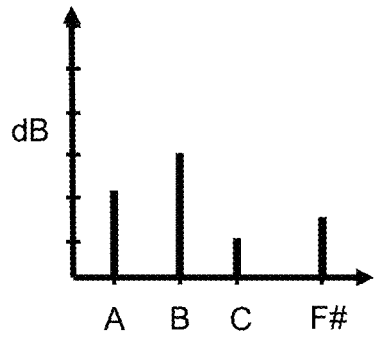
FIG. 3D illustrates a set of frequencies and associated amplitudes (in dB) at a lower quality seat in the house at a first time point.

FIG. 3D illustrates a set of frequencies and associated amplitudes (in dB) at a lower quality seat in the house at a first time point. Notes A, B, C and F #are illustrated with a set of amplitudes slightly lower and slightly altered with respect to as would be experienced at the best seat in the house at the first time point in FIG. 3A.

Figure 3E:
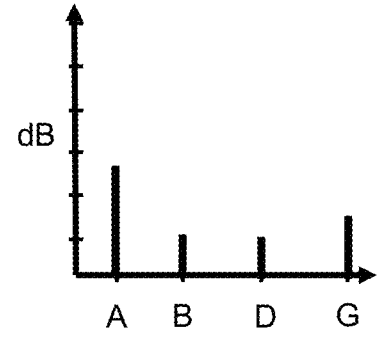
FIG. 3E illustrates a set of frequencies and associated amplitudes (in dB) at the best seat in the house at a second time point.

FIG. 3E illustrates a set of frequencies and associated amplitudes (in dB) at the best seat in the house at a second time point. Notes A, B, D and G are illustrated with a set of amplitudes slightly lower and slightly altered with respect to as would be experienced at the best seat in the house at the first time point in FIG. 3B.

Figure 3F:
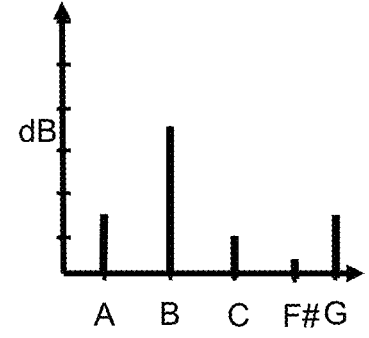
FIG. 3F illustrates a set of frequencies and associated amplitudes (in dB) at the best seat in the house at a third time point.

FIG. 3F illustrates a set of frequencies and associated amplitudes (in dB) at the best seat in the house at a third time point. Notes A, B, C, F #and G are illustrated with a set of amplitudes slightly lower and slightly altered with respect to as would be experienced at the best seat in the house at the first time point in FIG. 3C.

Figure 4:
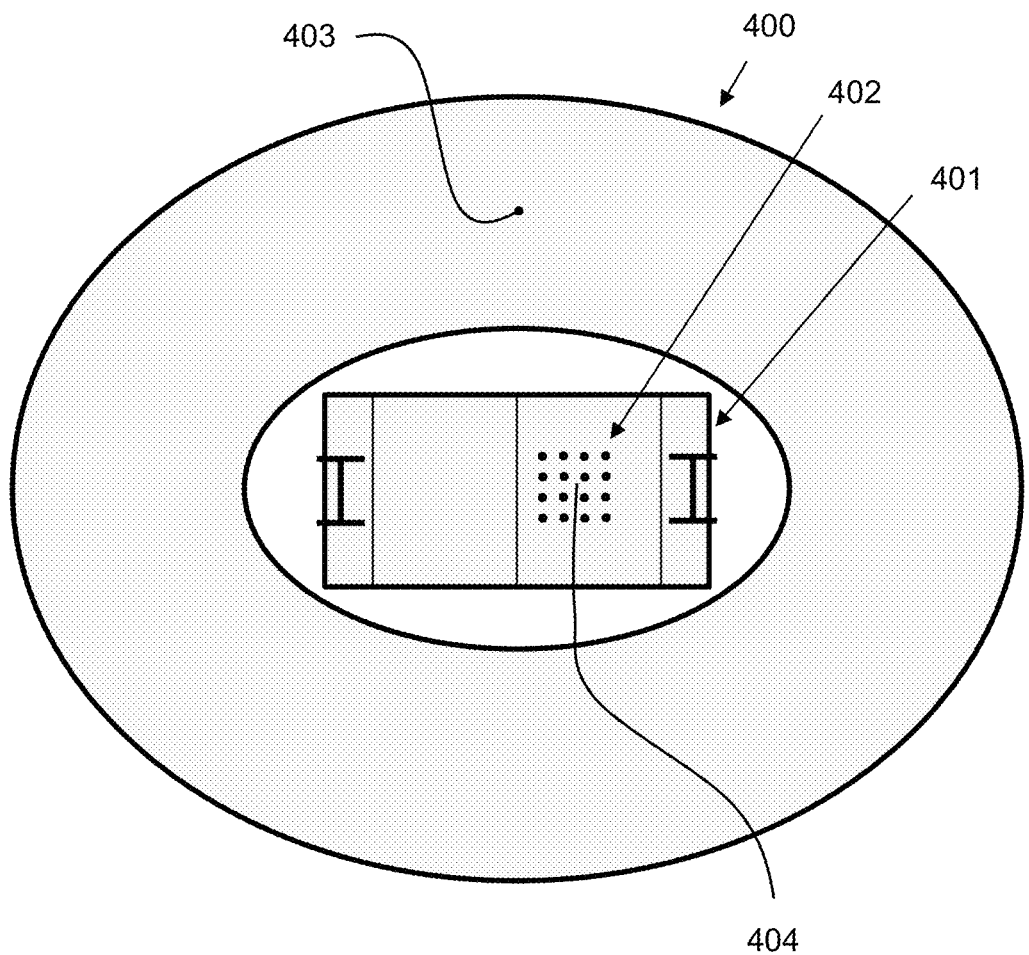
FIG. 4 illustrates a top down view of a football game wherein there is a band playing and noise generated from the crowd.

FIG. 4 illustrates a top down view of a football game wherein there is a band playing and noise generated from the crowd. 400 illustrates the stadium seating. 401 illustrates the football field. 402 illustrates a 16-member band. 403 illustrates a fan sitting at the 50-yard line. 404 illustrates a middle of he band position.

Figure 5A:
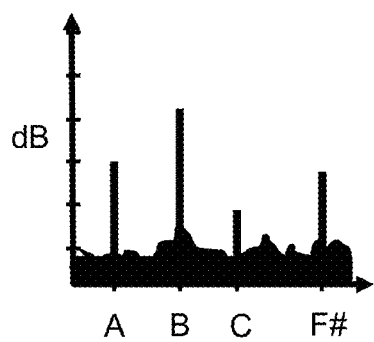
FIG. 5A depicts a different scenario context situation wherein a set of frequencies and amplitudes thereof for marching in the band at a first time point (t=1) with some multi frequency crowd noise.

FIG. 5A depicts a different scenario context situation wherein a set of frequencies and amplitudes thereof for marching in the band at a first time point (t=1) with some multi frequency crowd noise. In this example, the 'best seat in the house' translates to marching alongside the leader of the band—I want to be in the band (or at least hear all the music as if I were actually leading the band)! Most people can't be in the band if only because they are not a registered student at the college. Ah, what abut sitting on the 50 yard line. Well, again, hard to get a seat there but that's about the best seat in the stadium for hearing the band. And then, there are cheap seats in the bleachers. And, what about the noise: people cheering, vendors selling soft drinks and peanuts. The sounds of the band compete with all the extraneous sounds. The notes that are played by the band during this first time point include A, B, C and F #. Note that there is some additional dB from crowd noise as shown as the low level noise. To a musician in the band, all of the notes played by the band stand out above the crowd noise.

Figure 5B:
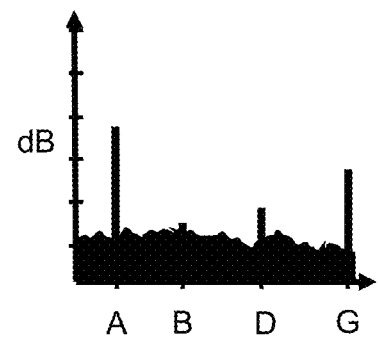
FIG. 5B depicts a different scenario context situation wherein a set of frequencies and amplitudes thereof for marching in the band at a second time point (t=n) with some multi frequency crowd noise.

FIG. 5B depicts a different scenario context situation wherein a set of frequencies and amplitudes thereof for marching in the band at a second time point (t=n) with some multi frequency crowd noise. The sounds of the band compete with all the extraneous sounds. The notes that are played by the band during this first time point include A, B, D and G. Note that there is some additional dB from crowd noise as shown as the low level noise. To a musician in the band, all of the notes played by the band stand out above the crowd noise.

Figure 5C:
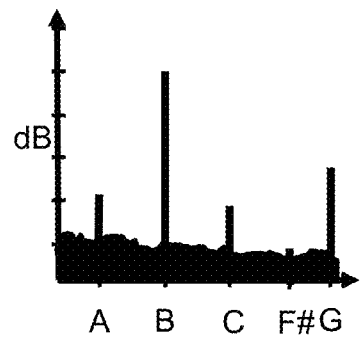
FIG. 5C depicts a different scenario context situation wherein a set of frequencies and amplitudes thereof for marching in the band at a third time point (t=p) with some multi frequency crowd noise.

FIG. 5C depicts a different scenario context situation wherein a set of frequencies and amplitudes thereof for marching in the band at a third time point (t=p) with some multi frequency crowd noise. The sounds of the band compete with all the extraneous sounds. The notes that are played by the band during this first time point include A, B, C, F #and G. Note that there is some additional dB from crowd noise as shown as the low level noise. To a musician in the band, all of the notes played by the band stand out above the crowd noise.

Figure 5D:
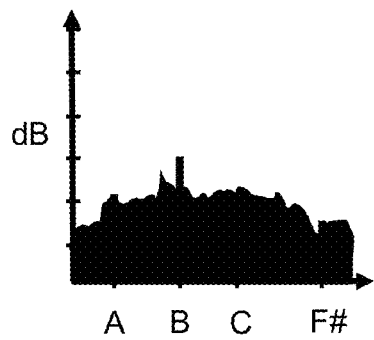
FIG. 5D illustrates a different set of frequencies and amplitudes thereof for sitting in the crowd at a first time point (t=1) with multi frequency crowd noise.

FIG. 5D illustrates a different set of frequencies and amplitudes thereof for sitting in the crowd at a first time point (t=1) with multi frequency crowd noise. The sounds of the band compete with all the extraneous sounds from the crown. The notes that are played by the band during this first time point include A, B, C and F #. Note that there is significant dB from crowd noise as shown as the high level of noise. To an observer in the crowd, only the B notes played by the band stands out above the crowd noise and the A, C and F #can not readily be distinguished over the crowd noise. Therefore, to the observer in the crowd, the richness of the music is significantly diminished. This richness would vary based on location within the stadium. For example, a person on the goal line would hear a different set of noise and different amounts of attenuation of the music. A person at the 50-yard line would hear yet a different set of noise and different amounts of attenuation of the music being played. Also, the amplitude and diversity of frequencies would change as the band marches down the field. For the 50-yard line seat, the amplitude increases and audibility of the diverse set of frequencies improves as the band approaches the 50-yard line and then decreases as the band has passed. For the cheap seat with the band at the far goal line, audibility of the band and their music over the crowd noise is marginal. The audibility increase as the band approaches but does not reach that of the seat on the 50-yard line when the band is at mid field. But then comes another imponderable question—what if you missed the game and wanted to live the experience you missed as if you were located with the leader of the band as he/she marched down the field? Please stay tuned—no pun intended.

Figure 5E:
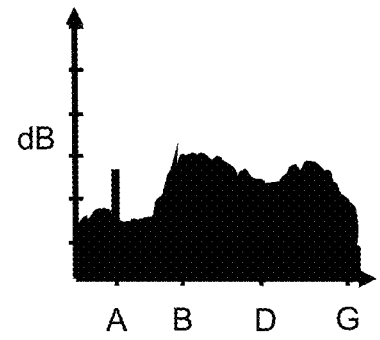
FIG. 5E illustrates a different set of frequencies and amplitudes thereof for sitting in the crowd at a second time point (t=n) with multi frequency crowd noise.

FIG. 5E illustrates a different set of frequencies and amplitudes thereof for sitting in the crowd at a second time point (t=n) with multi frequency crowd noise. The sounds of the band compete with all the extraneous sounds from the crown. The notes that are played by the band during this first time point include A, B, D and G. Note that there is significant dB from crowd noise as shown as the high level of noise. To an observer in the crowd, only the A notes played by the band stands out above the crowd noise and the B, D, and G can not readily be distinguished over the crowd noise. Therefore, to the observer in the crowd, the richness of the music is significantly diminished.

Figure 5F:
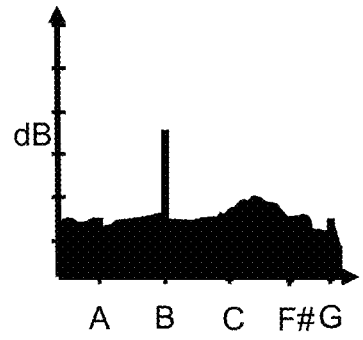
FIG. 5F illustrates a different set of frequencies and amplitudes thereof for sitting in the crowd at a third time point (t=p) with multi frequency crowd noise.

FIG. 5F illustrates a different set of frequencies and amplitudes thereof for sitting in the crowd at a third time point (t=p) with multi frequency crowd noise. The sounds of the band compete with all the extraneous sounds from the crown. The notes that are played by the band during this first time point include A, B, C, F #and G. Note that there is significant dB from crowd noise as shown as the high level of noise. To an observer in the crowd, only the B notes played by the band stands out above the crowd noise and the A, C, F #and G can not readily be distinguished over the crowd noise. Therefore, to the observer in the crowd, the richness of the music is significantly diminished.

FIG. 6A illustrates an (x, y, z) coordinate system wherein two sound sources in the 6D audio dataset (6DAD) have spatial coordinates at a first time epoch. In the preferred embodiment, a 3D spatial coordinate system, such as a Cartesian coordinate system, is used. Note the x-axis, y-axis and z-axis. This illustration represents a time epoch, t=1. Spatial coordinates are used in a 6D audio dataset. In this 6DAD, a first location "A" with a first (x, y, z) coordinate would be used for a first sound. Also, in this 6DAD, a second location "B" with a second (x, y, z) coordinate would be used for a second sound. In the preferred embodiment, the 6DAD is spatially registered to an area. Elsewhere in this patent, the term "virtual speaker" is used, which indicates a location within space where the sound originates. A user wearing the smart headset could walk up to the virtual speaker, turn his or her head, duck behind a couch and would be have an experience as if the speaker was actually there.

FIG. 6B illustrates frequencies and dBs of the two sound sources in the 6DAD at the first time epoch. This first time epoch illustrates sound originating from two locations within an area. In some embodiments, time epochs could vary in duration. For example, a high temporal resolution 6DAD could have time epochs of 20 ns. Other 6DADs could have lower temporal resolutions, such as time epochs of 1 msec, 5 msec, 10 msec or >10 msec in duration. So, for FIG. 1B, assume a time epoch beginning at the start and lasting 1 msec in duration, so it would last from 0-1 msec. 600*a* illustrates a sound coming from a first location A with 5 dB at 5000 Hz. 601*a* illustrates a sound coming from the first location A with 20 dB at 20,000 Hz. 602*a* illustrates a sound coming from a second location B with 25 dB at 200 Hz. 603*a* illustrates a sound coming from the second location B with 30 dB at 900 Hz.

FIG. 6C illustrates an (x, y, z) coordinate system wherein three sound sources in the 6D audio dataset (6DAD) have spatial coordinates at a second time epoch. Sound sources A and B are in the same location. Sound source C is new.

FIG. 6D illustrates frequencies and dBs of the three sound sources in the 6DAD at the second time epoch. So, for FIG. 6D, assume a time epoch beginning at the end of the first time epoch and lasting 1 msec in duration, so it would last from 1 msec to 2 msec. 600*b* illustrates a sound coming from the first location A with 30 dB at 5000 Hz, which has changed in dB as compared to 600*a*. 601*b* illustrates a sound coming from the first location A with 20 dB at 19,000 Hz, which has changed in frequency as compared to 601*a*. 602*b* illustrates a sound coming from the second location B with 25 dB at 200 Hz, which has not changed as compared to 602*a*. 603*b* illustrates a sound coming from the second location B with 30 dB at 900 Hz, which has not changed as compared to 603*a*. 604*b* illustrates a sound coming from a third location with C 30 dB at 30 Hz, which is new. Thus, at the second time interval some of the sounds are the same as the first time epoch, some of the sounds have changed as compared with the first time epoch and some of the sounds are new. In this example the third location C would have a third (x,y,z) coordinate. In this example, the third (x,y,z) coordinate is different from both the first (x,y,z) coordinate and the second (x,y,z) coordinate.

FIG. 7 illustrates the origins of a 6DAD. The first origin of a 6DAD is via recording of sound from an area to generate the 6DAD.

Two methods are disclosed herein. The first method comprises the use of a tangible, triangulating microphone array (TTMA), which will be discussed in greater detail later in this patent. The second method comprises the use of a detached, distributed microphone array (DDMA), which will also be discussed in greater detail later in this patent.

The second origin of a 6DAD is via pure simulation via a virtual speaker system. This comprises a assignment of (x, y, z) coordinate to a sound to build the 6DAD, which will also be discussed in greater detail later in this patent. Note that in some embodiments, the computer generated sounds can be downloaded from a library of sounds.

The third origin of a 6DAD is via a hybrid wherein some sounds are acquired via a microphone and other sounds are computer generated.

FIG. 8A illustrates performing recording to generate a 6DAD using a tangible, triangulating microphone array. The basic idea of this patent is to create and record a six-dimensional (6D) dataset consisting of a sound source (i.e., frequency and amplitude/decibels (dB)) at a specific location (i.e., x, y, z coordinates) over time (t). The dataset will be denoted (x, y, z, t, frequency and associated dB) i.e., 6D. This 6D dataset can then be replayed at a different time and a different place to a listener who is at some specific location with respect to the sound source and its location. This is the critical novelty.

Consider a real-world example wherein the sound of a guitar (i.e., sound source-frequencies and dBs)) being played by a guitar played up on a stage (i.e., x, y, z coordinate) is being recorded over time (t). Then comes the novel portion: some future listener can transport that 6D dataset to his/her own personal coordinate system, say the future listener selects 10 feet away from the stage which is elevated 6 feet with respect to the listener and plays the recorded 6D dataset. For example, in this hypothetical situation the dataset might as heard by the listener might be (x+10, y, z−6, t, frequencies 1 and 2 for two strings on the guitar, each at 90 dB). Note that, as will be discussed in later figures, the dBs attenuate as a function distance. Also, the different frequencies attenuate at different rates also as a function of distance. Suppose next that the listener chose to be 100 feet away from the listener. The resulting data set might be (x+100, y, z−6, frequency 1 at 85 dB and frequency 2 at 75 dB). The listener could turn their left or right and it would be like being at a concert and looking around. Head tracking is implemented. The ear closest to the guitar played would have a slightly higher level of sound (i.e., dBs) and with a slightly different amount of attenuation from the user's head. Thus, the hypothetical listener could try different distances and find the best placement for his/her personal listening preferences. The user could implement additional options, including but not limited to the following: arbitrarily alter the volume of all frequencies; place virtual objects in between the sound source(s) and the user to alter what it would sound like even more. Note that in some instances, the listener would be wearing a headset such that head orientation with respect to the sound source would produce a different sound experience for the left ear than for the right ear, depending on the orientation. 800 illustrates using a microphone array with the microphones each having a unique location (i.e., x, y, z). Preferred embodiment is a microphone array comprising at least 4 microphones arranged in a spatially fixed, non-co-planar fashion. 801 illustrates performing a longitudinal (i.e., over time) recording of sounds (frequency and dB) in an area using each microphone in the microphone array. 802 illustrates using the differential arrival time of the sounds at the different microphones in the array to triangulate the (x, y, z) location of the origin of the sound. Analysis such as Fourier transform can be used in this step and elsewhere in this patent. This will also allow determining a distance from a microphone in the microphone array to the location where the sound originated from. 803 illustrates wherein for each sound, using the determined distance a microphones in the array and an attenuation model, determine the frequency, the amplitude and the time when the sound originated from the origin. Note that the attenuation model would be going backwards to determine the sound (frequency and amplitude) at the origin. 804 illustrates storing the determined (x, y, z) location of the origin of the sound, the time when the sound originated from the origin, the determined frequency, and the determined amplitude to as a 6 dimensional (6D) dataset (x, y, z, t, frequency, dB).

Some future listener can transport that 6DAD to his/her own personal coordinate system, such as the back yard. The position of the listener could be changed to a position which the listener considers to be a more pleasurable position for listening to the sounds/music. A video of the scene could be captured and displayed using techniques described in Ser. No. 17/225,610, AN IMPROVED IMMERSIVE VIEWING EXPERIENCE and Ser. No. 17/237,152, AN IMPROVED IMMERSIVE VIEWING EXPERIENCE. Additionally, the 6DAD could also accompany virtual reality games, such as FaceBook's new Metaverse. Also, the position of each individual microphone could be repositioned. This would result in an alteration of an (x, y, z) coordinate of a sound in the 6DAD. For example, if the listener considered the drums to be too loud, then the listener could position the drums further away from the listener's position and the drums volume would be decreased commensurately. Such improvements could be accomplished via hand gestures or voice commands using virtual reality applications.

Note that in some instances, the listener would be wearing a headset such that head orientation with respect to the sound source would produce a different sound experiment for the left ear than for the right ear, depending on the orientation. The listener can, in fact re-live the experience of being at the best seat in the house or marching alongside the leader of the band.

FIG. 8B illustrates a tangible triangulating microphone array (TTMA). 805 illustrates the frame of the TTMA. 806A illustrates a first microphone of the TTMA. 806B illustrates a second microphone of the TTMA. 806C illustrates a third microphone of the TTMA. 806D illustrates a fourth microphone of the TTMA. In this embodiment, four microphones are used. In some embodiments, more than four microphones can be used. The TTMA may have any of the following components: wifi connection; on-board computer; a lidar scanner; battery; holders for smart phones; adjustable length arms; and, a GPS like system as described in U.S. Ser. No. 15/949,202, SMART OPERATING ROOM EQUIPPED WITH SMART SURGICAL DEVICES. Note that the TTMA could include holders and smart phones could be used for the microphones. In some embodiments, a LIDAR scan of the room can be used to help generate a map of the room and consequently an attenuation map.

FIG. 8C illustrates placement of the TTMA in a room. 809 illustrates a top down view of a room, which is 23×16 feet. The x-axis and y-axis are labeled. 808 illustrates the TTMA. The TTMA is located on a 2 feet stage and the spoke is elevated one foot off the ground. The coordinates of the microphones are at: (11, 11, 3); (12, 11, 3); (11, 12, 3); and, (11.5, 11.5, 4). In some embodiments, an initialization/calibration process is performed. 807A illustrates a location of first source of sound at the time epoch, which can be determined using the TTMA. 807B illustrates a location of second source of sound at the time epoch, which can be determined using the TTMA. 807C illustrates a location of third source of sound at the time epoch, which can be determined using the TTMA. 807D illustrates a location of fourth source of sound at the time epoch, which can be determined using the TTMA. 807E illustrates a location of fifth source of sound at the time epoch, which can be determined using the TTMA. Note that the locations of these sources can move over time from time point to time point and the TTMA will thus perform triangulation in a dynamic fashion.

FIG. 9A illustrates pure acquisition of a 6DAD via recording using a detached, distributed microphone array (DDMA). A set of 4 microphones in a non-spatially fixed position is disclosed. In the preferred embodiment, these microphones would be in a non-planar configuration (i.e., there is some differences in the z positions of the microphones so that a single plane does not contain all 4 microphones). These 4 microphones could be associated with the musical instruments of members in a band instead of a single guitar player. 900 illustrates using a microphone array wherein the microphones each having a unique location (i.e., x, y, z). Preferred embodiment is an unattached microphone array comprising at least 4 microphones, at least one of which is free to move throughout an area and wherein localization of each microphone can be performed. For example, a first microphone could be affixed to a base guitar, a second microphone affixed to an electric guitar, a third microphone affixed to a drum set and a fourth microphone affixed to the microphone for the singer. Note that the both the base guitarist and the electric guitarist may move around during the concert. The drummer and the microphone for the singer would be fixed in location. Since some of the microphones are moving, this configuration would be a detached, distributed microphone array (DDMA). Note that a tracking system for each microphone is required for the DDMA. Such tracking systems are describe in U.S. patent application Ser. No. 15/949,202, SMART OPERATING ROOM EQUIPPED WITH SMART SURGICAL DEVICES. 901 illustrates performing a longitudinal (i.e., over time) recording of sounds (frequency and dB) in an area using each microphone in the microphone array. As the band played over time, the music from the 4 microphones would be simultaneously recorded. The 6D datasets could look like: $(x_1, y_1, z_1, t,$ frequency 1–n and associated dBs); $(x_2, y_2, z_2, t,$ frequency 1–m and associated dBs); $(x_3, y_3, z_3, t,$ frequency 1–p and associated dBs); $((x_4, y_4, z_4, t,$ frequency 1–q and associated dBs). Note that if the alignment happened to be linear or planar, then localization would be limited during these time points and would require estimation. Additionally, given that the microphone array is mobile, a correction factor for doppler effect can be implemented for improved performance. 902 illustrates using the differential arrival time of the sounds at the different microphones in the array to triangulate the (x, y, z) location of the origin of the sound. This will also allow determining a distance from a microphone in the microphone array to the location where the sound originated from. 903 illustrates wherein, for each sound, using the determined distance a microphones in the array and an attenuation model, determine the frequency, the amplitude and the time when the sound originated from the origin. 904 illustrates store the determined (x, y, z) location of the origin of the sound, the time when the sound originated from the origin, the determined frequency, and the determined amplitude to as a 6DAD (x, y, z, t, frequency, dB). When playback occurs, all of the recorded sounds (i.e., frequency and associated dB) would be merged into a single set of sounds.

Some future listener can transport that 6D dataset to his/her own personal coordinate system. The position of the listener could be changed to a position which the listener considers to be a more pleasurable position for listening to the sounds/music. Also, the position of each individual microphone could be repositioned. For example, if the listener considered the drums to be too loud, then the listener could position the drums further away from the listener's position and the drums volume would be decreased commensurately.

Note that the collection of the 6D different that that of the prior art. The current collection positions a single microphone at a central point and the sounds all merge there. The novelty in this patent application is that individual sounds are collected and recorded at the originating point i.e., its particular location. When playback occurs, the listener is not fixed to the exact location where the microphone was, per the current collection technique. Rather the listener can choose his/her location wherever they choose and that is where the music would sound if the listener were actually at that location while the music was being recorded. And, further, the listener can, at their control, reposition the members of the band according too their liking.

Note that in some instances, the listener would be wearing a headset such that head orientation with respect to the sound source would produce a different sound experiment for the left ear than for the right ear, depending on the orientation. The listener can, in fact re-live the experience of being at the best seat in the house or marching alongside the leader of the band.

FIG. 9B illustrates pure acquisition of a 6DAD via recording using a detached, distributed microphone array (DDMA). 905 illustrates a room (e.g., recording studio) equipped with a set of transmitters and receivers, as are described in U.S. patent application Ser. No. 15/949,202, SMART OPERATING ROOM EQUIPPED WITH SMART SURGICAL DEVICES. The room or area can be configured to help determine the location of the microphones.

906 illustrates a microphone on a stand, with a first microphone in the DDMA, which could be mobile at some portions of a concert if the singer picked up the microphone and walked around. 907 illustrates the microphone attached to a drum set, which is a second microphone in the DDMA. 908 illustrates the microphone attached to a base guitar, which is a third microphone in the DDMA. 909 illustrates the microphone attached to an electric guitar, which is a fourth microphone in the DDMA.

Figure 10A:
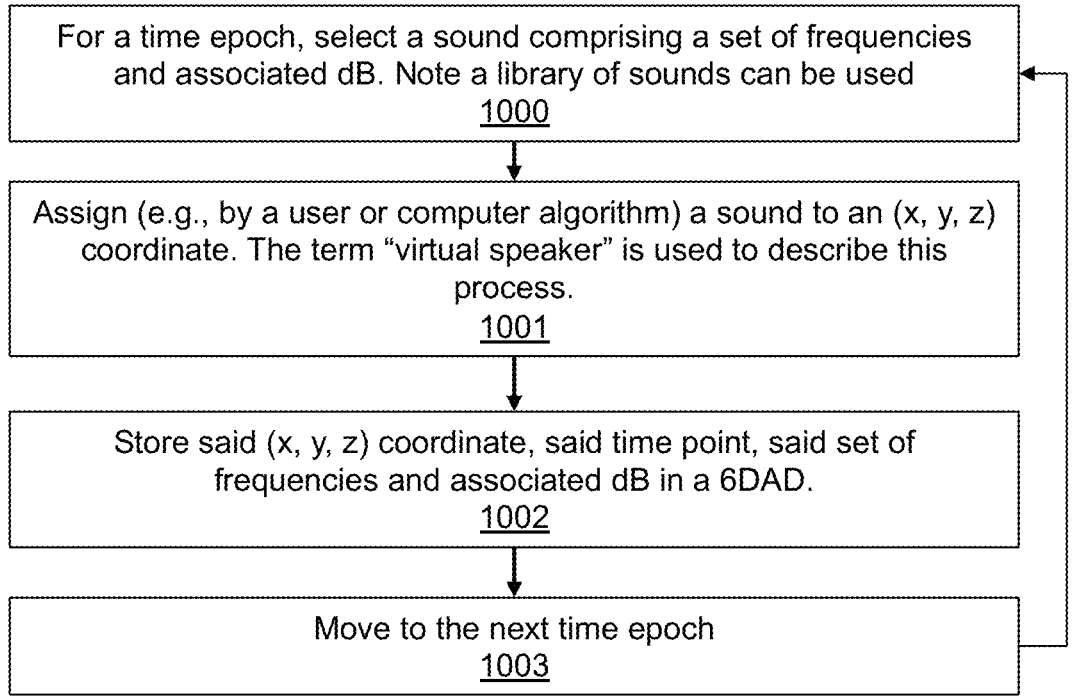
FIG. 10A illustrates a flow chart illustrating simulation of a 6DAD via a virtual speaker system.

FIG. 10A illustrates a flow chart illustrating simulation of a 6DAD via a virtual speaker system. 1000 illustrates wherein for a time point, select a computer generated sound comprising a set of frequencies and associated dB. Select (e.g., by a user, by a computer) a set of frequencies (e.g., 40 Hz, 90 Hz, 160 Hz). Each frequency will be associated with a dB. For example, the 40 Hz frequency is associated with 50 dB. The 90 Hz frequency is associated with 70 dB. The 160 Hz frequency is associated with 30 dB. Examples of the sound include, but are not limited to, the following: music; voices; vehicle sounds; outdoors sounds; machine sounds; and, others. 101 illustrates assigning (e.g., by a user or computer algorithm) a sound to an (x, y, z) coordinate. 102 illustrates storing said (x, y, z) coordinate, said time point, said set of frequencies and associated dB in a 6DAD. 1003 illustrates moving to the next time epoch.

Figure 10B:
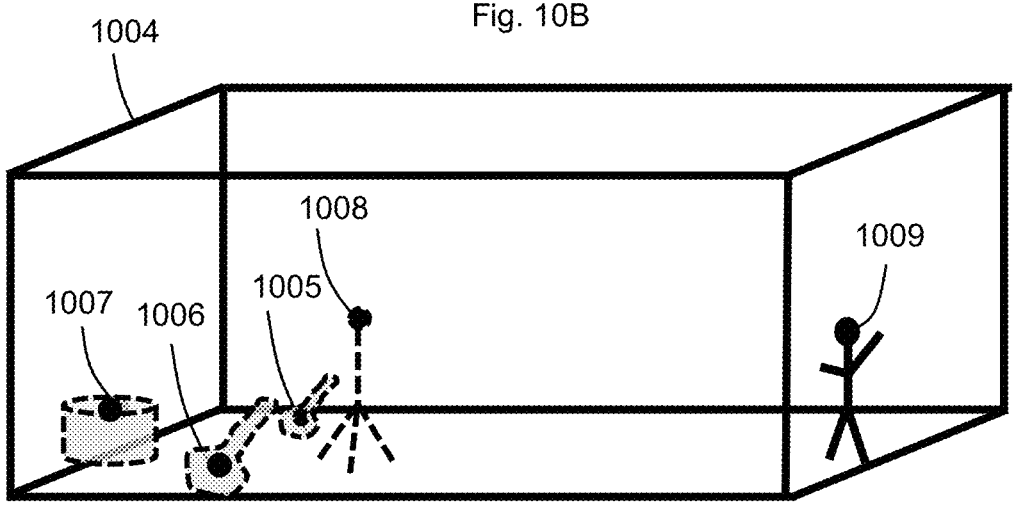
FIG. 10B illustrates a visual representation of a simulation of a 6DAD via using a virtual speaker system.

FIG. 10B illustrates a visual representation of a simulation of a 6DAD via using a virtual speaker system. 1004 illustrates an area. This area can be spatially mapped, such as is performed using a camera system on board the HoloLens 2. 1005 illustrates a first virtual speaker, which is playing electric guitar sounds and would be assigned a first set of (x, y, z) coordinate(s). 1006 illustrates a second virtual speaker, which is playing base guitar sounds and would be assigned a second set of (x, y, z) coordinate(s). 1007 illustrates a third virtual speaker, which is playing drum sounds and would be assigned a third set of (x, y, z) coordinate(s). 1008 illustrates a fourth virtual speaker, which is playing a voice and would be assigned a fourth set of (x, y, z) coordinates. Thus, the various virtual speakers can be positioned in the same area and a fusion of sound is created. Note that any of the data of the 6DAD could be manipulated by a user after it was generated. For example, a user could move the virtual speaker on the drums farther away. The user could of course walk around to different portions of the room to hear the sounds from different locations and orientations.

FIG. 11 illustrates selecting a location for sound origin. The first set of options provided herein comprise wherein the (x, y, z) coordinate of the sound is positioned in accordance with a virtual object. For example, it could be affixed on a virtual object, within a virtual object or surrounding the virtual object. The virtual object can be one used in mixed reality applications, augmented reality applications, and virtual reality applications. For example, assume that a babbling brook sound is affixed to a virtual object of a babbling brook. Note that several coordinates could be used for sound generators for the babbling brook. For example, for an augmented reality application of history in a museum with the historical figure of George Washington, the location of the virtual sound from his voice could be mapped to his mouth, the location of the virtual sound from his hand scratching his jacket sleeve could be mapped to the jacket sleeve and the virtual sound from his footsteps while walking could be mapped to the floor. In some embodiments, the virtual object is visible. In some embodiments, the virtual object is not visible. This could be used in a fun videogame wherein a user tries to localize the sound to a spot. For example, an invisible sound is coming from some (x, y, z) coordinate and a the goal is to localize it by methods such as head turns and listening for changes in time of arrival, changes in frequency, changes in dB. A feature of this planned video game is annotating where the user thinks the sound is coming from, such as placing a box where it is coming from.

The second set of options provided herein comprise wherein the (x, y, z) coordinate of the sound is positioned in accordance with a tangible object. For example, the location of the origin of sound can be mapped to a tangible object, which include, but are not limited to the following: coordinates within a non-movable spatially mapped area (e.g., a living room); movable tangible objects (e.g., person, handheld items, headset). For example, the babbling brook sound could be placed at the entrance of an office where a professor works so as to create a calming study environment where the professor works. So, every time the professor puts on the smart headset, he hears the babbling brook sound at the entrance of the office. Also note that a first user might prefer to listen to the babbling brook at 10 feet whereas another user might prefer to listen to the babbling brook at 40 feet, so the position could be adjusted per user preference.

The third set of options provided herein comprise wherein the (x, y, z) coordinate of the sound is not positioned in accordance with a virtual object and also not positioned in accordance with a tangible object. For example, the location of the origin could be movable independent of a virtual object and also of the tangible object. For example, a sound could seem to come pass nearby a user and then farther away from the user, so it is not positioned in accordance with a virtual object and also not positioned in accordance with a tangible object. This could be performed to generate desirable sound effects, like a nearby passing train. A popular exercise program in 2021 is the Peloton team workout. The patented methods, software and apparatuses disclosed in this patent can enhance the user experience of the Peloton because it can generate realistic, geo-registered sounds wherein the user can move or turn his or her head and hear the scene differently during a Peloton ride. Similarly, video game sound quality will be significantly enhanced.

FIG. 12A illustrates generating a hybrid 6DAD. 1200 illustrates using a 6DAD generated from a microphone array as described in FIGS. 9 and 10. 1201 illustrates using a virtual speaker to the 6DAD as described in FIG. 11. The virtual speaker can play a range of computer generated or recorded sounds (e.g., a singer). 1202 illustrates merge the 6DAD in 1200 with the virtual speaker in 1201.

FIG. 12B illustrates a 6DAD generated via a microphone array. 1203 illustrates an area where the 6DAD is generated, such as a recording studio in Detroit. In this example, the 6DAD is generated using a TTMA 1204. 1205 illustrates an electric guitar, which will have an (x, y, z) coordinate. 1206 illustrates a drum set, which will have an (x, y, z) coordinate. A camera system can also be performed to improve the viewing experience.

FIG. 12C illustrates a 6DAD generated via virtual speakers. 1207 illustrates a studio in Los Angeles where a woman 1208 is singing. This recording can be assigned to (x, y, z) coordinates to generated a 6DAD. A camera system can also be performed to improve the viewing experience.

FIG. 12D illustrates integrating the 6DAD generated via the TTMA in FIG. 12B with the 6DAD generated via virtual speakers in FIG. 12C to create a hybrid 6DAD. 1209 illustrates a living room in Orlando, Fla. where the 6DAD is being listened to. 1210 illustrates the location in the living room in Orlando, Fla. where the sound from the woman's voice is originating from, which corresponds to the 6DAD in FIG. 12C. 1211 illustrates the location in the living room in Orlando, Fla. where the sound from the electric guitar is originating from, which corresponds to the 6DAD in FIG. 12B. 1212 illustrates the location in the living room in Orlando, Fla. where the sound from the drum set is originating from, which corresponds to the 6DAD in FIG. 12B. 1213 illustrates a user in the Orlando, Fla. living room wearing the headset and hearing the 6DAD. As discussed in this patent, the preferred embodiment is for the headset to have a left ear speaker, a right ear speaker and head tracking and spatial mapping capabilities. Some additional options are for a left eye display and a right eye display.

FIG. 12E illustrates a 6DAD operating in a Karaoke mode. 1214 illustrates a bar in Long Island, N.Y. 1215 illustrates a man singing Karaoke in the bar in Long Island, N.Y.

1216 illustrates the location in the bar in Long Island where the sound from the electric guitar seems to be originating from, which corresponds to the 6DAD in FIG. 12B. 1217 illustrates the location in the bar in Long Island where the sound from the drum set seems to be originating from, which corresponds to the 6DAD in FIG. 12B. A first person 1218 in the crowd and a second person 1219 in the crowd wearing the advanced headsets can hear accurate 3D mapping of not only the man signing Karaoke, but also of the drum set and the guitar, just as if in the middle of the band.

FIG. 12F illustrates a 6DAD in Karaoke mode with Augmented Reality (AR). 1220 illustrates a college dorm room at Georgetown University. 1221 illustrates a man singing Karaoke in the dorm room. 1222 illustrates a woman watching the performance who sees through her AR glasses the man 1221 singing and the virtual object of the drum set 1223 and virtual object of the electric guitar 1224. In this scenario, the virtual objects and the 6DAD are spatially registered to each other.

FIG. 12G illustrates a 6DAD in VR mode. 1225 illustrates a boy in Mississippi sitting on his couch in the living room wearing a virtual reality (VR) headset. Through the VR headset, the boy 1225 is able to see the virtual room 1226, the virtual singer 1227, the virtual electric guitar 1228 and the virtual drum set 1229. Additional instruments can be added in as desired. The VR headset will be equipped with the audio features described in the patent to be able to play the 6DAD with the richness of sound. The inventors believe that for sound to have optimum richness, it must have a location. In some embodiments, a computer algorithm can determine the coordinates of sounds.

FIG. 13 illustrates determining what the 6DAD would sound like at various distances (an attenuation analysis). There are two options. First, the option is to empirically determine the attenuation. An example will be provided in this patent which is the babbling brook example. Recording could be performed at multiple distances at a time in a multi-microphone setup. This would be useful if 10 microphones were arranged radially outward from a location where sound was generated. If the sound that is desired to be captured is the sound of keys hitting concrete (which would have a different set of frequencies and associated dB close to the source as compared to farther away), such a multi-microphone setup would be useful because all microphones (e.g., 10) could be turned on and the sound could occur once and 10 audio files could be generated (e.g., an audio file at 1 foot, an audio file at 2 feet, an audio file at 3 feet, etc.). Alternatively, recording could be performed at a single distance at a time using a single microphone setup. The sound source (e.g., keys hitting concrete) could be repeated multiple times for each recording and again multiple files could be established.

Second, the option is to use a sound and model what how the frequencies and associated dBs of the sound would change at varying distances. For example, acquire the sound of the keys hitting concrete at 2 feet distance. Then, execute a model to determine what the sound (frequencies and associated dBs) would be like at 1 feet, 3 feet, 4 feet, 5 feet, 6 feet, 7 feet, 8 feet, 9 feet, and 10 feet to generate the 10 audio files. Also, note that this could be performed in real time. If for example, the user's ear was positioned at 3.5 feet from the sound source, the recorded sound at 2 feet could be modeled in near real time and the sound of keys hitting at 3.5 feet could be achieved via simulation. A simulation approach is advantageous because it reduces the collection requirement and as will be discussed also allows for performing attenuation correction based on objects in the scene where a user is located.

Additionally, some embodiments comprise fine tuning the sound for an individual's hearing profile. For example, certain frequencies where a person had hearing loss can be increased in their amplitude. Another example is altering the sound based on an individual's preference, such as they have a disliking to a particular frequency and this can be decreased in dB or eliminated.

Figure 14A:
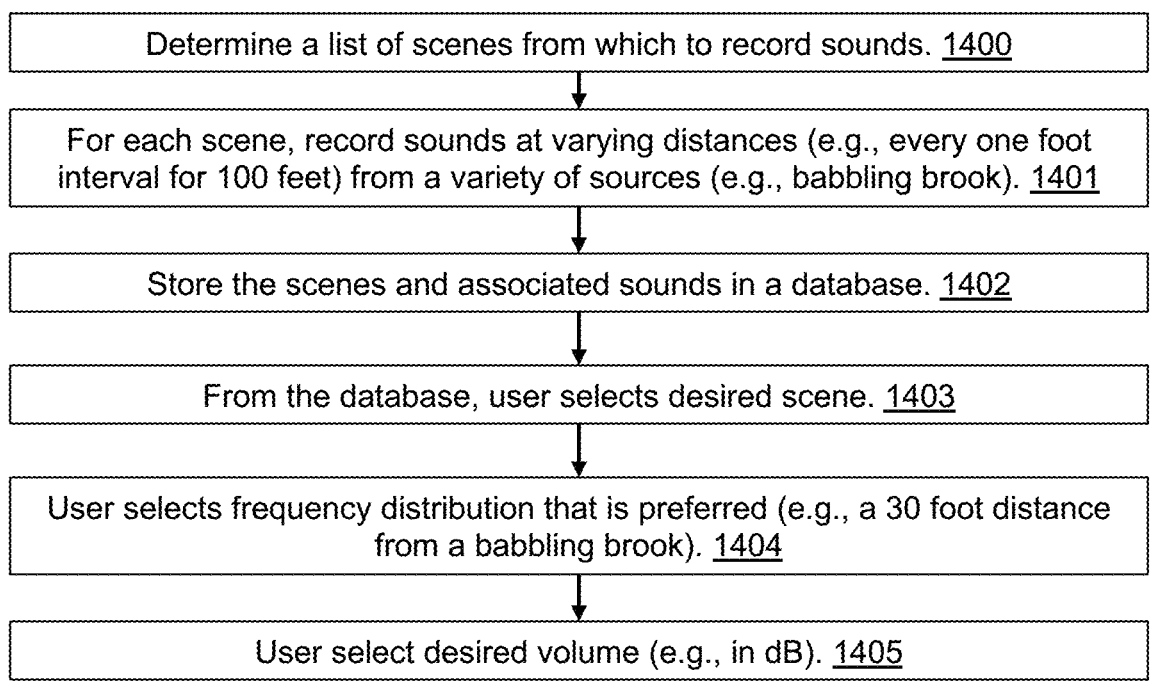
FIG. 14A illustrates 6DAD origination via a hybrid acquisition and simulation:
distribution of frequencies over distance.

FIG. 14A illustrates 6DAD origination via a hybrid acquisition and simulation: distribution of frequencies over distance. 1400 illustrates determining a list of scenes from which to record sounds. In the preferred embodiment, a list of soothing sound sources could be recorded. Examples include, but are not limited to, the following: a babbling brook; an ocean; a waterfall; wind through the trees; a thunder storm; crickets; highway sounds; and, others. 1401 illustrates for each scene, record sounds at varying distances (e.g., every one foot interval for 100 feet) from a variety of sources (e.g., babbling brook). For example, speakers can be placed on an apparatus (e.g., a string) at the sound source and moved to varying positions away from the source recording sound at varying intervals. Note that in the preferred embodiment, the intervals are regular. Also, note that interpolation can be performed in between data acquisition points. 1402 illustrates storing the scenes and associated sounds in a database. 1403 illustrates wherein from the database, a user selects desired scene. 1404 illustrates wherein a user selects frequency distribution that is preferred (e.g., a 30 foot distance from a babbling brook). 1405 illustrates wherein a user select desired volume (e.g., in dB). Thus, this embodiment comprises altering both the distance to the babbling brook and the volume to the babbling brook, so that both the volume and the frequency distribution are maximized for the user's preference. Another option is for a user could independently adjust the preferred frequencies (corresponding to a particular distance) and also independently adjust the dB. Also, once this data is acquired, it can subsequently be assigned position and time coordinates within the 6DAD.

Figure 14B:
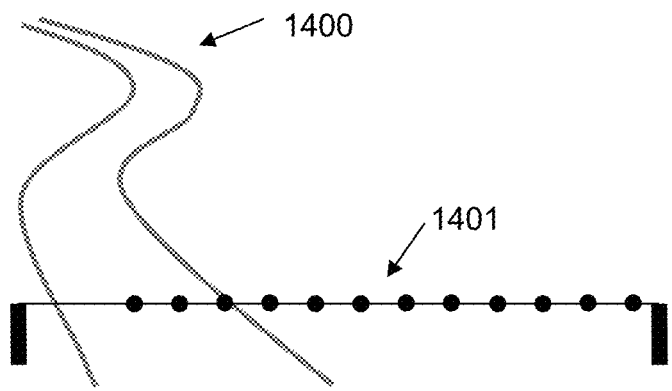
FIG. 14B illustrates generation of a sound recording of a scene at regular intervals over a distance.

FIG. 14B illustrates generation of a sound recording of a scene at regular intervals over a distance. 1400 illustrates a babbling brook. 1401 illustrates a series of positions where recording can be performed from, which include over the middle of the brook or at varying distances from a brook. The example shown here is a wire with a recording performed at varying distances illustrated by the black circles. Note that visual recordings (e.g., from a camera system) could be performed to supplement the audio recordings. In other embodiments, a recording could be performed in a studio with microphones arranged in a linear fashion away from the sound source. Such a dataset would be comprise distance and sound. In order to input it into a 6DAD, an x, y, z coordinate system would be needed and the distance would be useful because if a person was walking through a virtual world (e.g., a video game), they could hear the frequencies of the babbling brook change as they got virtually closer to the babbling brook.

FIG. 15A illustrates transforming an existing sound library to a distance dependent sound library. The distance dependent sound library could be assigned an (x, y, z) coordinate within the 6DAD via the virtual speaker approach. 1500 illustrates using a distance to a sound (e.g., sound was recorded on a microphone at 1 meter from the sound source). If a distance from the microphone to the sound source were available, then that distance could be inputted. 1501 illustrates wherein if a known distance is not available, then a distance can be assigned. For example, an audio file from the sound source of "keys dropping" could be used. The sound course could be the spot where the keys contacted a table. However, most datasets do not store such information on distance from the microphone to the sound source. So, to overcome this, a distance from the sound source would be assigned. Assume the distance to the sound source assigned was 1 meter. 1502 illustrates using an attenuation (e.g., in dB) over distance (e.g., in meters) correction for each frequency of the sound. Typically, the attenuation over distance correction would be for air at 1 atmosphere of pressure; however, other pressures (i.e., other than 1 atm) or other mediums (e.g., water) could be used. For simplicity, suppose the "keys dropping" sound was composed of multiple frequencies. A high frequency would be assigned a first attenuation over distance correction. A low frequency would be assigned a second attenuation over distance correction. Note that the first attenuation over distance correction would be higher than the second attenuation over distance correction. 1503 illustrates selecting a new distance. Note that the new distance selected could be closer to or farther away to the sound source than the assigned distance per 1500. Suppose a distance of 10 meters from the sound source was selected. 1504 illustrates adjusting the dB for each frequency in the sound for the new distance. For example, more of the high frequencies would be attenuated over the 10 meter distance as compared to the lower frequencies. The resulting generated sound at the new distance could be played. Some embodiments comprise recording a sound at a first distance and then extrapolating to achieve what it would sound like at other distances. 1505 illustrates adding additional optional step of applying an additional attenuation correction from a simulated object (e.g., table, chair, tree, etc.) placed in between the sound source and the sound heard at the new distance. Note that this additional attenuation 1503 added could be added to mimic different situations. For example, take the simulated sound "keys dropping" at 10 meters. Then, place a distance of simulated object such as forest (e.g., 5 meters) between the sound source and the location where the sound would be heard.

FIG. 15B illustrates how different frequencies from the 6DAD will attenuate over distance in the simulation. 1500 illustrates a low frequency. 1501 illustrates a medium frequency. 1502 illustrates a high frequency. This is an important point of novelty because this, when coupled with the distance from the sound source's (x, y, z) coordinate to the left ear (x, y, z) coordinate, it will enable accurate attenuation correction and enhance the user's experience. Same for the right ear.

Figure 16:
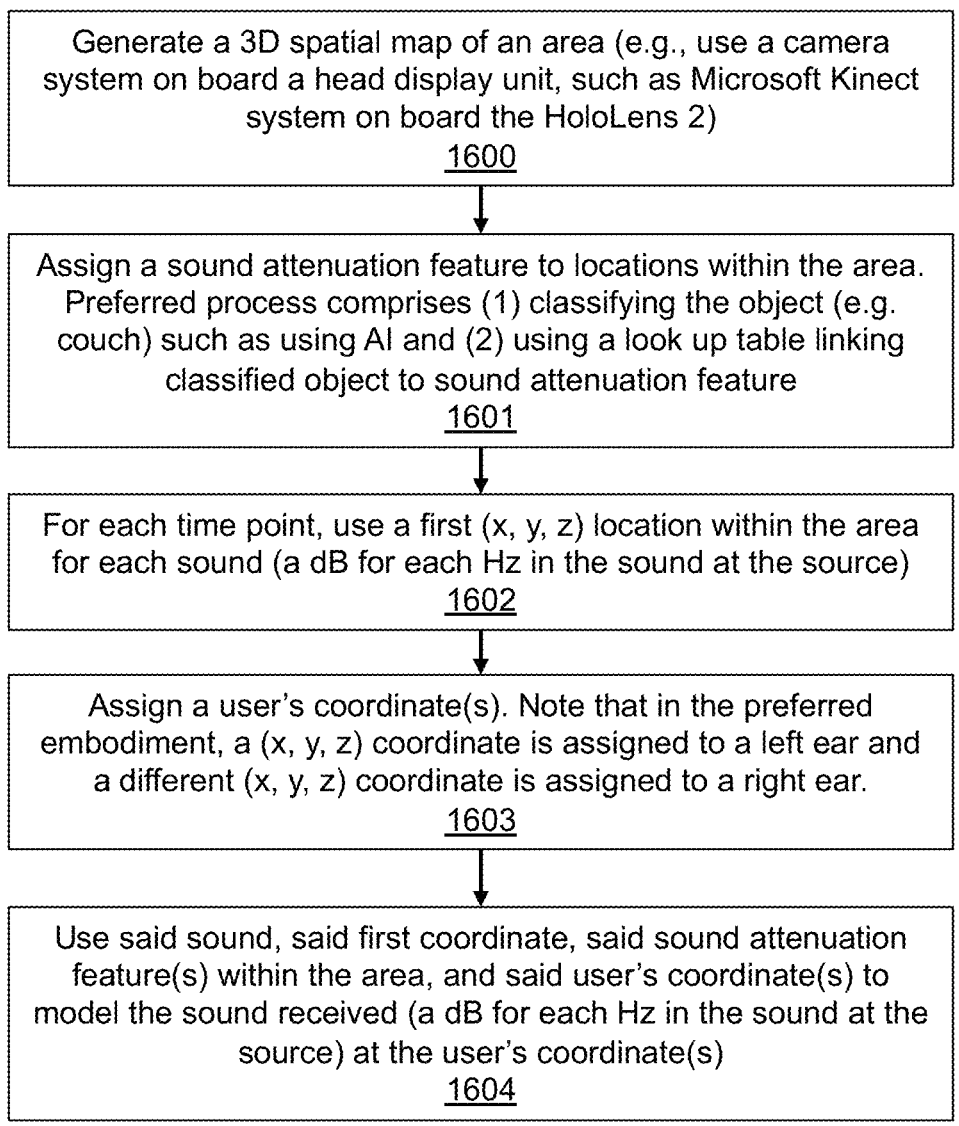
FIG. 16 illustrates generating a realistic sound system for a user's environment for a user wearing a Head Display Unit.

FIG. 16 illustrates generating a realistic sound system for a user's environment for a user wearing a Head Display Unit. 1600 illustrates generating a 3D spatial map of an area (e.g., use a camera system on board a head display unit, such as Microsoft Kinect system on board the HoloLens 2). Note that a 3D spatial map may be used as well. 1601 illustrates assigning a sound attenuation feature to locations within the area. Preferred process comprises (1) classifying the object (e.g., couch) such as using AI and (2) using a look up table linking classified object to sound attenuation feature.

1602 illustrates wherein for each time point, use a first (x, y, z) location within the area for each sound (a dB for each Hz in the sound at the source).

1603 illustrates assigning a user's coordinate(s). Note that in the preferred embodiment, a (x, y, z) coordinate is assigned to a left ear and a different (x, y, z) coordinate is assigned to a right ear. 1604 illustrates using said sound, said first coordinate, said sound attenuation feature(s) within the area, and said user's coordinate(s) to model the sound received (a dB for each Hz in the sound at the source) at the user's coordinate(s). Note that attenuation of sound due to the user's head can also be used.

Figure 17A:
FIG. 17A illustrates a 6DAD with a sound source and a user wearing a headset separated by a distance with air as the only sound attenuation feature.

FIG. 17A illustrates a 6DAD with a sound source and a user wearing a headset separated by a distance with air as the only sound attenuation feature. 1700A illustrates a location of a virtual speaker, which corresponds to a voice singing at a frequency. 1701A illustrates a user wearing an advanced headset playing the 6DAD. Note that only air is between the virtual speaker and the user's advanced headset.

Figure 17B:
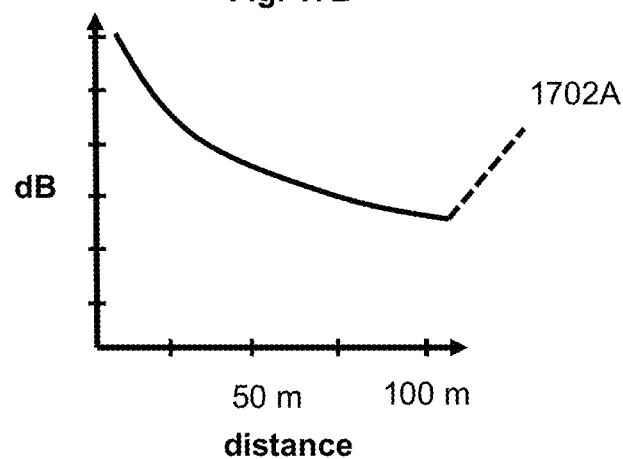
FIG. 17B illustrates a graph showing the relationship between distance and dB for a given frequency in a 6DAD for the scenario in FIG. 17A.

FIG. 17B illustrates a graph showing the relationship between distance and dB for a given frequency in a 6DAD for the scenario in FIG. 17A. 1702A illustrates that the dB played on the advanced headset worn by the user in FIG. 17A is attenuated over the 100 m of distance. If the user's advanced headset were 50 meters away from the virtual speaker, the attenuation would be less.

Figure 17C:
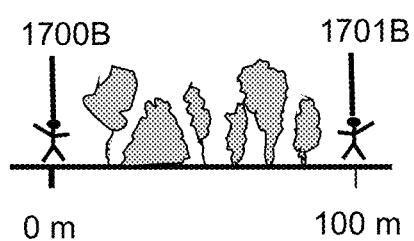
FIG. 17C illustrates a 6DAD with a sound source and a user wearing a headset separated by a distance with air and forestry as the sound attenuation features.

FIG. 17C illustrates a 6DAD with a sound source and a user wearing a headset separated by a distance with air and forestry as the sound attenuation features. 1700B illustrates a location of a virtual speaker, which corresponds to a voice singing at a frequency. Note that this is the same 6DAD as compared to FIG. 1A so the frequency and dB at the source in FIG. 1C is the same as the frequency and dB at the source as FIG. 17A. 1701B illustrates a user wearing an advanced headset playing the 6DAD. Note that both air and forestry are between the virtual speaker and the user's advanced headset.

Figure 17D:
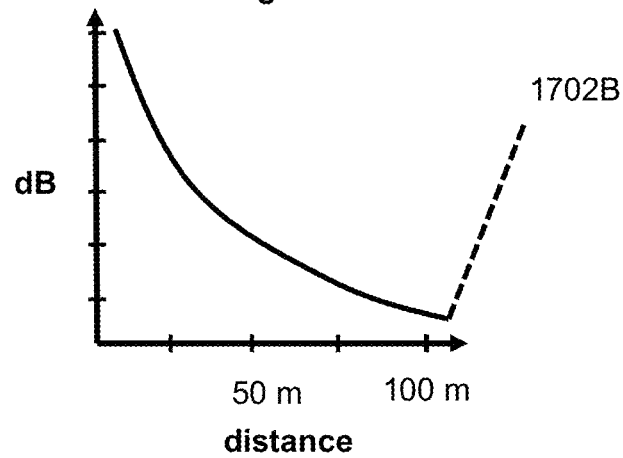
FIG. 17D illustrates a graph showing the relationship between distance and dB for a given frequency in a 6DAD for the scenario in FIG. 17C.

FIG. 17D illustrates a graph showing the relationship between distance and dB for a given frequency in a 6DAD for the scenario in FIG. 17C. 1702B illustrates that the dB played on the advanced headset worn by the user in FIG. 17C is attenuated over the 100 m of distance. If the user's advanced headset were 50 meters away from the virtual speaker, the attenuation would be less. Importantly, for a given distance, there is more attenuation in FIG. 17D as compared to FIG. 17B. Thus, modeling obstacles, such as forestry in the playing of a 6DAD will improve user experience. Such modeling of obstacles can be achieved by imaging of a scene (e.g., Microsoft Kinect, LIDAR scan, etc.). The identified objects in the scene can be classified as to their sound attenuation and then the 6DAD can be played accordingly, which is in a more realistic way.

Figure 18A:
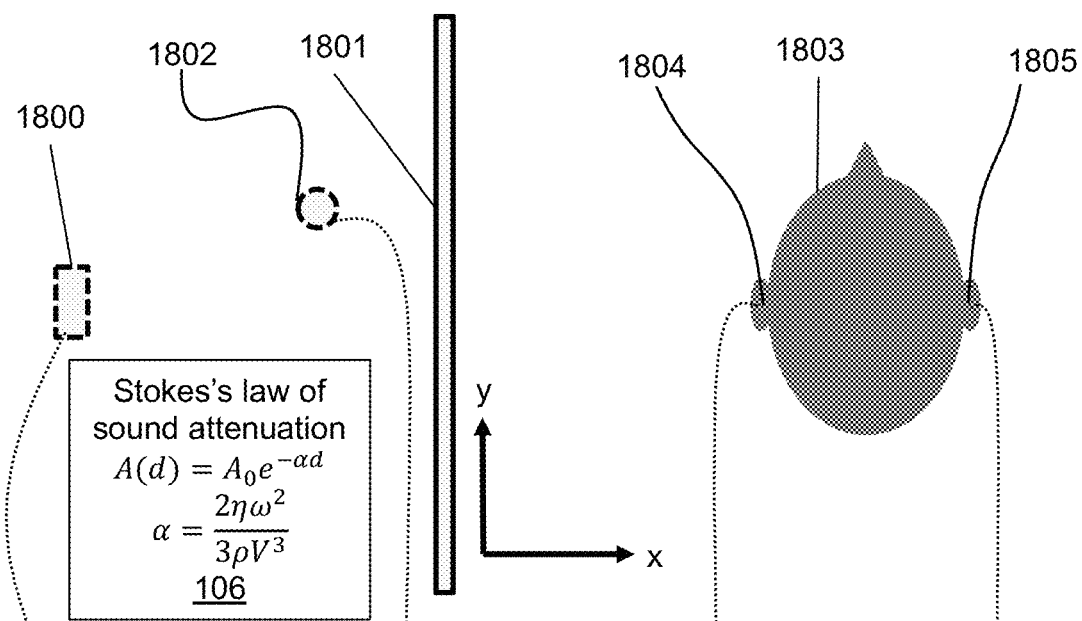
FIG. 18A illustrates application of attenuation.

FIG. 18A illustrates application of attenuation. 1800 illustrates a virtual speaker, which has at least one (x, y, z) coordinate on the (x, y, z) coordinate system. 1801 illustrates a tangible wall, which has (x, y, z) coordinates on the (x, y, z) coordinate system. 1802 illustrates a virtual microphone, which has at least one (x, y, z) coordinate on the (x, y, z) coordinate system. 1803 illustrates a user's head, which has at least one (x, y, z) coordinate on the (x, y, z) coordinate system. 1804 illustrates the left ear of a user where a tangible speaker would be placed for the left ear. Note that, in the preferred embodiment, the left ear would have at least one (x, y, z) coordinate on the (x, y, z) coordinate system. 1805 illustrates the right ear of a user where a tangible speaker would be placed for the right ear. Note that, in the preferred embodiment, the right ear would have at least one (x, y, z) coordinate on the (x, y, z) coordinate system. Note that at this time epoch, the user's head 1803 is located on the opposite side of the wall 1801 as compared to the virtual speaker 1800 with the left ear 1804 closer to the virtual speaker 1800 as compared to the right ear 1805. The audio headset could be headphones, airpods or the like. Note should be made that a head tracking system is an option. This figure shows a single time point. In some embodiments, a user would hear different sounds as he/she maneuvers throughout the home.

FIG. 18B illustrates the virtual sound produced from the virtual speaker. Two frequencies are shown. No attenuation is present because this is at the source, which is the virtual speaker 100, which is assigned an (x, y, z) coordinate. The sound emitted from the speaker is shown.

FIG. 18C illustrates what a virtual microphone would hear from the virtual speaker. This is the simplest model. No objects are in between the location of the virtual speaker and the virtual microphone. Thus, the only attenuation is due to the traveling of the sound over the distance through air. This can be modeled by using Stokes's law of sound attenuation. Stokes's law of sound attenuation describes the attenuation of sound in a fluid (e.g., air). The amplitude of a wave decreases with the distance traveled at a rate α where η is the viscosity coefficient, co is the frequency, ρ is the fluid density, V is the speed of sound. As compared to FIG. 18B, there has been some attenuation of the sound with the higher frequency being more attenuated as compared to the lower frequency.

FIG. 18D illustrates what is played on the tangible speaker in the user's left ear. Note that at this time epoch, the user's head 1803 is located on the opposite side of the wall 1801 as compared to the virtual speaker 1800 with the left ear 1804 closer to the virtual speaker 1800 as compared to the right ear 1805. As compared to FIG. 18B, there has been attenuation of the sound due to traveling through both air and the wall 1801 and note that the higher frequency being more attenuated as compared to the lower frequency.

FIG. 18E illustrates what is played on the tangible speaker in the user's right ear. Note that at this time epoch, the user's head 1803 is located on the opposite side of the wall 1801 as compared to the virtual speaker 1800 with the left ear 1804 closer to the virtual speaker 1800 as compared to the right ear 1805. As compared to FIG. 18B, there has been attenuation of the sound due to traveling through both air, the wall 1801 and the user's head 1804 and note that the higher frequency being more attenuated as compared to the lower frequency. This figure illustrates a single time epoch; however, this system is dynamic. As the person turns their head or walks around the wall, the geometry changes, the arrival times changes and the amount of attenuation changes. Thus, the attenuation model is dynamic since the relative locations of the virtual speaker 1800, obstacles such as the tangible wall 1801 and the user's head 1803 will change over time. In some embodiments, echoes can be modeled into the system for even more realistic audio, in which case objects in the room can be assigned a reflectivity feature to account for reflection and absorption.

Figure 19A:
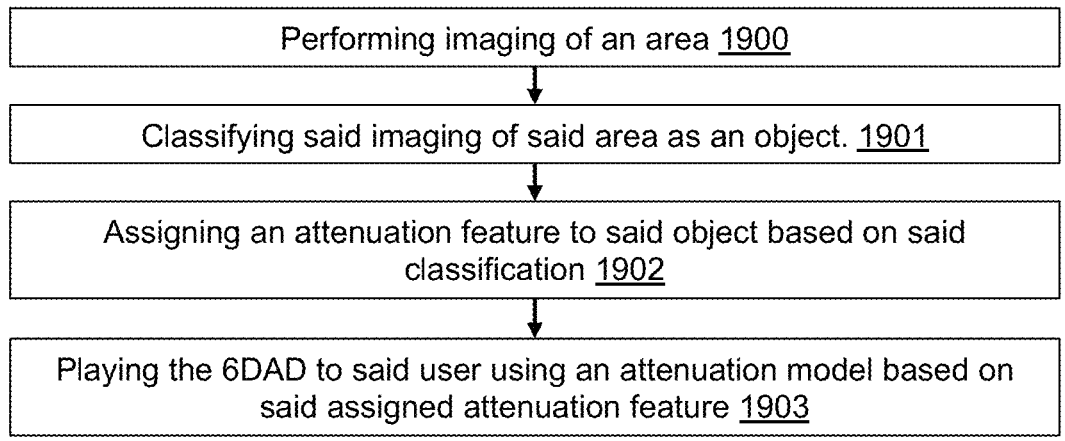
FIG. 19A illustrates a flow chart for determining a sound attenuation model.

FIG. 19A illustrates a flow chart for determining a sound attenuation model. 1900 illustrates performing imaging of an area. This can be performed via any imaging modality on the infrared spectrum (e.g., using cameras, LIDAR, radar or other) or using sound wave imaging (SONAR). The purpose is to achieve imaging of the user's surroundings in real time. It should be noted that a user's surroundings could constantly change, such as is performed. 1901 illustrates classifying said imaging of said area as an object. 1902 assigning an attenuation feature to said object based on said classification. 1903 illustrates playing the 6DAD to said user using an attenuation model based on said assigned attenuation feature.

Figure 19B:
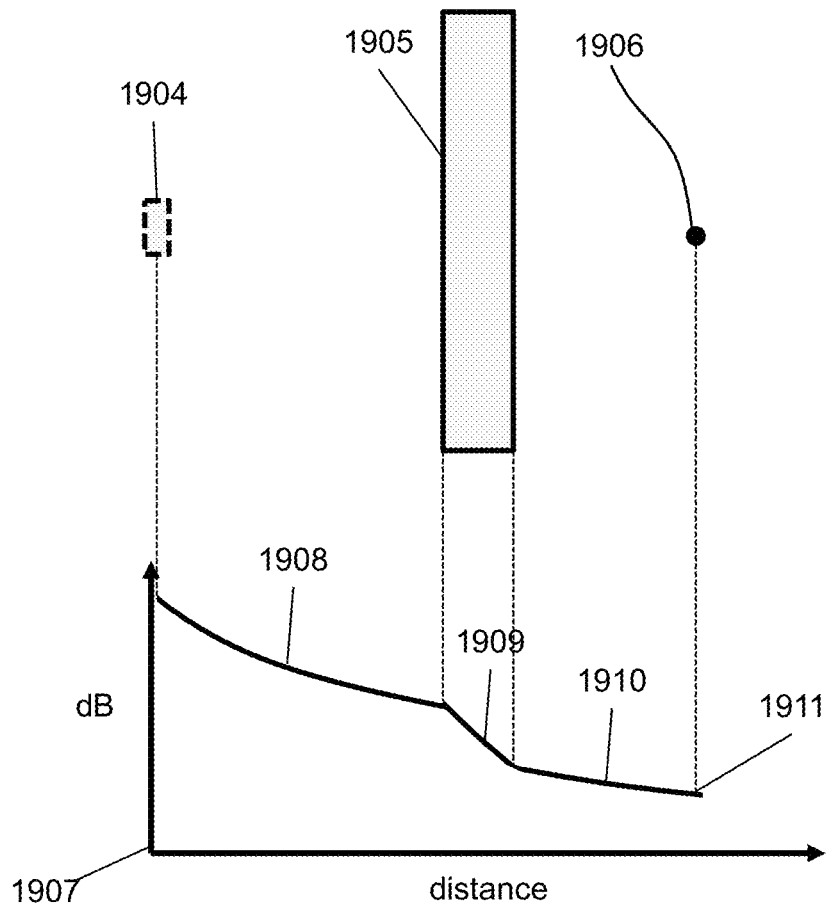
FIG. 19B illustrates a scene wherein listening to a 6DAD with a multi-attenuation model would improve the listening experience.

FIG. 19B illustrates a scene wherein listening to a 6DAD with a multi-attenuation model would improve the listening experience. 1904 illustrates a virtual speaker, which has at least one (x, y, z) coordinate on the 3D coordinate system. 1905 illustrates a tangible wall, which has (x, y, z) coordinates on the (x, y, z) coordinate system. This tangible wall has been imaged per 1900, classified as an object (i.e., wall) per 1901, and assigned an attenuation feature per 1902. 1906 illustrates an (x, y, z) coordinate of a left ear for the advanced headset. The medium that separates the virtual speaker 1904 from the tangible wall 1905 is air, which would have a temperature and humidity. The 6DAD can be modeled using Stokes's law of sound attenuation wherein some objects attenuation is predicted based on an image classification system of the object. In this example, air would have be assigned a low attenuation and the wall 1905 would be assigned a high attenuation. 1907 illustrates a graph illustrating how a dB of a sound would change based on distance from the sound source. The distance portion of the graph is aligned with the model. 1908 illustrates a low amount of attenuation over distance, which simulates sound passing through the air (which was assigned low attenuation) from the virtual speaker 1904 to the wall 1905. 1909 illustrates a high amount of attenuation over distance, which simulates sound passing through the wall 1905 (which was assigned high attenuation). 1910 illustrates a low amount of attenuation over distance, which simulates sound passing through the air (which was assigned low attenuation) from the wall to the (x, y, z) coordinate of a left ear for the advanced headset. Assume that the user's left ear was facing the wall. The resulting dB after the simulation of attenuation through air and wall 1905 would be presented to a user wearing the advanced headset.

Figure 20:
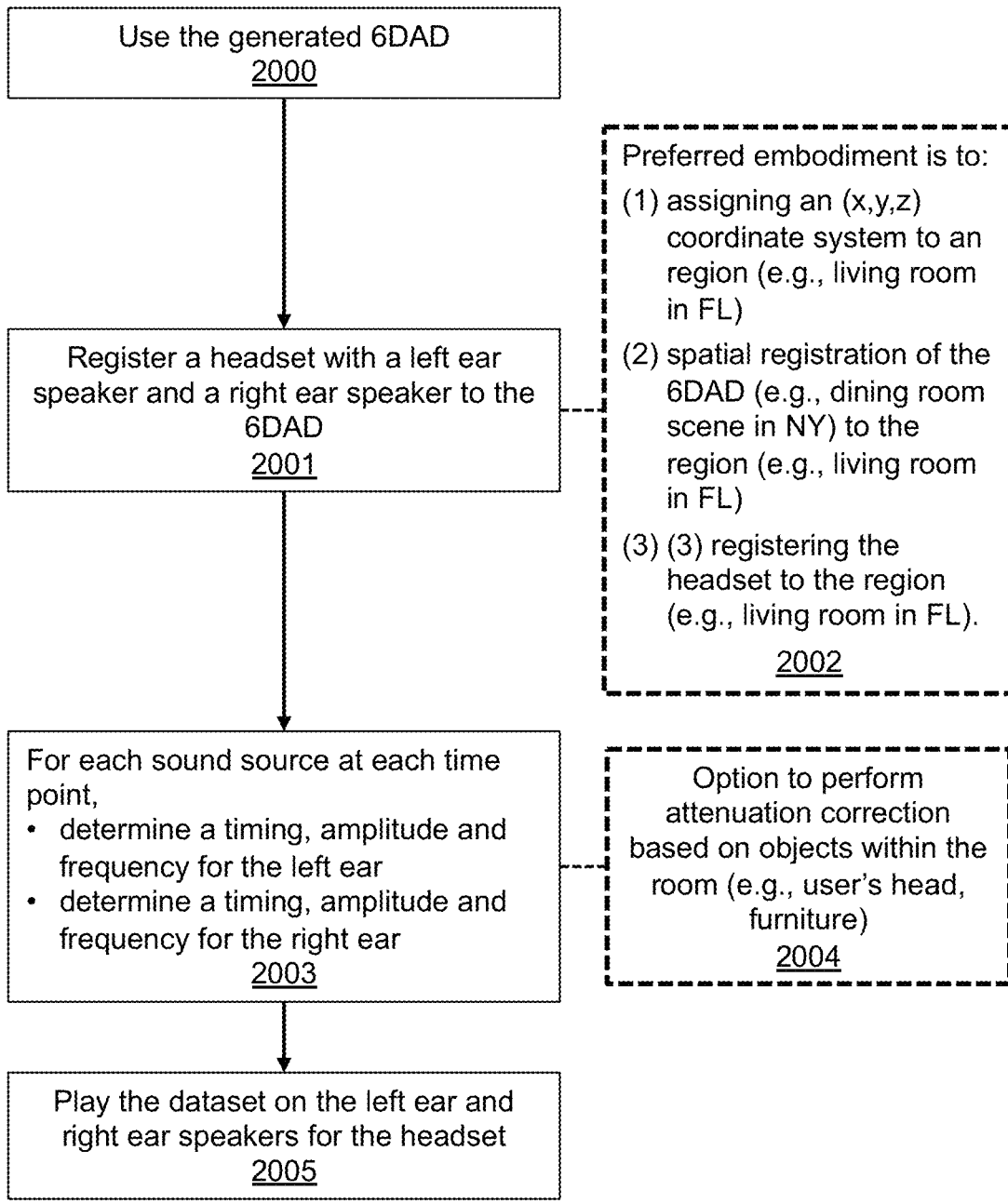
FIG. 20 illustrates playing the 6DAD on a headset.

FIG. 20 illustrates playing the 6DAD on a headset. 2000 illustrates using the generated 6DAD, as previously discussed. 2001 illustrates register a headset with a left ear speaker and a right ear speaker to the 6DAD. 2002 illustrates the preferred embodiment, which is to: assign an (x,y,z) coordinate system to an region (e.g., living room in FL); perform spatial registration of the 6DAD (e.g., dining room scene in NY) to the region (e.g., living room in FL); and, registering the headset to the region (e.g., living room in FL). 2003 illustrates for each sound source at each time point, determine a timing, amplitude and frequency for the left ear, and determine a timing, amplitude and frequency for the right ear. 2004 illustrates the option to perform attenuation correction based on objects within the room (e.g., user's head, furniture). 2005 illustrates playing the dataset on the left ear and right ear speakers for the headset. This will enable re-delivered sound in a realistic 3D fashion as if the user was actually in the room where the sounds occurred. A 3D landscape of sounds will be played and this will enhance the user's experience. The user will be able to move in an area and the sounds will be presented to the user in 3D space to optimize the user's experience. In some embodiments, a sound has a direction of projection. In some embodiments, the direction of projection can move from a first direction at a first time point to a second direction at a second time point. Thus, in some embodiments, more than 6 dimensions can be used in the audio dataset.

Figure 21A:
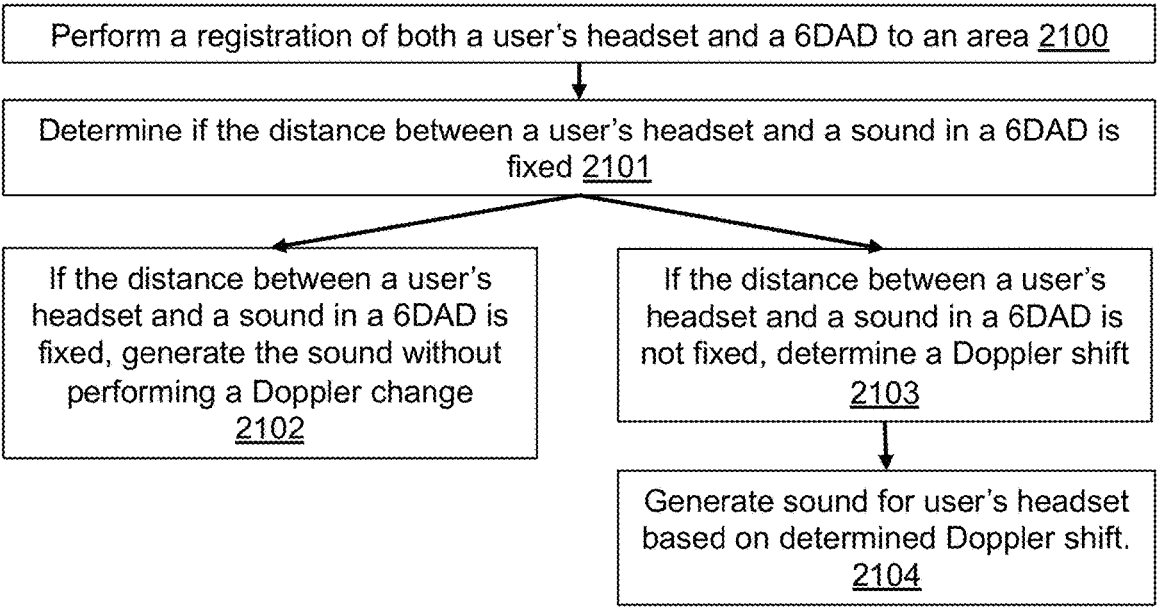
FIG. 21A illustrates a flow diagram illustrating using movement between a user's headset and a sound in a 6DAD for Doppler shift determination.

FIG. 21A illustrates a flow diagram illustrating using movement between a user's headset and a sound in a 6DAD for Doppler shift determination. 2100 illustrates performing a registration of both a user's headset and a 6DAD to an area. 2101 illustrates determining if the distance between a user's headset and a sound in a 6DAD is fixed. 2102 illustrates wherein if the distance between a user's headset and a sound in a 6DAD is fixed, generate the sound without performing a Doppler change. For example, if both the user and the sound in a 6DAD were stationary, no shift would occur because the distance between a user's headset and a sound in the 6DAD is fixed. Alternatively, if both the user and the sound in a 6DAD were moving in the y-direction at 2 miles per hour, no shift would occur because the distance between a user's headset and a sound in the 6DAD is fixed. 2103 illustrates wherein if the distance between a user's headset and a sound in a 6DAD is not fixed, determine a Doppler shift. If a user were stationary and a virtual sound of a siren were attached to a virtual ambulance moving towards the user at 60 miles per hour, then the system would simulate the Doppler shift and provide an improved audio experience. 2104 illustrates generate sound for user's headset based on determined Doppler shift. Thus, this innovative concept will provide an even more realistic set of life like sounds for the user and would be most useful in video game applications. Further teachings are provided in FIGS. 21B and 21C below. Note that this would improve on the current art because it would be able to perform the Doppler adjustment based on movement between user's head (and ear) positions relative to the sound origin in the 6DAD.

Figure 21B:
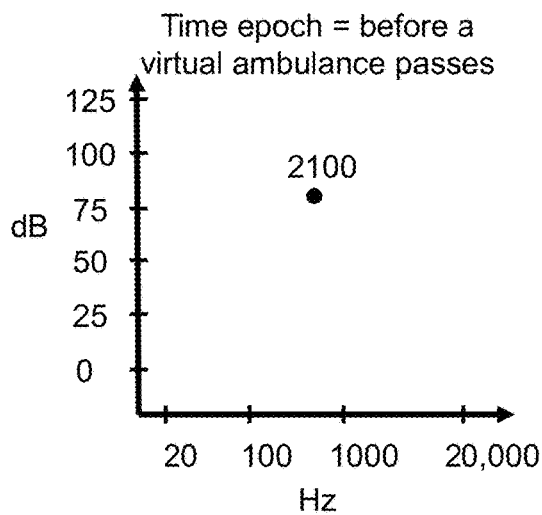
FIG. 21B illustrates a frequency vs. decibels chart for a listener was sitting on a bench beside a road listening to a single source moving closer to the listener.

FIG. 21B illustrates a frequency vs. decibels chart for a listener was sitting on a bench beside a road listening to a single source moving closer to the listener. This scenario comprises wherein a virtual ambulance approaching. In this scenario, the sound source is given an (x, y, z) coordinate that moves within an area over time to mimic that of an approaching virtual ambulance. By way of example, by way of some parameters: the speed of sound near sea level is about 1110 feet per second (f/s); the ambulance is travelling at 60 miles per hour (88 f/s); and the siren frequency is 700 Hertz (Hz). In this first time epoch with the virtual ambulance some distance away, the siren frequency herd by the listener is 760 Hz. The sound is at a higher pitch due to the Doppler effect (i.e., the virtual sound waves are compressed as the vehicle approaches). The loudness of the siren at a hypothetical distance 200 yards is 80 decibels (dBs). 2100 illustrates 760 Hz and 80 dBs. This is presented on the headset to a user to improve the sound experience.

Figure 21C:
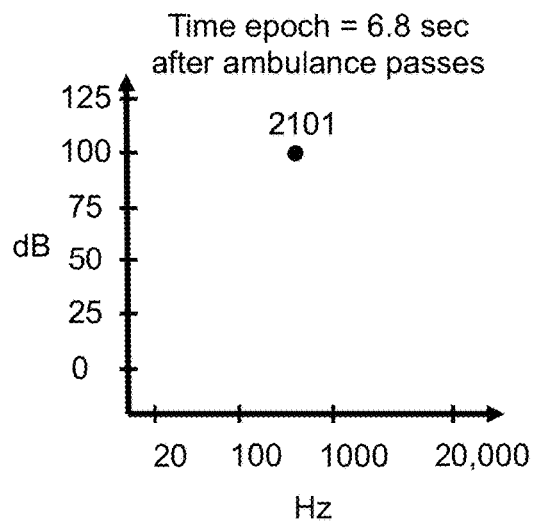
FIG. 21C illustrates a frequency vs. decibels chart for a listener was sitting on a bench beside a road listening to a single source moving farther away from the listener.

FIG. 21C illustrates a frequency vs. decibels chart for a listener was sitting on a bench beside a road listening to a single source moving farther away from the listener. At the speed the virtual ambulance is travelling, it will pass the listener in 6.8 seconds and, when the virtual ambulance is 50 yards past the listener, the second time epoch is plotted. This time the frequency is significantly lower at 648 Hz. This validates what many persons have noted: there is a change in the sound when the siren passes and the sound waves expand. Again, this lower sounding pitch is also due to the Doppler effect or Doppler shift. Also, The sound level depicted in the FIG. (100 dB) is higher due to the lesser distance from the listener to the ambulance when the epoch occurred than the first epoch and consequent less attenuation of the sound. 2101 illustrates 648 Hz and 100 dB. This is presented on the headset to a user to improve the sound experience. This is most useful to simulate more realistic car driving games.

FIG. 22A illustrates a first smart headset configurations wherein a left speaker is aligned with a user's left ear and a right speaker is aligned with the user's right ear. A front view is illustrated and a left speaker 2201L is shown for the left ear and a right speaker 2201R is shown for the right ear. A band 2200 over the top of the phone is shown. Note that in some embodiments, the first smart headset configurations could have multiple speakers on each side.

FIG. 22B illustrates a second smart headset configurations wherein a left speaker is aligned with a user's left ear and a right speaker is aligned with the user's right ear. A front view is illustrated and a left speaker 2202L is shown for the left ear and a right speaker 2202R is shown for the right ear. These configurations are similar to airpods, ear buds or in-ear monitors (IEMs). In some embodiments, the second smart headset is hermetically sealed (or close to hermetically sealed) to the user. In some embodiments, the left ear speaker and the right ear speaker are connected via a chain. In some embodiments, a personalized design is implemented. In some embodiments, 3D printing is performed to match the size and shape of a user's ear (note that mapping of the ear size and shape can be performed using techniques, such as LIDAR).

FIG. 22C illustrates a third smart headset configurations wherein a left speaker is aligned with a user's left ear and a right speaker is aligned with the user's right ear and wherein an augmented reality (or mixed reality) glasses are incorporated. A front view is illustrated and a left speaker 2203L is shown for the left ear and a right speaker 2203R is shown for the right ear. The augmented reality (or mixed reality) glasses 2203A are also shown.

FIG. 22D illustrates a fourth smart headset configurations wherein a left speaker is aligned with a user's left ear and a right speaker is aligned with the user's right ear and wherein a virtual reality glasses are incorporated. A front view is illustrated and a left speaker 2204L is shown for the left ear and a right speaker 2204R is shown for the right ear. The virtual reality glasses 2204V are also shown.

FIG. 22E illustrates a second smart headset configurations wherein speakers are aligned in a planar fashion. Using speakers in a planar fashion can induce some additional time delays and attenuation changes for the sound to travel from the speaker to the respective ears. The planar orientation of speakers 2205 on a HDU are illustrated. This offers a novel solution to performing localization by presenting the sound at a position surrounding the head. This type design could operate very effectively in areas wherein the sounds would nominally be coming from a general 360° planar area.

FIG. 22F illustrates a third smart headset configuration wherein speakers are aligned in a non-planar fashion. 2206 illustrates a hemisphere type design. This type design would be excellent for three-dimensional sound.

FIG. 22G illustrates smart headset features. These include, but are not limited to the following: at least one left ear speaker; at least one right ear speaker; processor; head tracking for position and orientation; scene sensing capability (e.g., Microsoft Kinect or a lidar scanner); Power supply, Battery; Wifi; Bluetooth; on-board computer; transmitter(s)/receiver(s); GPS; tactile buzzers/haptics.

FIG. 23 illustrates for a 6DAD, determining what sound would be received by a left ear and what sound would be received by a right ear? 2300 illustrates using a sound at a first location (e.g., direction of propagation, dB, frequencies). This is achieved via the 6DAD. 2301 illustrates the key questions parameters that need to be determined are (1) the timing (i.e., the arrival time of the sound), (2) the frequencies (in Hz) and (3) the amplitudes (in dB). To answer these questions, some data can be modeled to enhance the user experience. What is the distance from the sound source to the left/right ear? How much attenuation would there be? Is the attenuation only due to distance traveled through air? Or does the head contribute to attenuation differences between the left ear and the right ear? After determining the attenuation, what would the amplitude be for each frequency? This can be referred to as an attenuation corrected 3D sound model. Is there movement between the sound source and the left ear so as to cause a frequency shift per Doppler effect? Would there be any echoes? What would be the amount of absorption/reflection of sound from items within the area?

Figure 24:
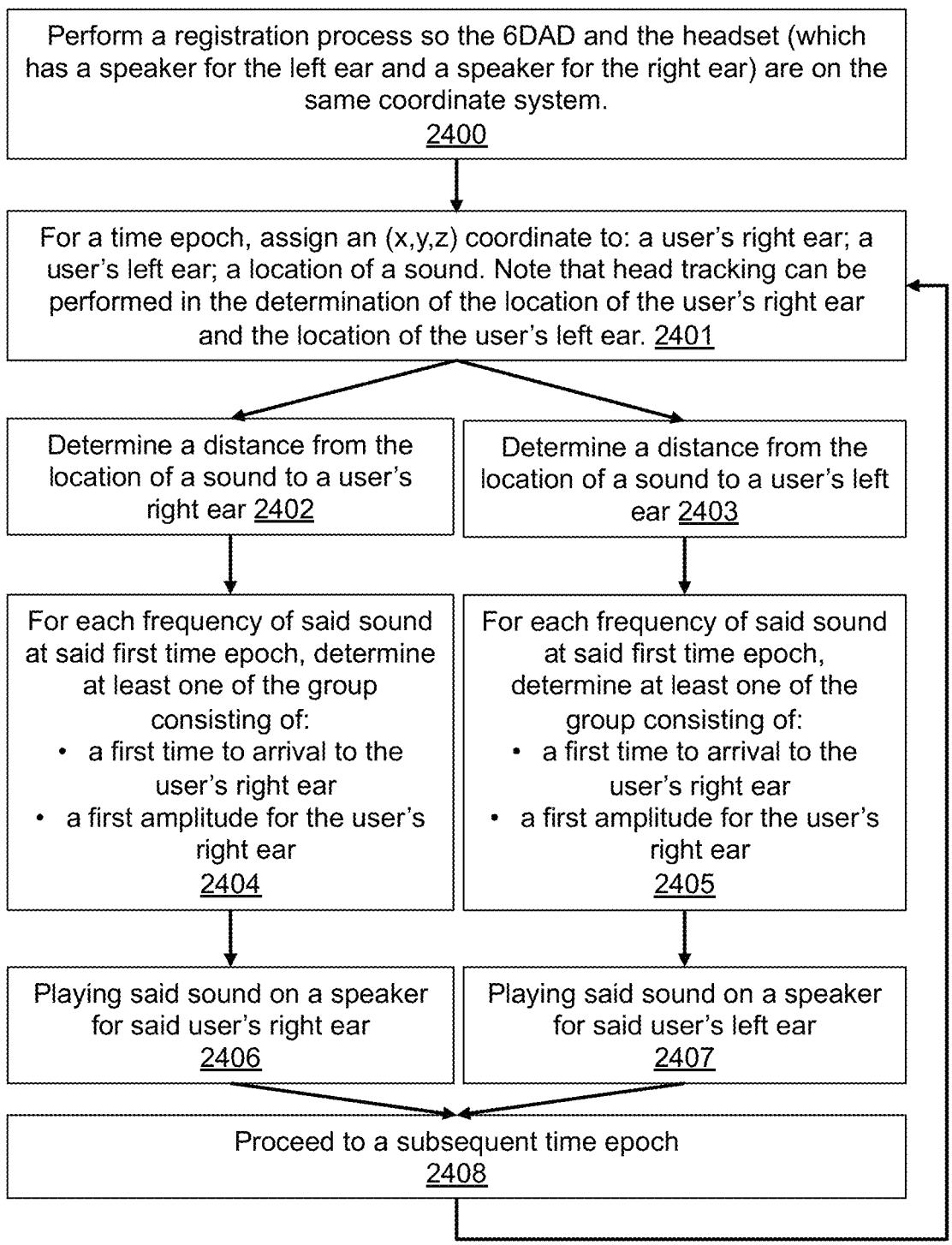
FIG. 24 illustrates for each sound, determining a timing, amplitude and frequency for the left and right ears.

FIG. 24 illustrates for each sound, determining a timing, amplitude and frequency for the left and right ears. 2400 illustrates performing a registration process so the 6DAD and the headset (which has a speaker for the left ear and a speaker for the right ear) are on the same coordinate system. 2401 illustrates wherein for a time epoch, assign an (x,y,z) coordinate to: a user's right ear; a user's left ear; a location of a sound. Note that head tracking can be performed in the determination of the location of the user's right ear and the location of the user's left ear. 2402 illustrates determining a distance from the location of a sound to a user's right ear. 2403 illustrates determining a distance from the location of a sound to a user's left ear. 2404 illustrates wherein for each frequency of said sound at said first time epoch, determine at least one of the group consisting of: a first time to arrival to the user's right ear; and, a first amplitude for the user's right ear. 2405 illustrates wherein for each frequency of said sound at said first time epoch, determine at least one of the group consisting of: a first time to arrival to the user's right ear; and, a first amplitude for the user's right ear. 2406 illustrates playing said sound on a speaker for said user's right ear. 2407 illustrates playing said sound on a speaker for said user's left ear. 2408 illustrates proceeding to a subsequent time epoch.

Figure 25:
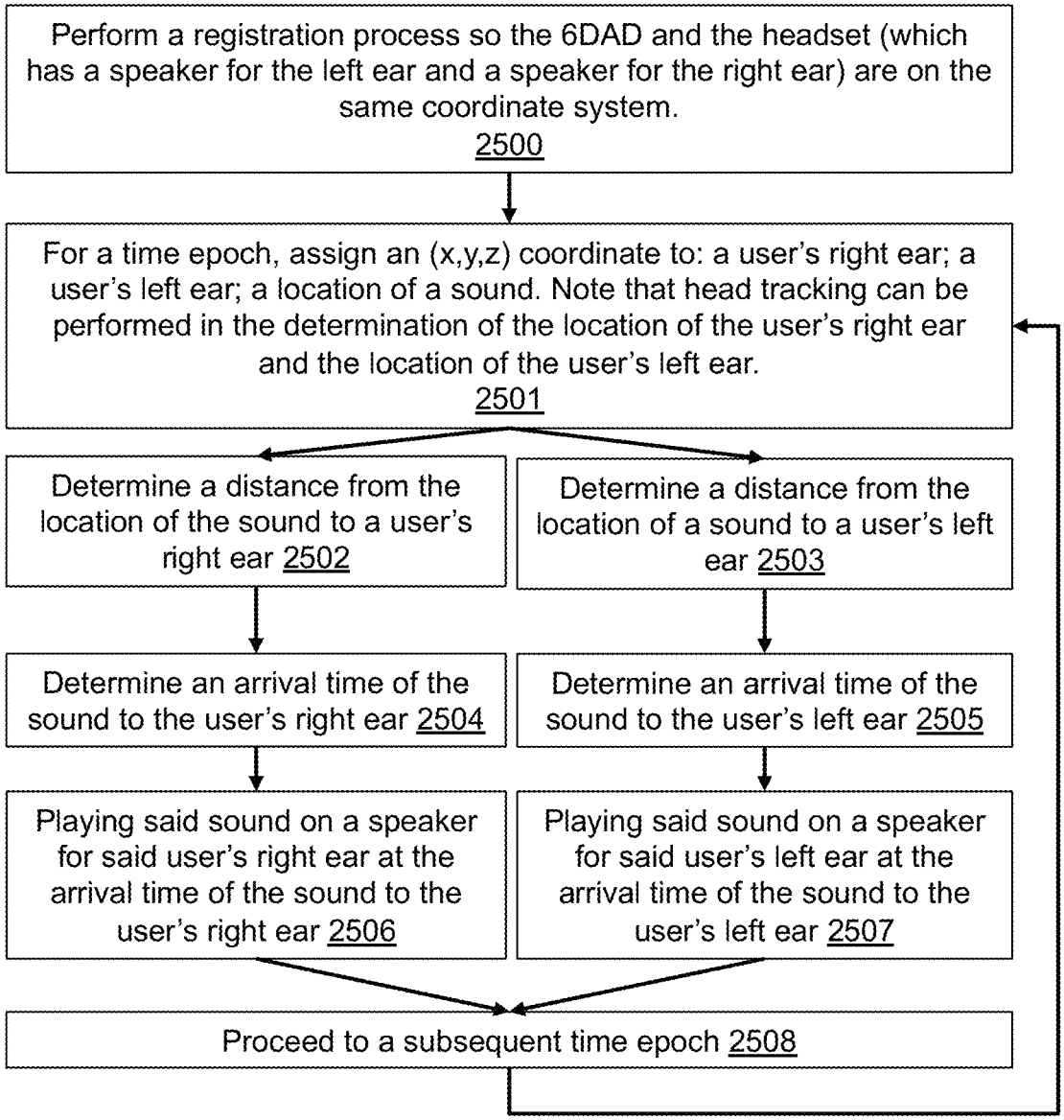
FIG. 25 illustrates wherein for each sound determining a timing for a user's left ear and the user's right ear.

FIG. 25 illustrates wherein for each sound determining a timing for a user's left ear and the user's right ear. 2500 illustrates performing a registration process so the 6DAD and the headset (which has a speaker for the left ear and a speaker for the right ear) are on the same coordinate system. 2501 illustrates wherein for a time epoch, assign an (x,y,z) coordinate to: a user's right ear; a user's left ear; a location of a sound. Note that head tracking can be performed in the determination of the location of the user's right ear and the location of the user's left ear. Note that a coordinate for the left ear and a coordinate for the right ear will be separated by an inter-ear distance. 2502 illustrates determining a distance from the location of the sound to a user's right ear. 2503 illustrates determining a distance from the location of a sound to a user's left ear. 2504 illustrates determining an arrival time of the sound to the user's right ear. 2505 illustrates determining an arrival time of the sound to the user's left ear. 2506 illustrates playing said sound on a speaker for said user's right ear at the arrival time of the sound to the user's right ear. 2507 illustrates playing said sound on a speaker for said user's left ear at the arrival time of the sound to the user's left ear. 2508 illustrates proceeding to a subsequent time epoch.

Figure 26:
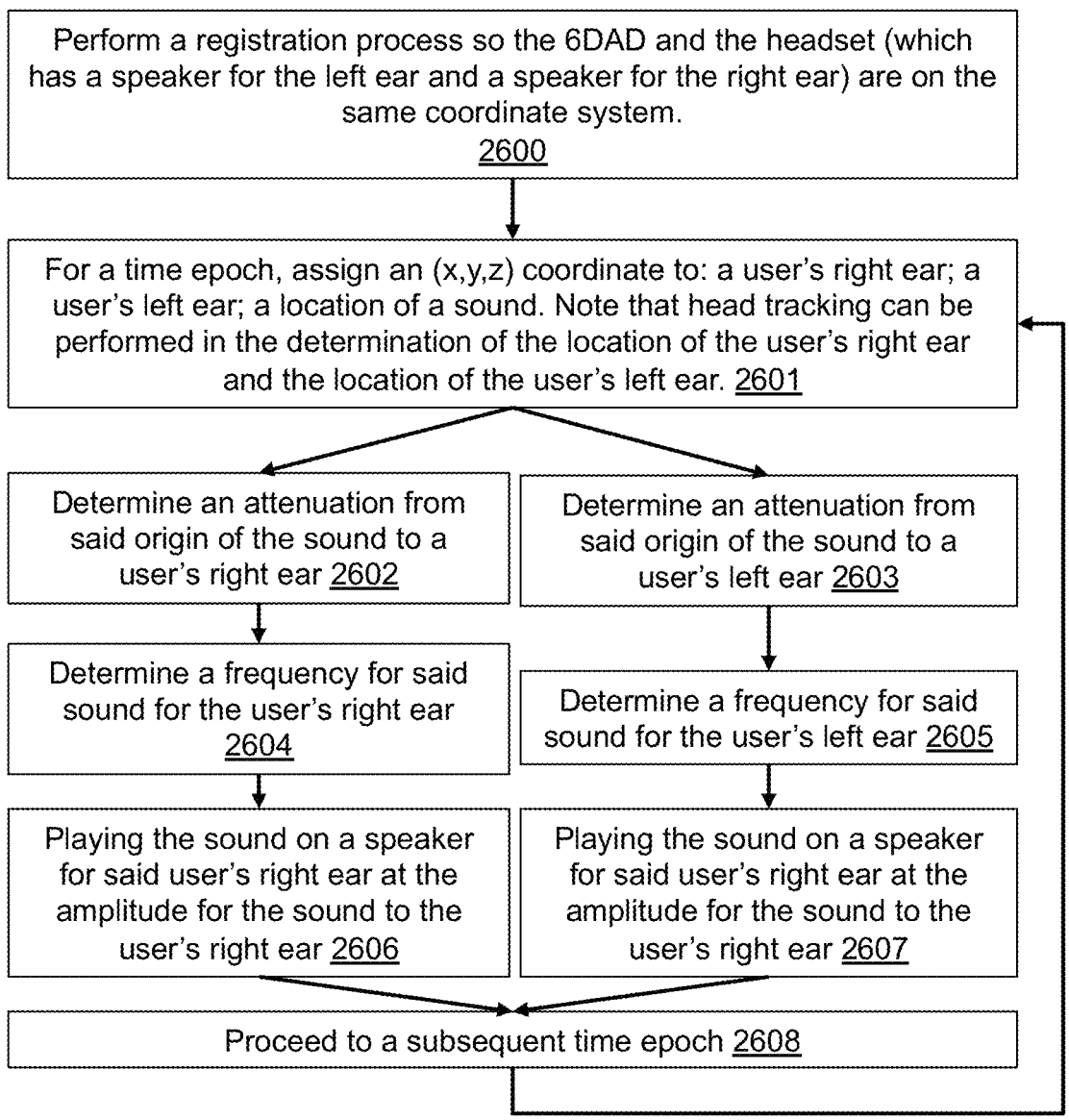
FIG. 26 illustrates wherein for each sound, determining a frequency for the left and the right ears.

FIG. 26 illustrates wherein for each sound, determining a frequency for the left and the right ears. 2600 illustrates performing a registration process so the 6DAD and the headset (which has a speaker for the left ear and a speaker for the right ear) are on the same coordinate system. 2601 illustrates wherein for a time epoch, assign an (x,y,z) coordinate to: a user's right ear; a user's left ear; a location of a sound. Note that head tracking (which provides a position and an orientation within an area) can be performed in the determination of the location of the user's right ear and the location of the user's left ear. Note that the left ear and the right ear area separated by an inter-ear distance, which can be mapped to a specific user. 2602 illustrates determining an attenuation from said origin of the sound to a user's right ear. 2603 illustrates determining an attenuation from said origin of the sound to a user's left ear. 2604 illustrates determining a frequency for said sound for the user's right ear. Note that the frequency can be altered if there is movement of the sound source with respect to the user per the Doppler shift. 2605 illustrates determining a frequency for said sound for the user's left ear. Note that the frequency can be altered if there is movement of the sound source with respect to the user per the Doppler shift. 2606 illustrates playing the sound on a speaker for said user's right ear at the amplitude for the sound to the user's right ear. 2607 illustrates playing the sound on a speaker for said user's right ear at the amplitude for the sound to the user's right ear. 2608 illustrates proceeding to a subsequent time epoch.

Figure 27:
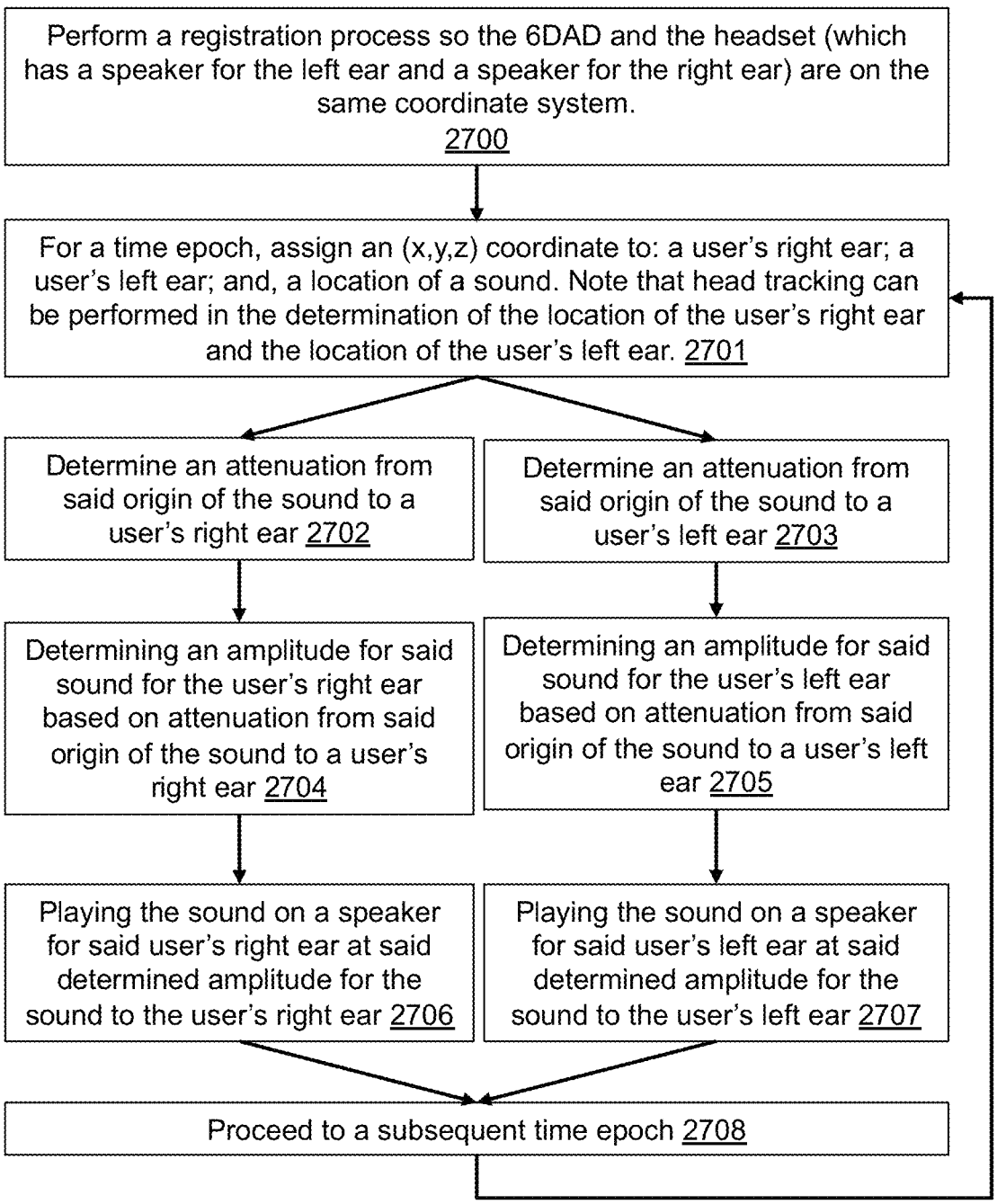
FIG. 27 illustrates wherein for each sound, determining an amplitude for the left and right ears.

FIG. 27 illustrates wherein for each sound, determining an amplitude for the left and right ears. 2700 illustrates performing a registration process so the 6DAD and the headset (which has a speaker for the left ear and a speaker for the right ear) are on the same coordinate system.

2701 illustrates wherein for a time epoch, assign an (x,y,z) coordinate to: a user's right ear; a user's left ear; and, a location of a sound. Note that head tracking (which provides a position and an orientation within an area) can be performed in the determination of the location of the user's right ear and the location of the user's left ear. Note that the left ear and the right ear area separated by an inter-ear distance, which can be mapped to a specific user. 2702 illustrates determining an attenuation from said origin of the sound to a user's right ear. 2703 illustrates determining an attenuation from said origin of the sound to a user's left ear. 2704 illustrates determining an amplitude for said sound for the user's right ear based on attenuation from said origin of the sound to a user's right ear. 2705 illustrates determining an amplitude for said sound for the user's left ear based on attenuation from said origin of the sound to a user's left ear. 2706 illustrates playing the sound on a speaker for said user's right ear at said determined amplitude for the sound to the user's right ear. 2707 illustrates playing the sound on a speaker for said user's left ear at said determined amplitude for the sound to the user's left ear. 2708 illustrates proceeding to a subsequent time epoch.

Figure 28:
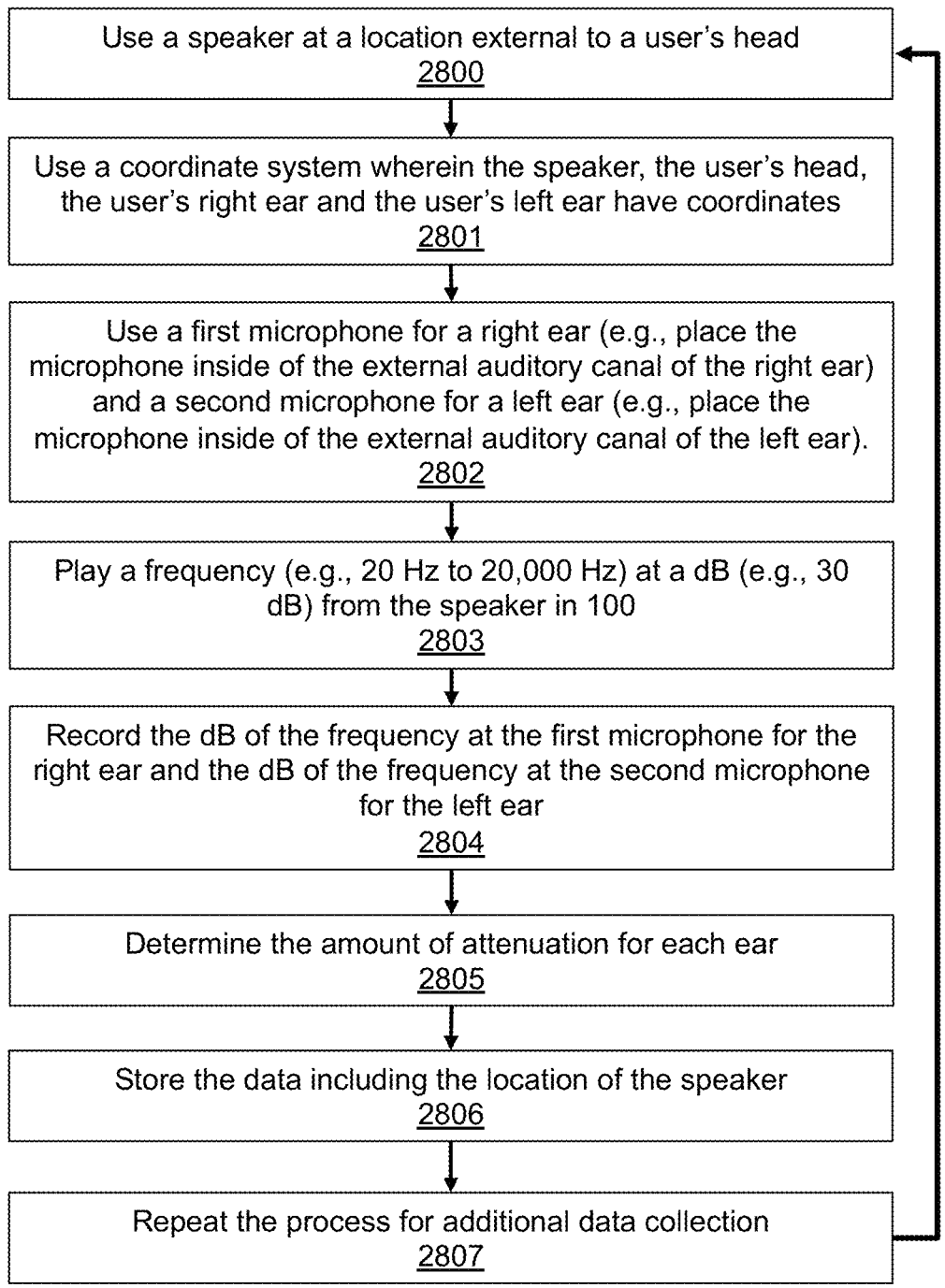
FIG. 28 illustrates determining the amount of sound attenuation for a user's head as a function of sound direction and head position.

FIG. 28 illustrates determining the amount of sound attenuation for a user's head as a function of sound direction and head position. This figure illustrates wherein the determining the amount of sound attenuation for a user's head as a function of sound direction and head position is performed experimentally. It could also be modeled as discussed elsewhere in this patent. 2800 illustrates using a speaker at a location external to a user's head. Note that in some embodiments, instead of a user's head, an object can be used to simulate the head (e.g., bag of water). This can be referred to as a head phantom. 2801 illustrates using a coordinate system wherein the speaker, the user's head, the user's right ear and the user's left ear have coordinates. 2802 illustrates using a first microphone for a right ear (e.g., place the microphone inside of the external auditory canal of the right ear) and a second microphone for a left ear (e.g., place the microphone inside of the external auditory canal of the left ear). 2803 illustrates playing a frequency (e.g., 20 Hz to 20,000 Hz) at a dB from the speaker in 2800. 2804 illustrates recording the dB of the frequency at the first microphone for the right ear and the dB of the frequency at the second microphone for the left ear. 2805 illustrates determining the amount of attenuation for each ear. Specifically, data would comprise at least one of: a relative direction (e.g., +y direction, +x direction, 45 degree) of the speaker with respect to the user's head position; a relative location (e.g., the speaker is assigned an (x, y, z) coordinate, the right ear is assigned a (x, y, z) coordinate and the left ear is assigned a (x, y, z) coordinate) of the speaker with respect to the user's head position; the dB and Hz recorded at the speaker; the dB and Hz recorded at the right ear and the dB and Hz recorded at the left ear. 2806 illustrates storing the data including the location of the speaker.

2807 illustrates repeating the process for additional data collection. Specifically, this process would be repeated for additional locations and frequencies. This is an improvement because it would allow individualizing the sound for a particular user's head size. This would allow a simulated sound played on headphones to better replicate insofar as possible an actual sound.

Figure 29A:
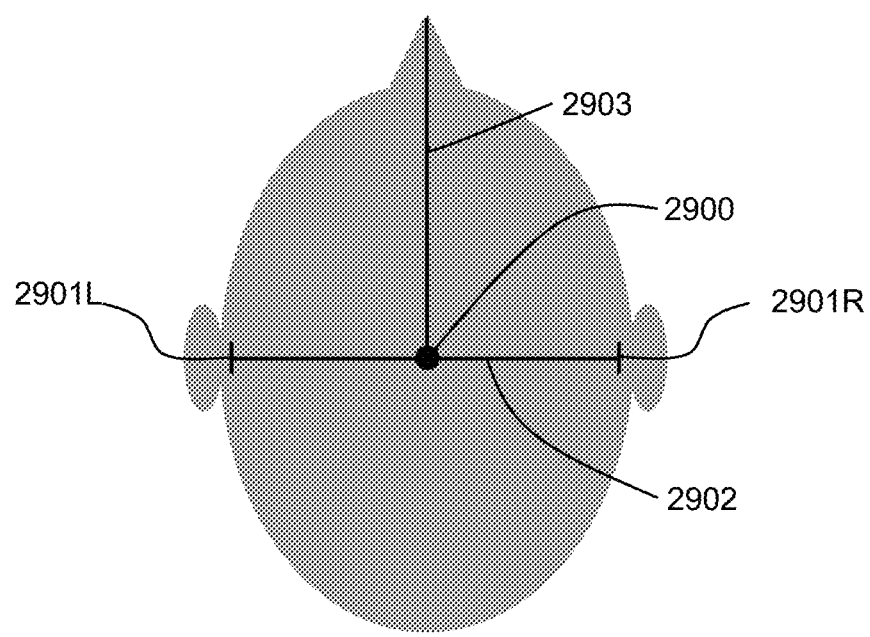
FIG. 29A illustrates an example coordinate system for a user's head.

FIG. 29A illustrates an example coordinate system for a user's head. A top down view is shown. In the preferred embodiment, the origin 2901 of the user head coordinate system is the point midway between the ears (a more precise preferred anatomic location would be the midpoint of the tympanic membrane). 2901R illustrates the midpoint of the right tympanic membrane. 2901L illustrates the midpoint of the left tympanic membrane. 2902 illustrates the x-axis, which is defined as the line between 2901R and 2901L. 2903 illustrates the y-axis, which is defined as a line from the origin to the tip of the nose. The z-axis (not shown) is the line normal to the x-y plane. Right ear is in the positive x-direction. Left ear is in the negative x-direction. Tip of nose is in the positive y-direction. The back of the head is in the negative y-direction. The top of the head is in the positive x-direction.

Figure 29B:
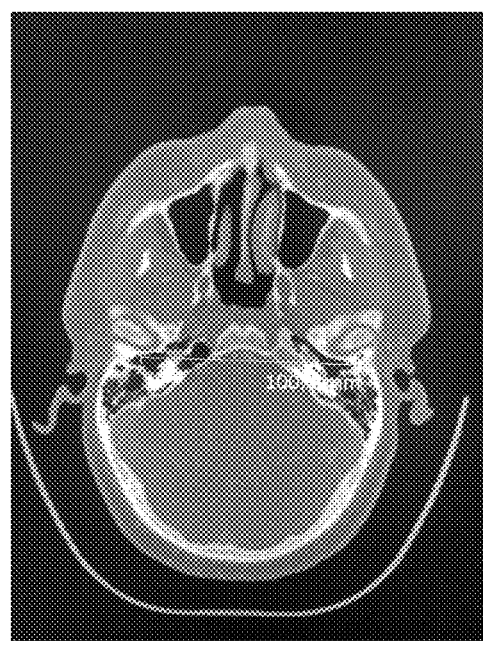
FIG. 29B illustrates an example of inter ear distance.

FIG. 29B illustrates an example of inter ear distance. An axial CT scan is illustrated, which shows an approximate inter-ear distance that can be used in the model, which will work for most individuals is 10 cm. Other methods for determining inter-ear distance include head circumference measurements, height of user, age of user or others.

Figure 30A:
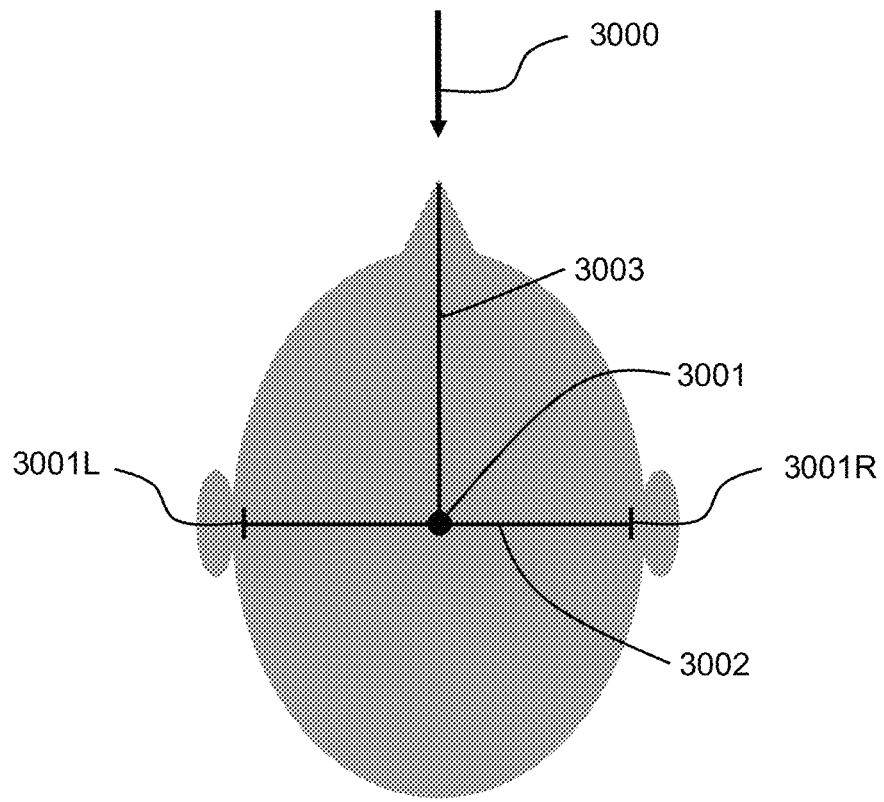
FIG. 30A illustrates an example of incoming sound wherein the incoming sound is in the −y direction on the user head coordinate system.

FIG. 30A illustrates an example of incoming sound wherein the incoming sound is in the −y direction on the user head coordinate system. 3000 illustrates sound waves moving in the −y direction. In this example, the arrival time of the sound to the left ear would be the same as the arrival time of the sound to the right ear. Additionally, user's head (assuming a symmetric head) would not cause the attenuation of the sound to the left ear to be different from the attenuation of the sound to the right ear.

Figure 30B:
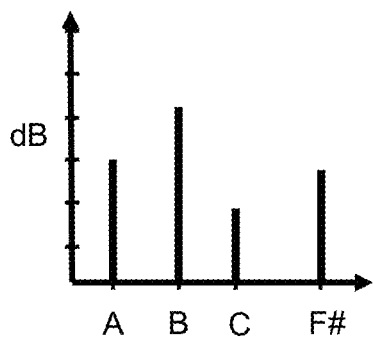
FIG. 30B illustrates an example of incoming sound at the left ear from FIG. 30A.

FIG. 30B illustrates an example of incoming sound at the left ear from FIG. 30A. The sound at the left ear would include the notes A, B, C and F #at the dB illustrated.

Figure 30C:
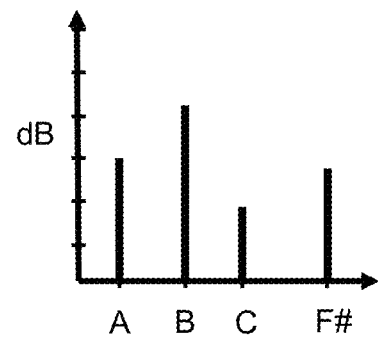
FIG. 30C illustrates an example of incoming sound at the right ear from FIG. 30A.

FIG. 30C illustrates an example of incoming sound at the right ear from FIG. 30A. The sound at the right ear would include the notes A, B, C and F #at the dB illustrated.

Figure 31A:
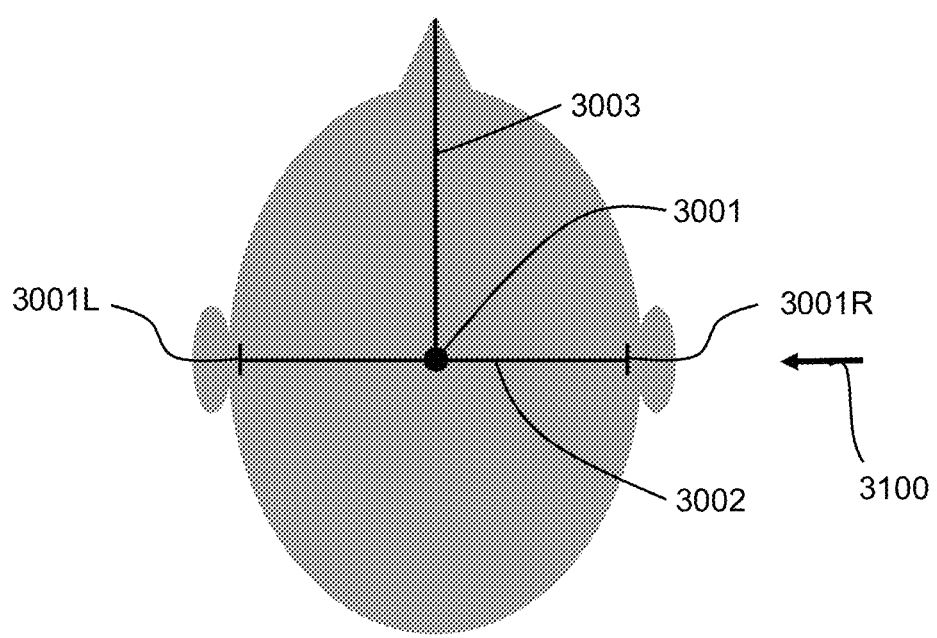
FIG. 31A illustrates an example of incoming sound wherein the incoming sound is in the −x direction on the user head coordinate system.

FIG. 31A illustrates an example of incoming sound wherein the incoming sound is in the −x direction on the user head coordinate system. 3100 illustrates sound waves moving in the −x direction.

Figure 31B:
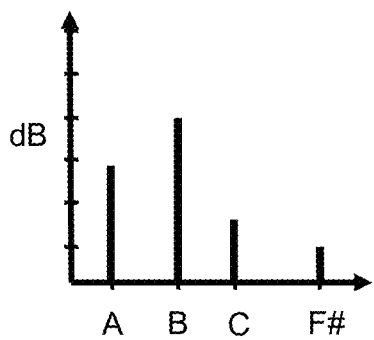
FIG. 31B illustrates an example of incoming sound at the left ear from FIG. 31A.

FIG. 31B illustrates an example of incoming sound at the left ear from FIG. 31A. The sound at the left ear would include the notes A, B, C and F #at the dB illustrated. In this example, the arrival time of the sound to the left ear would be earlier than the arrival time of the sound to the right ear.

Additionally, user's head would attenuate some of the sound, so the user's left ear would hear a lower dB than the user's right ear. In some embodiments, the sound can be modeled move around the user's head. In some embodiments, the sound can be modeled to move through the user's head. In some embodiments, a combination of the two can be implemented. Additionally, since attenuation is different across different frequencies, the user's left ear would hear less of the higher frequency notes as compared to the user's right ear. For example, the F #is significantly attenuated as compared to FIG. 31C.

Figure 31C:
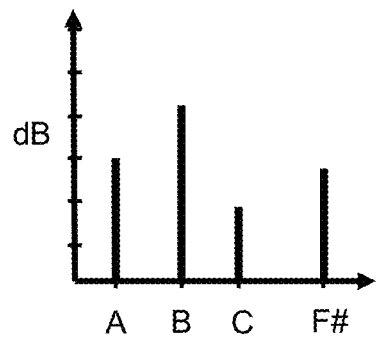
FIG. 31C illustrates an example of incoming sound at the right ear from FIG. 31A.

FIG. 31C illustrates an example of incoming sound at the right ear from FIG. 31A. The sound at the right ear would include the notes A, B, C and F #at the dB illustrated. Not only would the sound arrive the right ear sooner, but some notes would undergo less attenuation. For example, the F #is significantly less attenuated as compared to FIG. 31B.

Figure 32A:
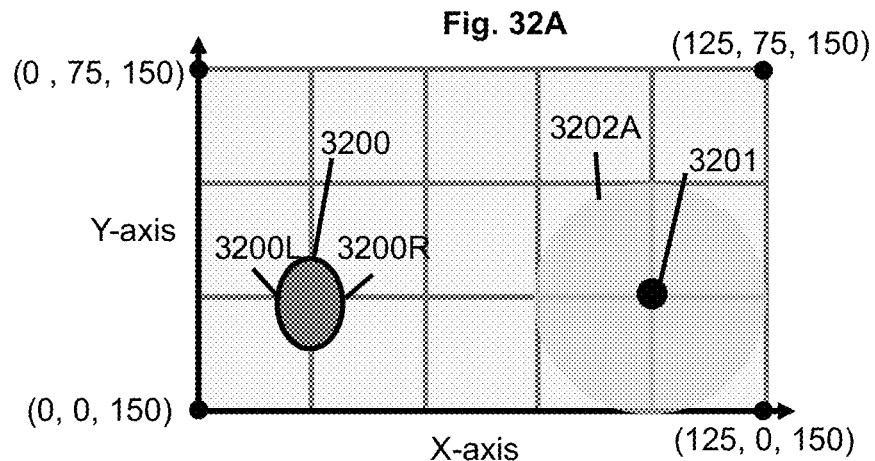
FIG. 32A illustrates a sound from a 6DAD being emitted from the coordinate (100, 25, 150) within an area at a first time epoch wherein a user's head is in a first position and first orientation.

FIG. 32A illustrates a sound from a 6DAD being emitted from the coordinate (100, 25, 150) within an area at a first time epoch wherein a user's head is in a first position and first orientation. An area coordinate system is shown with (x, y, z) coordinates as shown. Each square represents 25 cm. Assume the ground is at z=0. A user 3200, a right ear 100R of the user 3200 and a left ear of the user 3200 are shown. A top down view of the user's head is shown. At this first time epoch, the center of the user's head is located at (25, 25, 150). The orientation of the head is such that the +y direction of the user's head coordinate system aligns with the +y direction of the area coordinate system. Assuming an inter-ear distance of 10 cm, the coordinate of the right ear would be (30, 25, 150) and the coordinate of the left ear would be (20, 25, 150). At this first time epoch, the 6DAD had a sound 3201 originating from coordinate (100, 25, 150). The user 3200 would be, when listening to the 6DAD, able to localize that the sound 3201 to the right ear because of points of novelty in this patent. First, the left speaker of the headset worn by the user would play the sound before the right speaker of the headset, which corresponds to the earlier time of arrival. Second, the frequencies with associated dB played on the left speaker of the headset worn by the user 3200 would be different as compared to the right speaker of the headset worn by the user. This is because this patented system models attenuation of sound to the left ear and attenuation of sound to the right ear separately. Specifically, the attenuation of the sound to the left ear will be different from the attenuation of sound from the right ear. Third, this patent provides for modeling of echoes to further enhance the user experience, as if the sound really had a true 3D coordinate in the area where the user is located. With the 6DAD at this first time point, the user wearing the advanced headset would be able to localize approximately where the sound was coming from. At this first time epoch, because of the human limits of sound localization, the user will be able to estimate the side and approximately the distance away, but there will remain some uncertainty as to the precise amount forwards or backwards (Y-axis) and also the precise amount upwards or downwards (X-axis). This uncertainty is marked by the gray circle 3202A, which has a 25 cm radius.

Figure 32B:
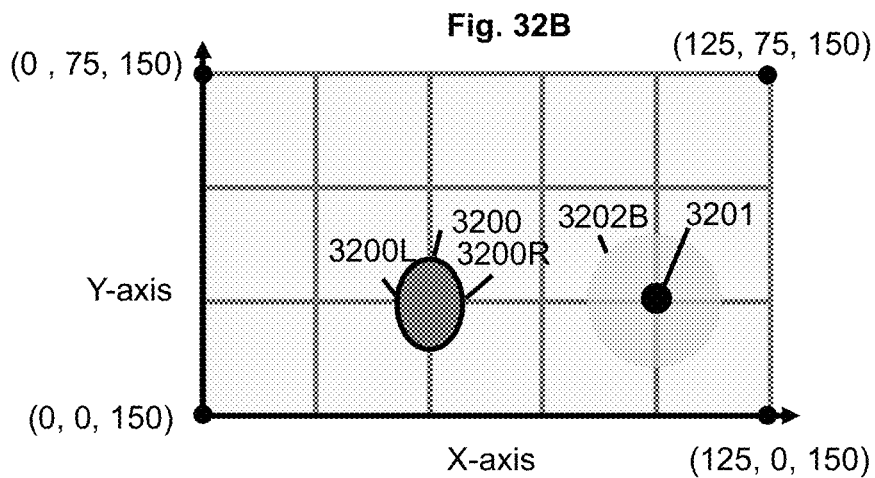
FIG. 32B illustrates a sound from a 6DAD still being emitted from the coordinate (100, 25, 150) within an area wherein a user's head is in a second position and first orientation at a second time epoch.

FIG. 32B illustrates a sound from a 6DAD still being emitted from the coordinate (100, 25, 150) within an area wherein a user's head is in a second position and first orientation at a second time epoch. Here the user's head has moved in the +x direction. At this second time epoch, the center of the user's head is located at (50, 25, 150). The orientation of the head is such that the +y direction of the user's head coordinate system aligns with the +y direction of the area coordinate system. Assuming an inter-ear distance of 10 cm, the coordinate of the right ear would be (55, 25, 150) and the coordinate of the left ear would be (45, 25, 150). Assume, for this example, that the sound has not changed (i.e., it is still generating the same frequencies at the same dB). At this second time epoch, the user would be much better to be able to localize the sound because the headset (equipped with head tracking) will play the 6DAD differently (frequencies and associated dB during the second time epoch would be different from first time epoch) because the user's head is shifted in position. This is illustrated as a smaller estimate on where the sound is coming from in 3202B, which has a 10 cm radius. Thus, the points of novelty allow for capturing a user's innate ability for sound localization and consequently will yield a much improved user experience. When listening to a 6DAD using the advanced headset and sound processing algorithms taught in this patent, a user is enabled to perform precise localization of sound. Moreover, the user will hear the frequencies accurately portrayed (precise dB corrected for attenuation). Some embodiments comprise determining the attenuation after the user's head moves to the new position or orientation. Other embodiments comprise determining the attenuation before the user's head moves to the new position or orientation, such as is taught for volume rendering in U.S. Pat. No. 11,526,657, A METHOD AND APPARATUS FOR PREEMPTIVE VOLUME RENDERING.

Figure 32C:
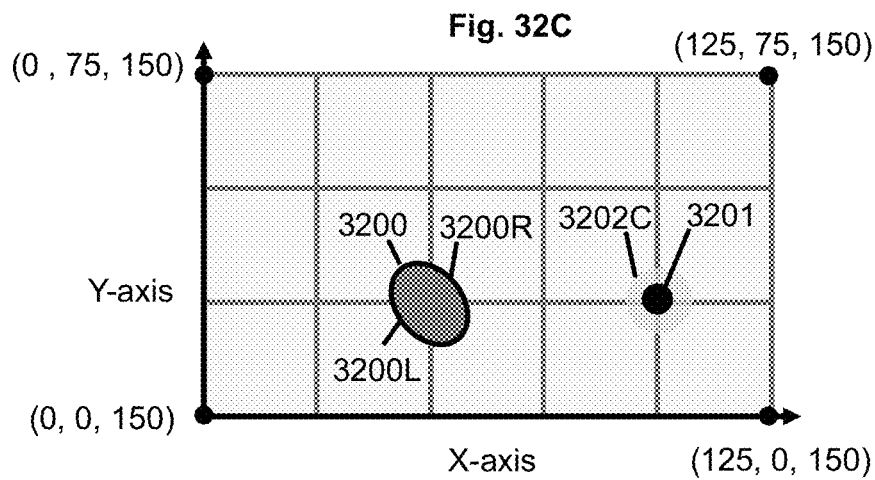
FIG. 32C illustrates a sound from a 6DAD still being emitted from the coordinate (100, 25, 150) within an area wherein a user's head is in a second position and second orientation at a third time epoch.

FIG. 32C illustrates a sound from a 6DAD still being emitted from the coordinate (100, 25, 150) within an area wherein a user's head is in a second position and second orientation at a third time epoch. Here the user's head has now turned 45 degrees to the left. At this third time epoch, the center of the user's head is still located at (50, 25, 150). The orientation of the head is such that the +y direction of the user's head coordinate system is now 45 degrees off from the y-axis of the area coordinate system. Assuming an inter-ear distance of 10 cm, the coordinate of the right ear would be (53.5, 28.5, 150) and the coordinate of the left ear would be (46.5, 22.5, 150). Assume, for this example, that the sound has not changed (i.e., it is still generating the same frequencies at the same dB). At this third time epoch, the user would be much better to be able to localize the sound because the headset (equipped with head tracking) will play the 6DAD differently (frequencies and associated dB during the third time epoch would be different from both the first time epoch and the second time epoch) because the user's head is changed in both position and orientation. This is illustrated as a smaller estimate on where the sound is coming from in 3202C, which now has a 5 cm radius. Thus, the points of novelty allow for capturing a user's innate ability for sound localization and consequently will yield a much improved user experience. When listening to a 6DAD using the advanced headset and sound processing algorithms taught in this patent, a user is enabled to perform precise localization of sound through head tracking and playing the 6DAD in accordance with head tracking of position and orientation changes and well as attenuation models of the area. Moreover, the user will hear the frequencies accurately portrayed (precise dB corrected for attenuation).

Figure 33:
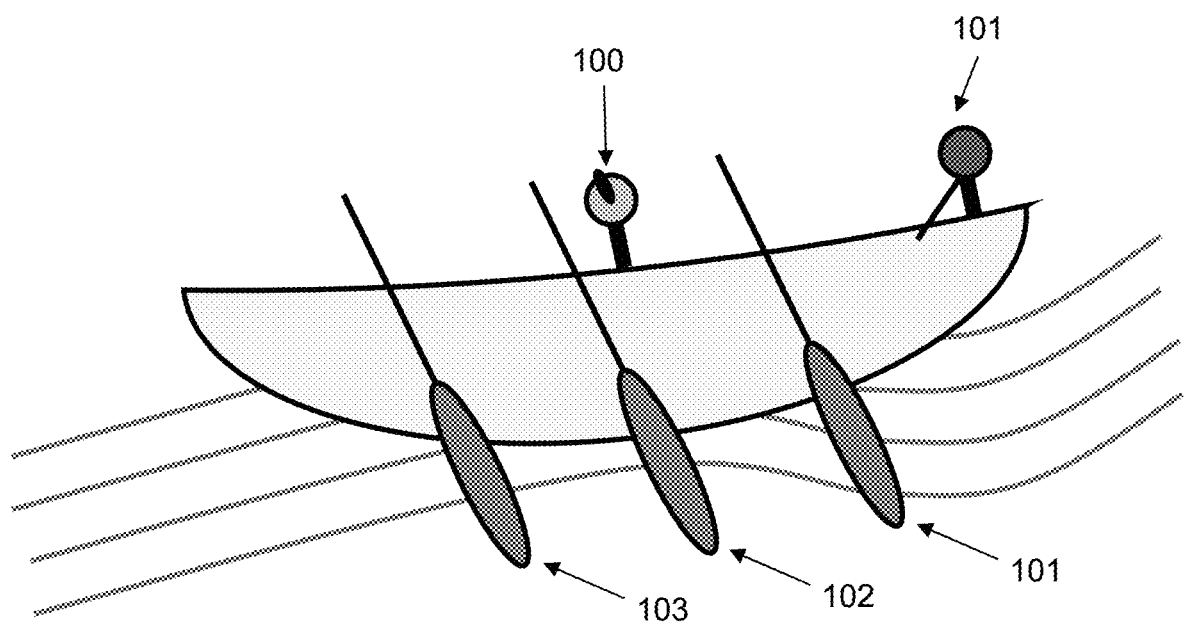
FIG. 33 illustrates playing of a 3D sound system in a life-like way to a user wherein the user is at a first position at a first time point.

FIG. 33 illustrates playing of a 3D sound system in a life-like way to a user wherein the user is at a first position at a first time point. In this figure, a 6DAD is played to a user wearing a headset 3300 while he is positioned at the center of a boat, such as at a theme park ride. The user's headset would be registered to the 6DAD and would be equipped with head tracking. This patent teaches using a first (x,y,z) coordinate to the left ear and a second (x,y,z) coordinate to the right ear. The user would be able to hear multiple sound sources including the sound of the coxswain 3301 issuing commands from a third (x,y,z) coordinate, the sound of the first paddle 3302 hitting the water from a fourth (x,y,z) coordinate; the sound of the second paddle hitting the water from a fifth (x,y,z) coordinate, and the sound of a third paddle hitting the water from a sixth (x,y,z) coordinate. Similarly the stadium example and the orchestra concert example with be dramatically improved by using the 6DAD approach taught in this patent.

FIG. 34 illustrates determining what the 6DAD would sound like at various distances (an attenuation analysis). There are two options.

First, the option is to empirically determine the attenuation. An example will be provided in this patent which is the babbling brook example. Recording could be performed at multiple distances at a time in a multi-microphone setup. This would be useful if 10 microphones were arranged radially outward from a location where sound was generated. If the sound that is desired to be captured is the sound of keys hitting concrete (which would have a different set of frequencies and associated dB close to the source as compared to farther away), such a multi-microphone setup would be useful because all microphones (e.g., 10) could be turned on and the sound could occur once and 10 audio files could be generated (e.g., an audio file at 1 foot, an audio file at 2 feet, an audio file at 3 feet, etc.).

Alternatively, recording could be performed at a single distance at a time using a single microphone setup. The sound source (e.g., keys hitting concrete) could be repeated multiple times for each recording and again multiple files could be established.

Second, the option is to use a sound and model what how the frequencies and associated dBs of the sound would change at varying distances. For example, acquire the sound of the keys hitting concrete at 2 feet distance. Then, execute a model to determine what the sound (frequencies and associated dBs) would be like at 1 feet, 3 feet, 4 feet, 5 feet, 6 feet, 7 feet, 8 feet, 9 feet, and 10 feet to generate the 10 audio files. Also, note that this could be performed in real time. If for example, the user's ear was positioned at 3.5 feet from the sound source, the recorded sound at 2 feet could be modeled in near real time and the sound of keys hitting at 3.5 feet could be achieved via simulation. A simulation approach is advantageous because it reduces the collection requirement and as will be discussed also allows for performing attenuation correction based on objects in the scene where a user is located.

Additionally, some embodiments comprise fine tuning the sound for an individual's hearing profile. For example, certain frequencies where a person had hearing loss can be increased in their amplitude. Another example is altering the sound based on an individual's preference, such as they have a disliking to a particular frequency and this can be decreased in dB or eliminated.

FIG. 35A illustrates an example of manipulating a location of a sound coordinate within the 6DAD. In a garage in NY, Joe is playing a base guitar 3501A and Chuck is playing a drum set 3500A. The sounds from Joe and Chuck's recording is sent to Dave in FL. In a bedroom in CA, Wosen is playing an electric guitar. The sounds from Wosen's recording is sent to Dave in FL. In a living room in GA, Gene is singing. The sounds from Gene's recording is sent to Dave in FL. In a computer lab in FL, Dave in FL assigns Joe's base guitar to a first (x, y, z) coordinate 3501B, Chuck's drum set to a second (x, y, z) coordinate 3500B, Wosen's electric guitar to a third (x, y, z) coordinate 3502B and Gene's voice to a fourth (x, y, z) coordinate 3503B. This is analogous to the assignment via the "virtual speaker" technique as previously taught. Dave decides to wear the advanced head set with the virtual reality goggles during the assignment process. Dave aligns each of the four sound sources in a linear fashion and sits in front 3504B. Dave sends the merged 6DAD to Bob in Texas.

Bob in TX does not like Dave's positioning of the instruments so decides to re-arrange them. Bob wants to sit in the middle of the band 3504C and sits on a swivel chair. Bob wears augmented reality glasses and positions Joe's base guitar to a first (x, y, z) coordinate 3501C, Chuck's drum set to a second (x, y, z) coordinate 3500C, Wosen's electric guitar to a third (x, y, z) coordinate 3502C and Gene's voice to a fourth (x, y, z) coordinate 3503C. Bob is now happy with his set up and can hear the band to his liking. The altering process can be performed using gestures or GUIs of various kinds. Alternatively, a computer system can learn (e.g., via AI) preferences for various users and adjust accordingly.

FIG. 35B illustrates a flow chart depicting manipulating a location of a sound coordinate within the 6DAD. 3505 illustrates using a 6DAD wherein each sound has an (x, y, z) coordinate. 3506 illustrates altering at least one (x, y, z) coordinate of one sound to generate a manipulated 6DAD.

In some embodiments, when a coordinate of a sound is moved, the timing of the sound is also adjusted so that the arrival time is optimized based on listener's location.

FIG. 36A illustrates an example of manipulating a timing of a sound source within the 6DAD. Bob from Texas in FIG. 35 passes the manipulated 6DAD to Kathy in MA. Kathy does not like being "in the middle of the band" so moves the listening position backwards so that she is more or less in the front row. Kathy in MA moves to position 3604D and stands up as if she were at the front seat of the concert. Kathy wears an earbuds-type advanced headset. Within Kathy's library, Joe's base guitar is a first (x, y, z) coordinate 3601D, Chuck's drum set to a second (x, y, z) coordinate 3600D, Wosen's electric guitar to a third (x, y, z) coordinate 3602D and Gene's voice to a fourth (x, y, z) coordinate 3603D. Kathy is now happy with his set up and can hear the band to his liking. Kathy listens to the 6DAD and at her favorite part of the song, Kathy realizes that the timing of the "C" note from Wosen's electric guitar is off. Kathy realizes that Wosen's timing for the "A" note and the "B" note in the song were correct, but the Wosen was delayed in playing the "C" note.

FIG. 36B illustrates the timing of notes for three members of the band. Joe's base guitar 3601D played the "A" note, the "B" note and the "C" note with the appropriate timing. Wosen's electric guitar 3601D played the "A" note and the "B" note with the appropriate timing; however, Wosen was late in playing the "C" note. Gene's voice sang the "A" note, the "B" note and the "C" note with the appropriate timing.

FIG. 36C illustrates the timing of notes for three members of the band after adjustment. Kathy alters the timing of Wosen's electric guitar sound so that the Wosen's "C" note matches that of Joe and Gene. Kathy is now satisfied with the timing and has maximized her enjoyment. Kathy then passes the 6DAD to Billy in Oregon for further review.

FIG. 36D illustrates a flow diagram for manipulating the timing of a sound source within the 6DAD. 3604 illustrates using a 6DAD wherein each sound has an (x, y, z) coordinate. 3605 illustrates alter at least timing of one sound to generate a manipulated 6DAD.

FIG. 37A illustrates an example of manipulating a sound of a sound source within the 6DAD. Kathy from MA in FIG. 36 passes the manipulated 6DAD to Billy in OR. Billy does not like being "in the front row" so moves the listening position backwards so that he is more or less in the back of the band. Billy in OR moves to position 3704E and stands up as if he were at the back of the band so would hear the sounds slightly differently from Dave, Bob and Kathy. Billy wears an in-ear modulator type advanced headset. Within Billy's outdoor deck, Joe's base guitar is a first (x, y, z) coordinate 3701E, Chuck's drum set to a second (x, y, z) coordinate 3700E, Wosen's electric guitar to a third (x, y, z) coordinate 3702E and Gene's voice to a fourth (x, y, z) coordinate 3703E. Billy is now happy with his set up and can hear the band to his liking. Billy listens to the 6DAD and at his favorite part of the song, Billy realizes that the "C" note from Wosen's electric guitar is incorrect. Wosen inadvertently plays a "D" note rather than a "C" note.

FIG. 37B illustrates the notes for three members of the band. Joe's base guitar 3701D played the "E" note, the "B" note and the "C" note appropriately. Wosen's electric guitar 3701D played the "E" note and the "B" note appropriately; however, Wosen inadvertently played the "D" note rather than the "C" note. Gene's voice sang the "E" note, the "B" note and the "C" note appropriately.

FIG. 37C illustrates the timing of notes for three members of the band after adjustment. Billy alters a sound of Wosen's electric guitar sound so that the Wosen's "D" note matches that of Joe and Gene. Billy is now satisfied with the sound and has maximized his enjoyment.

FIG. 37D illustrates a flow diagram for manipulating the sound of a sound source within the 6DAD. 3704 illustrates using a 6DAD. 3705 illustrates alter a sound (frequency and/or dB) of at least one sound source to generate a manipulated 6DAD.

FIG. 38A illustrates a top down view of a multi-microphone smart helmet. 3800 illustrates the helmet. Note that other head-borne device could be used including, but not limited to, the following: headset or head display unit. In this aspect, the preferred embodiment is to have multiple microphones (preferably four or more). 3801A illustrates a first microphone positioned at a first location on the helmet. 3801B illustrates a second microphone positioned at a second location on the helmet. 3801C illustrates a third microphone positioned at a third location on the helmet. 3801D illustrates a fourth microphone positioned at a fourth location on the helmet. Together, the first microphone 3801A, the second microphone 3801B, the third microphone 3801C and the fourth microphone 3801D act like a TTMA because together they can triangulate where a sound is coming from. It is very difficult to determine where a sound is coming from when wearing a helmet, so the helmet borne TTMA would be extremely useful. 3802A illustrates a directional microphone, which enhances the ability to hear sound from a particular location. An option is to have an adjustable length or an extender to further enhance listening at a particular angle, which will elongate and narrow the cone of sound. Another option is that the direction microphone can be detached. 3802B illustrates a rotatable mount, which can point in variable (horizontal and vertical angles). Object tracking can be performed. For example, an object can be tracked in accordance with look angle of the user.

FIG. 38B illustrates a side view of a multi-microphone smart helmet. 3800 illustrates the helmet. 3802C illustrates multiple high resolution directional microphones. 3802D illustrates ear phones on the inside of the helmet. Earbuds or other IEMs could also be used. 3802E illustrates a processor, memory and power supply.

FIG. 38C illustrates a helmet with microbuzzers. 3802F illustrates microbuzzers in the helmet lining. A liner for the Soldier's helmet with a hemispherical set of micro buzzers built into the material as a liner inside of the helmet shown. It is particularly difficult for an individual wearing a helmet to determine the direction of sound while wearing a helmet. A solution to this is for the helmet to have a tactile way to communicate the direction of the sound. These micro buzzers are the solution. These micro buzzers are in communication the smart helmet processor which, in turn, is in communication with the external set of microphones. The function of these micro buzzers is to buzz very quietly on the Soldiers scalp the direction of threat/for shots activities, etc. The particular buzzer location on the liner that buzzed would be with respect to the direction that the Soldier's helmet was facing so that the Soldier would know what direction and how far to turn to face the threat/foe.

FIG. 38D illustrates a flow diagram for using the multi-microphone smart helmet. 3803 illustrates triangulating a location of a sound using the multi-microphone smart helmet to enhance understanding about the sound (e.g., location, speed of traveling sound, etc.). A head tracking system with position and orientation is included. A microphone array on the smart headset could (1) triangulate where an ambulance is located and (2) calculate what the speed of the ambulance was and inform the listener accordingly. 3804 illustrates providing a notification of where the sound is coming from to the user wearing the helmet by at least one of the group consisting of: an auditory notification to a headset worn inside the helmet; a visual notification via an XR display (e.g., annotation such as an arrow); and, a tactile notification via the helmet. In some embodiments, the microphone(s) could be used for sound suppression in some directions and sound amplification in other directions. 3806 illustrates pointing a directional microphone towards the location where the sound is coming from for improve listening capability.

The traditional helmet could be converted into a smart helmet which would offer the individual Soldier improved warfighting functionality. The individual Soldier could detect threat sounds earlier and at greater ranges which translates into better survivability and geo-locate the threat which translates into greater lethality. The side view depicts a band with microphones external to the smart helmet. The earphones within the helmet are shown by dashed lines. The microphone and provide a narrow cone of coverage based on their placement. A number of these microphones would be on the band such that 360° coverage was achieved for the individual Soldier. These directional microphones would be in communication with the smart helmet processor. Any sounds received by the directional microphones would be is converted by the microphone into a signal which is subsequently relayed to the processor. The processor would classify the noise as friend, foe, or neutral (FFN). The processor would also be in communication with the individual Soldier's global positioning system (GPS) from which the individual Soldier's azimuth would be derived. The processor would generate a message to the individual Soldier's earphones, as appropriate according to FFN and in the case of foe, the direction of the foe/threat with respect to the individual Soldier's azimuth. The top view of the individual Soldier's smart helmet shows the 360° placements of the directional microphones on the band. Also affixed is a small volume for the processor, data storage/memory and power source. The earphones within the helmet are shown by dashed lines.

In some embodiments, two Soldiers bot equipped with smart helmets. A link could exist between each of the individual Soldier's respective processors and the individual Soldier's radios. A two-way communication link between the two individual Soldiers would transmit the GPS based azimuth to the foe/threat. Intersection/resections processes would be performed by the individual Soldier's processors and, thereby, the foe/threat would be geo-located. Subsequently, a call for fire could be made to the artillery and the foe/threat would be engaged with indirect fire.

In some embodiments, a Soldier in conversation with a foreign person neither the Soldier or the foreign person understand or speak one another's language. The smart helmet provides important assist under these conditions. The data storage/memory has a look-up table of sounds and the processor translates these sounds into English words which are subsequently sent to the Soldier's earphones. The Soldier's questions and responses could be received by one of the microphones and subsequently translated by the processor into the foreign language. An external speaker could be affixed the smart helmet which would broadcast in the foreign language the Soldier's questions and responses.

In some embodiments, a further configuration of the smart helmet where a second, type of highly directional microphone is coupled with noise cancellation option of nearby noises. For example, in a situation where two Soldiers on watch at night to provide surveillance of the assigned sector, any noise made by one of the Soldiers would distract the other Soldier's surveillance. These noises would need active cancellation for sounds received in the direction of the companion Soldier. The active noise cancellation could be performed by the processor. Both Soldiers equipped with the highly directional type microphones would provide a longer range and more accurate location of threat/foe—for calling for indirect fire or alerting additional Soldiers.

In some embodiments, two different conditions where the nearby environment has a very loud noise level (i.e., non-safe dB levels) that degrades mission performance and/or could harm the ears. The first example is that of Soldiers/Airmen/Sailor and Marines servicing aircraft on the flight line. In this case, selective damping of the noise in the direction of the high noise level while, at the same time preserving a normal level of voices among service members. The second condition would be when active engagements are taking place such as: threat artillery rounds going off nearby friendly machine gun fire. In this condition, near instantaneous damping of the noises coming from all directions is required for both ear safety and to preserve hearing squad radio communications.

Figure 39:
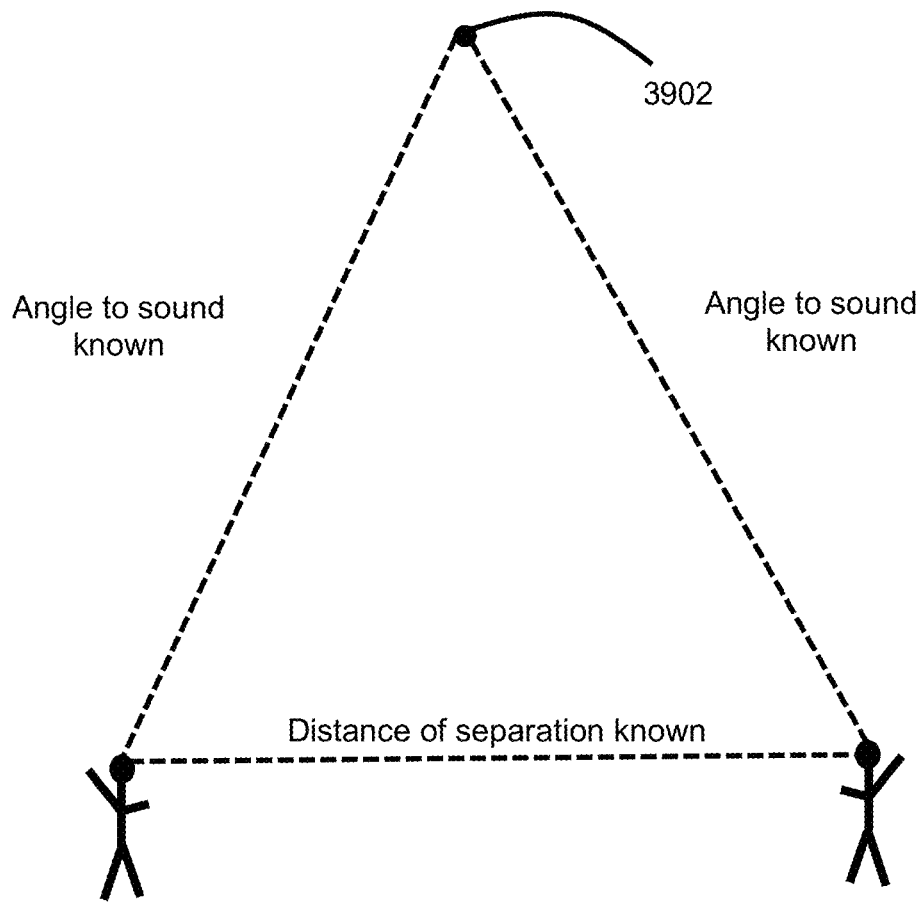
FIG. 39 illustrates applications wherein synergy exists for multiple users with multi-microphone smart headsets.

FIG. 39 illustrates applications wherein synergy exists for multiple users with multi-microphone smart headsets. 3900 illustrates a text box illustrating key data for User #1. User #1 has heard a sound and has a known location and accurate clock. The multi-microphone setup on the helmet allows for determining the direction of the sound. User #1 does not know the distance to the sound. 3901 illustrates a text box illustrating key data for User #2. User #2 has heard a sound and has a known location and accurate clock. The sound heard by User #2 is compared with the sound heard by user #1 and is determined to match the sound The multi-microphone setup on the helmet allows for determining the direction of the sound. User 2 does not know the distance to the sound. 3902 illustrates a location of the sound heard by User #1 and User #2. An analysis can be performed using the known data as described to determine the location of the sound. This sound can be used passed to other people, organizations or processes. This process is more useful for long distance sounds. Since this process is more useful for long distance sounds, User #1 and User #2 can both use directional microphones for softer. This is advantageous because sometimes there is a sound without a visual. Two search and rescue operators can therefore wear the helmets and when a person is calling for help, the process described herein can help to localize the person in distress. Other similar approaches can also apply.

Throughout the entirety of the present disclosure, use of the articles "a" or "an' to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, Something else, may be understood to so communicate, be associated with, and or be based on in a direct and/or indirect manner, unless otherwise stipulated herein. The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation. References to "a microprocessor and "a processor, or "the microprocessor and "the processor." may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor or "processor terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where Such memory may be contiguous and/or partitioned based on the application. Accordingly, references to a database may be understood to include one or more memory associations, where such references may include commercially available database products (e.g., SQL, Informix, Oracle) and also include proprietary databases, and may also include other structures for associating memory Such as links, queues, graphs, trees, with such structures provided for illustration and not limitation. References to a network, unless provided otherwise, may include one or more intranets and/or the Internet, as well as a virtual network. References hereinto microprocessor instructions or microprocessor-executable instructions, in accordance with the above, may be understood to include programmable hardware.

Unless otherwise stated, use of the word "substantially' may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" or "an' to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, Something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

What is claimed is:

1. A method comprising:
    recording a sound at a multiple time points at a recording location;
    wherein said sound originates at an originating location,
    wherein said recording location is separate from said originating location by a first distance,
    wherein each time point in said multiple time points of said sound at said originating location comprises multiple frequencies,
    wherein each frequency in said multiple frequencies of said sound at said originating location comprises an associated amplitude, wherein each time point in said multiple time points of said sound at said recording location comprises multiple frequencies, and wherein each frequency in said multiple frequencies of said sound at said recording location comprises an associated amplitude;

picking a simulated location;

wherein said simulated location is different from said recording location, wherein said simulated location is a simulated distance from said recording location; and using said recorded sound to generate a corresponding simulated sound;

wherein said corresponding simulated sound is based on said simulated location, wherein said corresponding simulated sound comprises multiple time points, wherein each time point in said multiple time points of said corresponding simulated sound comprises multiple frequencies, wherein each frequency in said multiple frequencies of said corresponding simulated sound comprises an associated simulated amplitude, wherein for each frequency at each time point of said corresponding recorded sound, an attenuation correction based on said simulated distance is applied to generate a simulated amplitude for each frequency at each time point of said simulated sound, and wherein for corresponding time points between said recorded sound and said corresponding simulated sound and corresponding frequencies between said recorded sound and said corresponding simulated sound, amplitudes of said corresponding simulated sound are different from amplitudes of said recorded sound.

2. The method of claim 1, further comprising wherein at least one selected frequency from said recorded sound is omitted from said corresponding simulated sound.

3. The method of claim 2, further comprising wherein:
said recorded sound is analyzed to determine if noise is present; and
if said noise is present, then said noise is omitted from said simulated sound.

4. The method of claim 1, further comprising wherein if said first distance is known, then using amplitude correction for said corresponding simulated sound based on said first distance.

5. The method of claim 1, further comprising wherein if the originating location of said sound is moving, then using a Doppler correction at each time point to generate said simulated sound's frequencies and associated amplitudes.

6. The method of claim 1, further comprising wherein said simulated distance is determined by at least one of the group of:
a location of a user's wearable device; and
an input from a user's wearable device.

7. The method of claim 1, further comprising wherein:
said corresponding simulated sounds is saved; and
said saved corresponding simulated sound is played on speakers to a user.

8. The method of claim 1, further comprising:
assigning an (x,y,z) coordinate to said originating location;
assigning an (x,y,z) coordinate to said recording location; and
assigning an (x,y,z) coordinate to said simulated location.

9. The method of claim 1, further comprising:
computing a travel time of said sound from said recording location to said simulated location.

10. The method of claim 9, further comprising adjusting said travel time based on at least one of the group comprising:
frequencies of said recorded sound;
medium;
humidity; and
temperature.

11. The method of claim 1, further comprising wherein said simulated location is different from said originating location.

12. The method of claim 1 further comprising wherein said simulated distance is longer than said first distance.

13. The method of claim 1, further comprising wherein said simulated distance is shorter than said first distance.

14. The method of claim 1, further comprising:
storing said corresponding simulated sound;
at a first time epoch, playing said recorded sound on speakers for a user; and
at a second time epoch, playing said corresponding simulated sound on speakers for said user.

15. The method of claim 1, further comprising:
presenting said corresponding simulated sound on a headset;
wherein for a first time epoch,
assigning an (x,y,z) coordinate for said simulated sound;
assigning an (x,y,z) coordinate to a user's right ear based on head tracking of said headset; and
assigning an (x,y,z) coordinate to said user's left ear based on head tracking of said headset wherein said (x,y,z) coordinate to said user's right ear and said (x,y,z) coordinate to said user's left ear are different coordinates;
determining a distance from said corresponding simulated sound to said user's right ear;
determining an arrival time of said corresponding simulated sound to said user's right ear;
playing said corresponding simulated sound on a speaker for said user's right ear at said arrival time of said corresponding simulated sound to said user's right ear;
determining a distance from said corresponding simulated sound to said user's left ear;
determining an arrival time of said corresponding simulated sound to said user's left ear wherein said arrival time of said corresponding simulated sound to said user's right ear is different from said arrival time of said corresponding simulated sound to said user's left ear; and
playing said corresponding simulated sound on a speaker for said user's left ear at said arrival time of said simulated sound to the user's left ear.

16. The method of claim 15, further comprising:
for a second time epoch,
assigning an (x,y,z) coordinate for an origin of a second corresponding simulated sound;
assigning an (x,y,z) coordinate to said user's right ear based on head tracking of said headset; and
assigning an (x,y,z) coordinate to said user's left ear based on head tracking of said headset wherein said (x,y,z) coordinate to said user's right ear and said (x,y,z) coordinate to said user's left ear are different coordinates;
determining a distance from said origin of said second corresponding simulated sound to said user's right ear;

determine an arrival time of said second corresponding simulated sound to said user's right ear;

playing said second corresponding simulated sound on a speaker for said user's right ear at said arrival time of said second corresponding simulated sound to the user's right ear;

determining a distance from said origin of said second corresponding simulated sound to said user's left ear;

determine an arrival time of said second corresponding simulated sound to said user's left ear wherein said arrival time of said second corresponding simulated sound to said user's right ear is different from said arrival time of said second corresponding simulated sound to said user's left ear; and playing said second corresponding simulated sound on a speaker for said user's left ear at said arrival time of said second corresponding simulated sound to the user's left ear.

17. The method of claim 16, further comprising:

wherein said headset has moved from said first time epoch to said second time epoch;

wherein said (x,y,z) coordinate to said user's right ear at said first time epoch is different from said (x,y,z) coordinate to said user's right ear at said second time epoch; and wherein said (x,y,z) coordinate to said user's left ear at said first time epoch is different from said (x,y,z) coordinate to said user's left ear at said second time epoch.

18. The method of claim 17, further comprising at least one of the group of:

wherein said headset has moved via translation; and wherein said headset has moved via rotation.

19. An apparatus comprising:

speaker(s);

wherein said speaker(s) are configured to play a corresponding simulated sound; and wherein said corresponding simulated sound is generated by:

recording a sound at a multiple time points at a recording location;

wherein said sound originates at an originating location, wherein said recording location is separate from said originating location by a first distance, wherein each time point in said multiple time points of said sound at said originating location comprises multiple frequencies, wherein each frequency in said multiple frequencies of said sound at said originating location comprises an associated amplitude, wherein each time point in said multiple time points of said sound at said recording location comprises multiple frequencies, and wherein each frequency in said multiple frequencies of said sound at said recording location comprises an associated amplitude;

picking a simulated location;

wherein said simulated location is different from said recording location, wherein said simulated location is a simulated distance from said recording location; and using said recorded sound to generate said corresponding simulated sound;

wherein said corresponding simulated sound is based on said simulated location, wherein said corresponding simulated sound comprises multiple time points, wherein each time point in said multiple time points of said corresponding simulated sound comprises multiple frequencies, wherein each frequency in said multiple frequencies of said corresponding simulated sound comprises an associated simulated amplitude, wherein for each frequency at each time point of said corresponding recorded sound, an attenuation correction based on said simulated distance is applied to generate a simulated amplitude for each frequency at each time point of said simulated sound, and wherein for corresponding time points between said recorded sound and said corresponding simulated sound and corresponding frequencies between said recorded sound and said corresponding simulated sound, amplitudes of said corresponding simulated sound are different from amplitudes of said recorded sound.

20. A head display unit, comprising:

speaker(s);

a left eye display;

a right eye display;

a head tracking system;

wherein said speaker(s) are configured to play a corresponding simulated sound; and wherein said corresponding simulated sound is generated by:

recording a sound at a multiple time points at a recording location;

wherein said sound originates at an originating location, wherein said recording location is separate from said originating location by a first distance, wherein each time point in said multiple time points of said sound at said originating location comprises multiple frequencies, wherein each frequency in said multiple frequencies of said sound at said originating location comprises an associated amplitude, wherein each time point in said multiple time points of said sound at said recording location comprises multiple frequencies, and wherein each frequency in said multiple frequencies of said sound at said recording location comprises an associated amplitude;

picking a simulated location;

wherein said simulated location is different from said recording location, wherein said simulated location is a simulated distance from said recording location; and using said recorded sound to generate said corresponding simulated sound;

wherein said corresponding simulated sound is based on said simulated location, wherein said corresponding simulated sound comprises multiple time points, wherein each time point in said multiple time points of said corresponding simulated sound comprises multiple frequencies, wherein each frequency in said multiple frequencies of said corresponding simulated sound comprises an associated simulated amplitude, wherein for each frequency at each time point of said corresponding recorded sound, an attenuation correction based on said simulated distance is applied to generate a simulated amplitude for each frequency at each time point of said simulated sound, and wherein for corresponding time points between said recorded sound and said corresponding simulated sound and corresponding frequencies between said recorded sound and said corresponding simulated sound, amplitudes of said corresponding simulated sound are different from amplitudes of said recorded sound.

\* \* \* \* \*